INFORMATION STORAGE AND SEARCH SYSTEM

Filed April 12, 1960

29 Sheets-Sheet 1

INVENTORS
FRANK A. HILL
A. J. PANKRATZ
ALFRED W. SANBORN
BEN T. SATO

BY [signature]
ATTORNEY

Jan. 25, 1966 F. A. HILL ET AL 3,231,869

INFORMATION STORAGE AND SEARCH SYSTEM

Filed April 12, 1960 29 Sheets-Sheet 3

FIG. 5

"CA" CHARACTER COUNT SIGNAL

CHARACTER TIME

| C1 1234567 | C2 1234567 | C3 1234567 | C4 1234567 | C5 1234567 | C6 1234567 | C7 1234567 | C8 1234567 | C9 1234567 | C10 1234567 | C11 1234567 | C12 1234567 | WORD TIME |
|---|---|---|---|---|---|---|---|---|---|---|---|---|
| 0000110 | 0001110 | 0000001 | 0001001 | 0000101 | 0001101 | 0000011 | 0001011 | 0000111 | 0001111 | 0000000 | 1001010 | W8 |
| 1000110 | 1001110 | 1000001 | 1001001 | 1000101 | 1001101 | 1000011 | 1001011 | 1000111 | 1001111 | 1000000 | 0101010 | W1 |
| 0100110 | 0101110 | 0100001 | 0101001 | 0100101 | 0101101 | 0100011 | 0101011 | 0100111 | 0101111 | 0100000 | 1101010 | W2 |
| 1100110 | 1101110 | 1100001 | 1101001 | 1100101 | 1101101 | 1100011 | 1101011 | 1100111 | 1101111 | 1100000 | 0011010 | W3 |
| 0010110 | 0011110 | 0010001 | 0011001 | 0010101 | 0011101 | 0010011 | 0011011 | 0010111 | 0011111 | 0010000 | 1011010 | W4 |
| 1010110 | 1011110 | 1010001 | 1011001 | 1010101 | 1011101 | 1010011 | 1011011 | 1010111 | 1011111 | 1010000 | 0111010 | W5 |
| 0110110 | 0111110 | 0110001 | 0111001 | 0110101 | 0111101 | 0110011 | 0111011 | 0110111 | 0111111 | 0110000 | 1111010 | W6 |
| 1110110 | 1111110 | 1110001 | 1111001 | 1110101 | 1111101 | 1110011 | 1111011 | 1110111 | 1111111 | 1110000 | 0001010 | W7 |

WRITE BUFFER -10-

WRITE BUFFER -10-(CONT.)

WRITE BUFFER-10-CONT.

FIG. 9 WRITE LOGIC CIRCUITRY, FIG. 10 WRITE LOGIC CIRCUITRY-19-(CONT.)
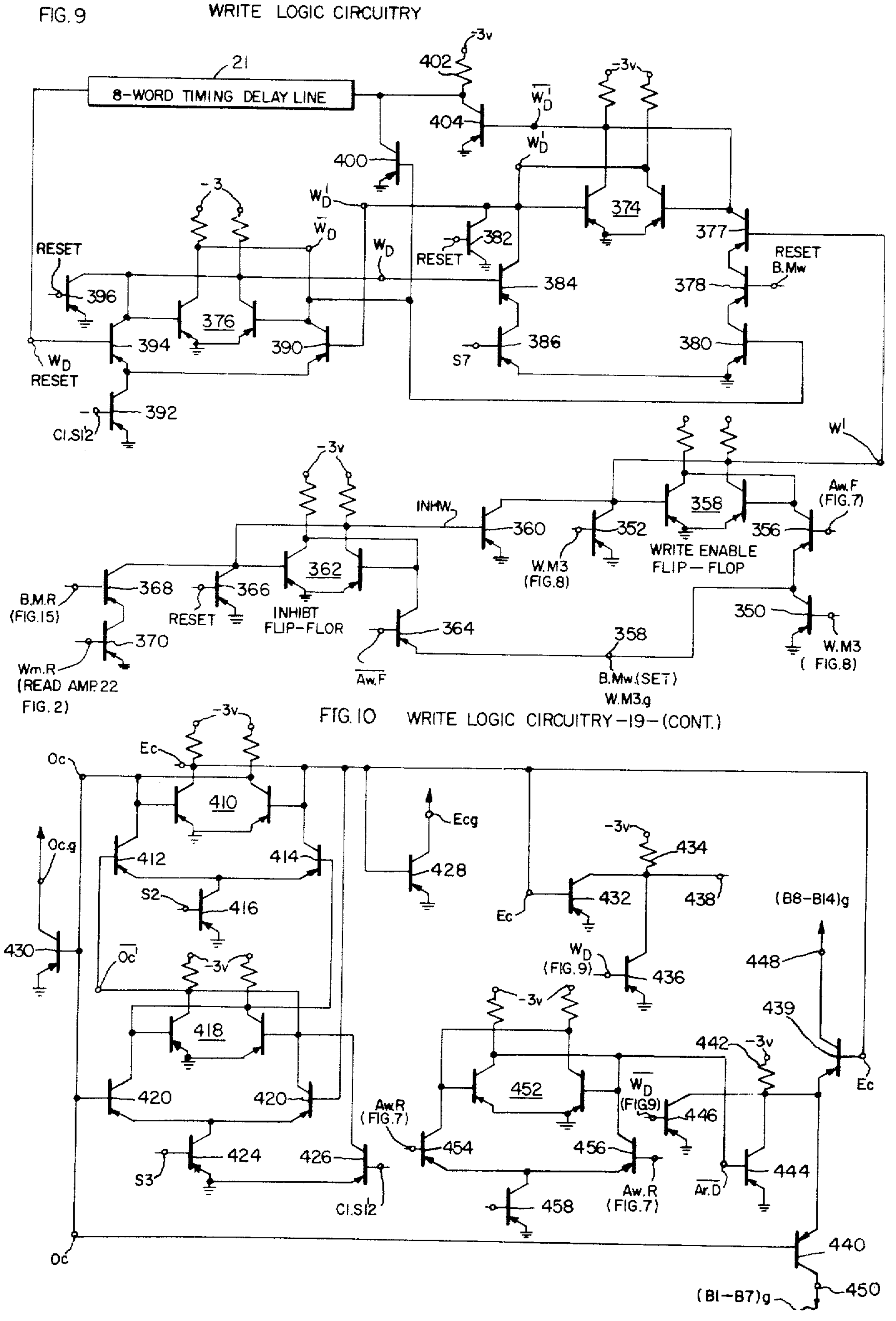

WRITE LOGIC CIRCUITRY (19) CONT.

WRITE LOGIC CIRCUITRY -19- (CONT.)

LOAD CLOCK, GATES AND DATA

FIG.23 UNLOAD RING & GATES

Jan. 25, 1966 F. A. HILL ETAL 3,231,869

INFORMATION STORAGE AND SEARCH SYSTEM

Filed April 12, 1960 29 Sheets-Sheet 16

FLIP FLOPS D1-D7 OF STORAGE REGISTER -30-

INFORMATION STORAGE AND SEARCH SYSTEM

Filed April 12, 1960 29 Sheets-Sheet 17

FLIP-FLOPS D8-D14 OF STORAGE REGISTER -30-

FLIP-FLOP D15-D21 OF STORAGE REGISTER-30-

Jan. 25, 1966 F. A. HILL ETAL 3,231,869

INFORMATION STORAGE AND SEARCH SYSTEM

Filed April 12, 1960 29 Sheets-Sheet 18

INFORMATION STORAGE AND SEARCH SYSTEM

Filed April 12, 1960

29 Sheets-Sheet 19

FLIP-FLOPS D50—D56 OF STORAGE REGISTER -30-

Jan. 25, 1966 F. A. HILL ETAL 3,231,869

INFORMATION STORAGE AND SEARCH SYSTEM

Filed April 12, 1960 29 Sheets-Sheet 21

| NULL CHARACTER READ-IN TIME | CHARACTER DELAY | 1ch | 2ch | 4ch | 6ch | CA |
|---|---|---|---|---|---|---|
| C 12 | 0 | 0 | 0 | 0 | 0 | 1010 |
| C 11 | 1 | 1 | 0 | 0 | 0 | 0000 |
| C 10 | 2 | 0 | 1 | 0 | 0 | 1111 |
| C 9 | 3 | 1 | 1 | 0 | 0 | 0111 |
| C 8 | 4 | 0 | 0 | 1 | 0 | 1011 |
| C 7 | 5 | 1 | 0 | 1 | 0 | 0011 |
| C 6 | 6 | 0 | 1 | 1 | 0 | 1101 |
| C 5 | 7 | 1 | 1 | 1 | 0 | 0101 |
| C 4 | 8 | 0 | 1 | 0 | 1 | 1001 |
| C 3 | 9 | 1 | 1 | 0 | 1 | 0001 |
| C 2 | 10 | 0 | 0 | 1 | 1 | 1110 |
| C1 | 11 | 1 | 0 | 1 | 1 | 0110 |
| X | 12 | 0 | 1 | 1 | 1 | |

KEYWORD SELECTOR 42

United States Patent Office 3,231,869
Patented Jan. 25, 1966

3,231,869

INFORMATION STORAGE AND SEARCH SYSTEM

Frank A. Hill, Van Nuys, A. J. Pankratz, La Canada, Alfred W. Sanborn, North Hollywood, and Ben T. Sato, Los Angeles, Calif., assignors to General Precision, Inc., a corporation of Delaware Filed Apr. 12, 1960, Ser. No. 21,764
9 Claims. (Cl. 340—172.5)

The present invention relates to memory systems for computers, and the like, and it relates more particularly to an endless tape type of memory system and to an improved and unique input and output system for utilization therewith.

The endless tape memory system to be described herein is of the general type described and claimed in copending application, S.N. 737,862 filed May 26, 1958 in the name of Lothar M. Schmidt. A similar type of system is also described in copending application filed December 10, 1959, in the name of Lothar M. Schmidt, Serial Number 858,788.

The memory system of the present invention is capable of storing a vast amount of data, and it finds perhaps its greatest utility in conjunction with present day digital computers and data processors. The embodiment of the invention to be described herein incorporates an endless memory magnetic tape on which information may be recorded. The information is recorded on the tape as a plurality of "blocks" which are spaced at successive block locations along the tape. The memory tape and the mechanical handling unit for the tape do not, per se, constitute part of the present invention, and the mechanical details will not be described in detail herein. The mechanical details may be similar to those described in copending application Serial No. 848,016, filed October 22, 1959, in the name of A. J. Pankratz, et al.

The present invention is primarily concerned with an improved electronic input and output system which enables the information to be read from a computer, or data processor into a memory system to be subsequently written on the endless magnetic tape; and which also permits information to be selected from the tape and subsequently introduced to the computer or data processor. For purposes of the present description, the information handled by the memory system and associated computer will be assumed to be in the form of blocks of data. Each block will be assumed to be made up of eight words, and each word will be assumed to be composed of twelve 7-bit characters. The endless magnetic tape in the embodiment of the invention to be described includes fourteen data tracks; and the information is recorded in columns extending transversely of the tracks, with each column including two of the 7-bit characters.

The blocks of data are recorded, with the composition described above, at spaced locations along the endless tape. In most of the prior art systems these spaced locations are each identified by a different fixed block address. These fixed addresses are, for example, arranged in a sequential manner on the tape and each fixed block address identifies a corresponding space or location on the tape at which a block of data is recorded, or may be recorded.

By the use of the prior art fixed block address technique described in the preceding paragraph, any particular block of information recorded on the tape at a known block address may be selected and read out of the system. However, it is evident that before any such selection may be made, the particular block address of the desired block of data must be known. Only then may the address be inserted into an appropriate search system, to enable that system to search the tape for the block of information corresponding to that address.

The system of copending application S.N. 737,862 is predicated on the principle of fixed block addresses, such as described before. In the system of that application, a block of information recorded on the tape may be selected by reference to the fixed block address of the location on the tape at which the desired block of information is recorded. However, the system of the later copending application Serial No. 858,788 utilizes, in addition to the fixed block addresses discussed above, a key which refers to the actual data block, etc. rather than to a particular location on the storage tape.

In accordance with the key concept of the copending application Serial No. 858,788, each block of data is identified by its own key and that key identifies the information itself, rather than a location on the magnetic memory tape. The key technique is advantageous in that it provides a high degree of flexibility in the storage system of the invention, and it simplifies the programming. The key concept, for example, permits each of the different blocks of data to be stored at any available block address location on the storage tape, and this is achieved without the necessity for programming each block to a corresponding block address. Searches for any particular block of data on the storage tape may be made on the basis of its key, which key relates directly to the data itself, rather than on the basis of a fixed block address which has been arbitrarily assigned to the block of data by the programmer.

The system of the present invention is also predicated on the key concept discussed above. The system of the invention furthermore dispenses completely with the use of fixed block addresses for identifying the different block locations on the recording tape. This serves to provide optimum flexibility and increases to a large extent the ease with which the improved system of the invention may be programmed.

In the embodiment of the invention to be described, for example, each block location on the endless magnetic recording tape is located by a pair of block marking recordings which are referred to respectively as the "set" and "re-set" markings. Each pair of block markings is located in a particular track on the tape, and the markings are used to designate the start of each successive block location on the tape. However, the markings do not serve to identify any particular block locations. When a block of information is to be selected from the tape, that block is identified solely on the basis of its own key. Then, if the selected block is to be subsequently re-recorded in modified form at its original block location on the tape, a "write" mark is made on the tape to locate that particular block location.

The concept and technique described in the preceding paragraph is advantageous in that it dispenses completely with the need for providing identifying block addresses for the different block locations on the tape, and it also dispenses with the requirement for logic control systems for responding to such addresses to locate a particular location on the tape at which a particular block is to be recorded.

The system described in the copending application Serial No. 858,788 is also advantageous in that it incorporates a provision whereby a search for several blocks of data recording on the tape may be simultaneously carried out. Then, as each desired block of data is found, it may be quickly read out of the system and into the associated computer. This latter feature provides for a rapid accessibility of data in the memory system, since it enables a plurality of blocks of wanted information to be obtained in a single revolution of the storage tape. The system of the present invention, in the embodiment to be described, also utilizes the concept of multiple search, and the invention provides a unique improved simplified and precise control system for carrying out that concept.

The embodiment of the present invention to be described is advantageous in that it uses dynamic means for buffering the information from the computer prior to its being recorded on the magnetic tape. Such dynamic means is also used for buffering the information selected from the magnetic tape prior to its being introduced to the computer or data processor. This dynamic buffering of the information provides a rapid and precise means for passing the information from the computer to the tape, and for selecting and passing the information from the tape to the computer.

Another important feature of the system of the present invention is in the use of improved clocking techniques. In the embodiment to be described, each of the dynamic buffer networks is clocked at the computer block rate and by the computer block or bit timing pulses. Also, as each block of information is recorded on the recording tape, the clock pulses relating to that block are recorded at the same time. This assures that the information recorded on the tape will be perfectly synchronized with its associated recorded clock pulses. Difficulties have been encountered in the past when multi-track recording was attempted on a magnetic tape with pre-recorded clock pulses.

In the drawings:

FIGURES 3 to 6 are timing diagrams which are useful in explaining the operation of the invention;

Figures 1, 2:
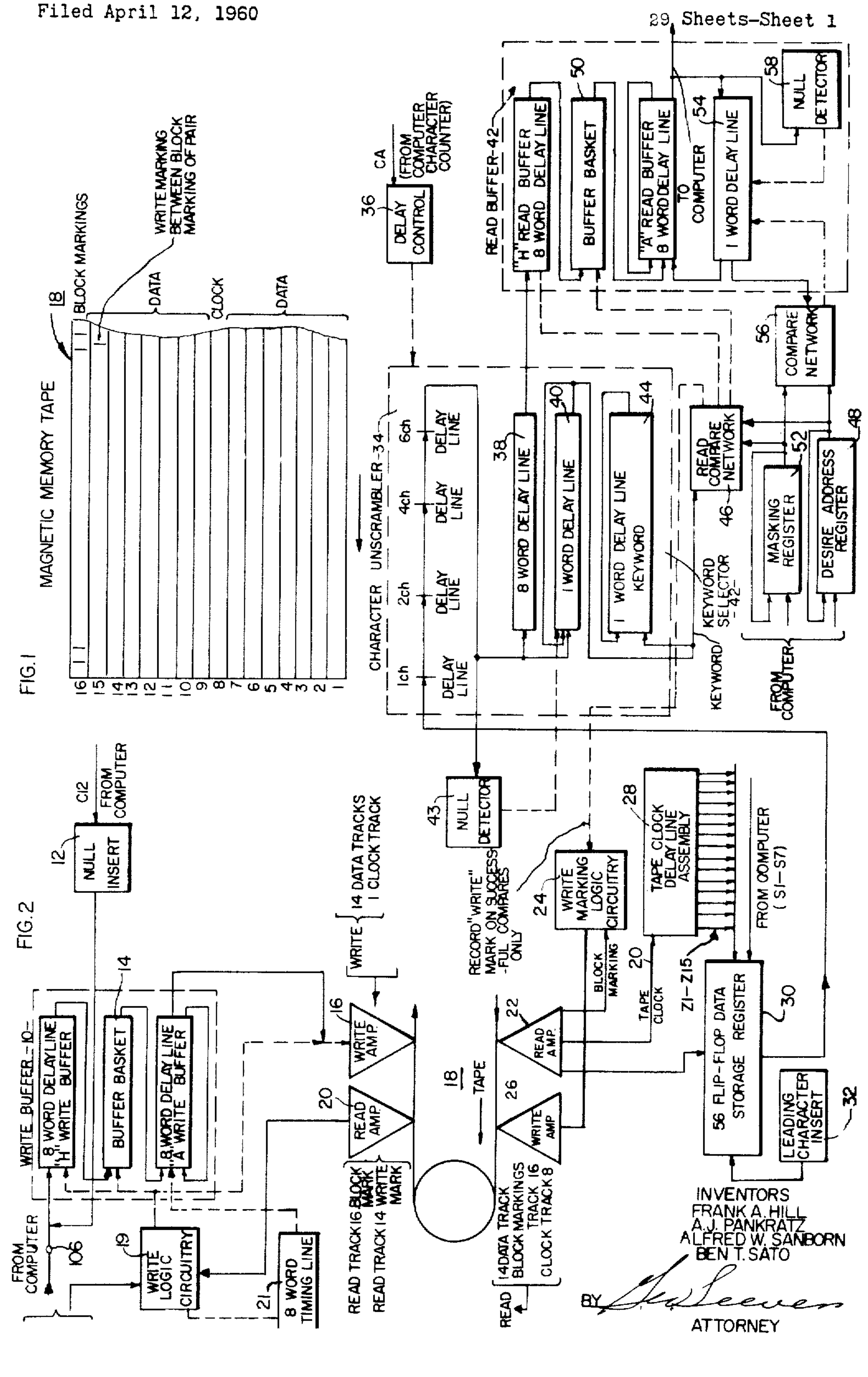
FIGURE 1 is an enlarged fragmentary diagrammatic view of a section of the magnetic storage tape used in a constructed embodiment of the invention, the illustrated tape being provided with fourteen data tracks, a central clock track, and a separate track for a plurality of pairs of block markings.
FIGURE 2 is a functional block diagram of the system of the invention and illustrates in general the operation of the endless tape memory system of the invention.
Figure 7A:
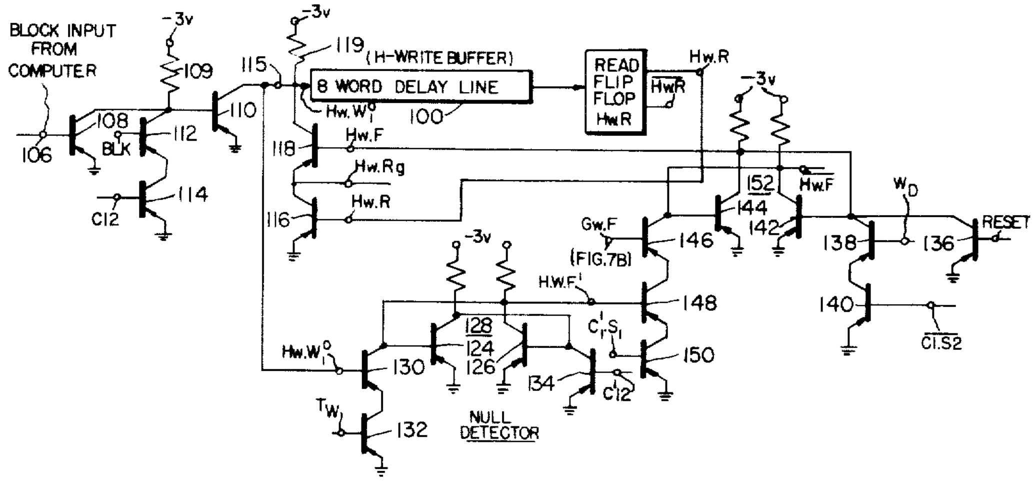
Figures 7B, 7C:
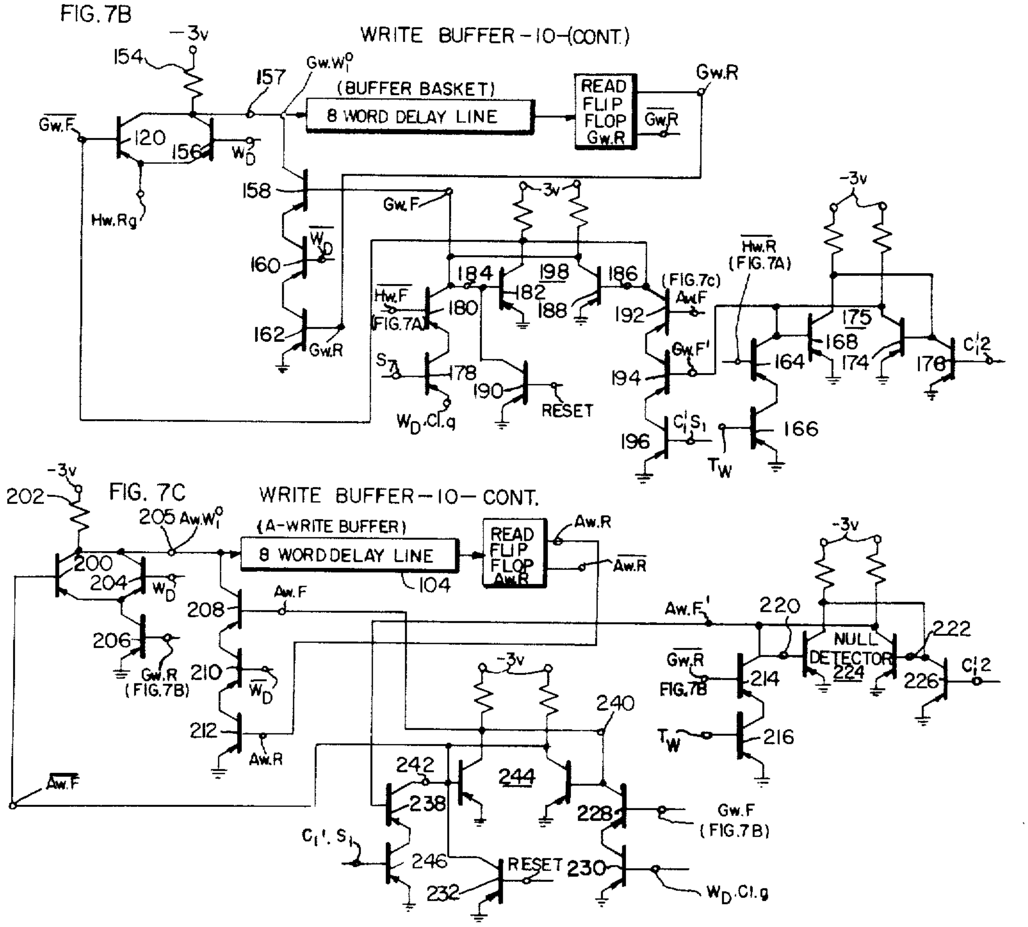
Figure 8:
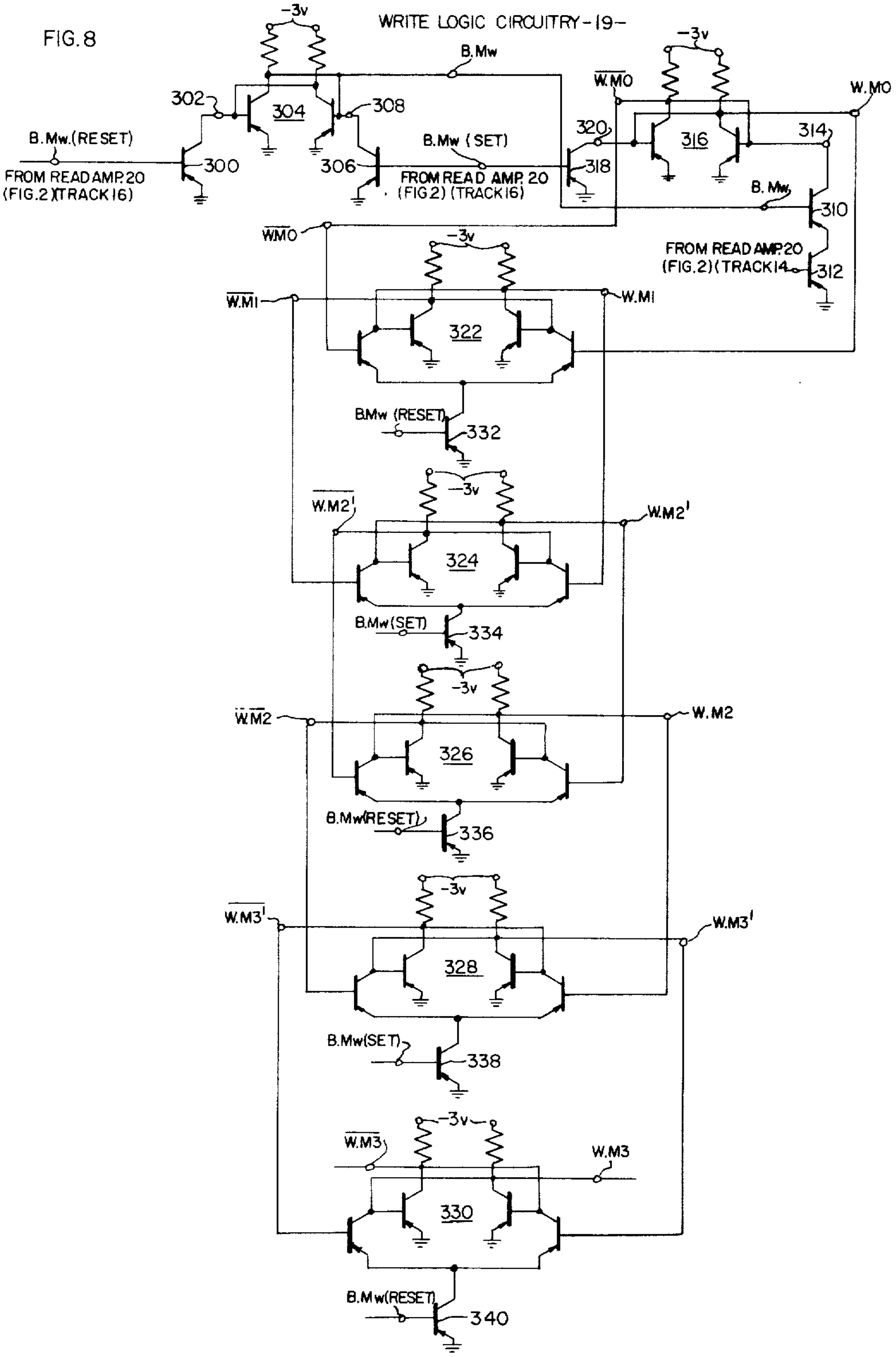
Figure 13:
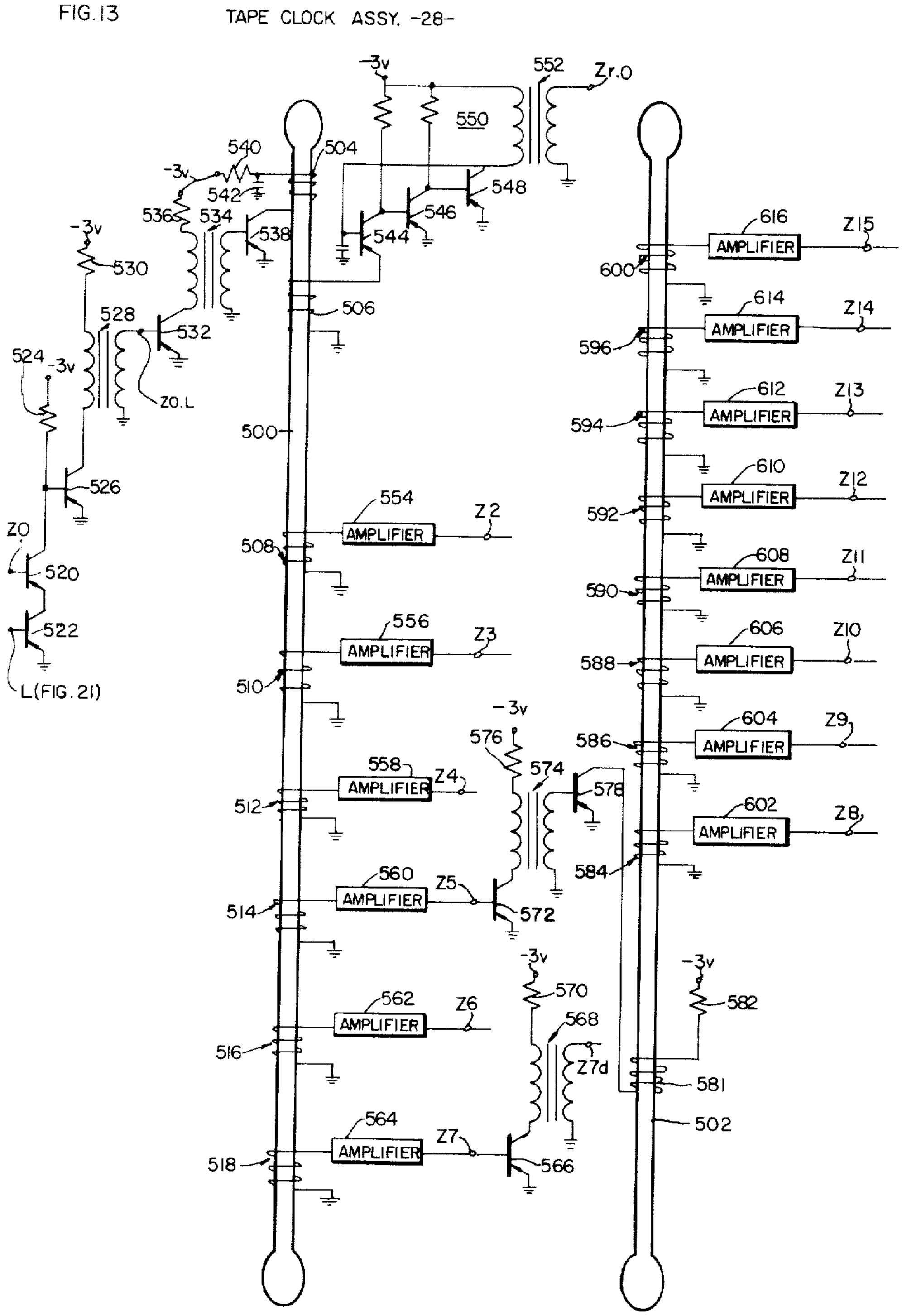
Figure 14:
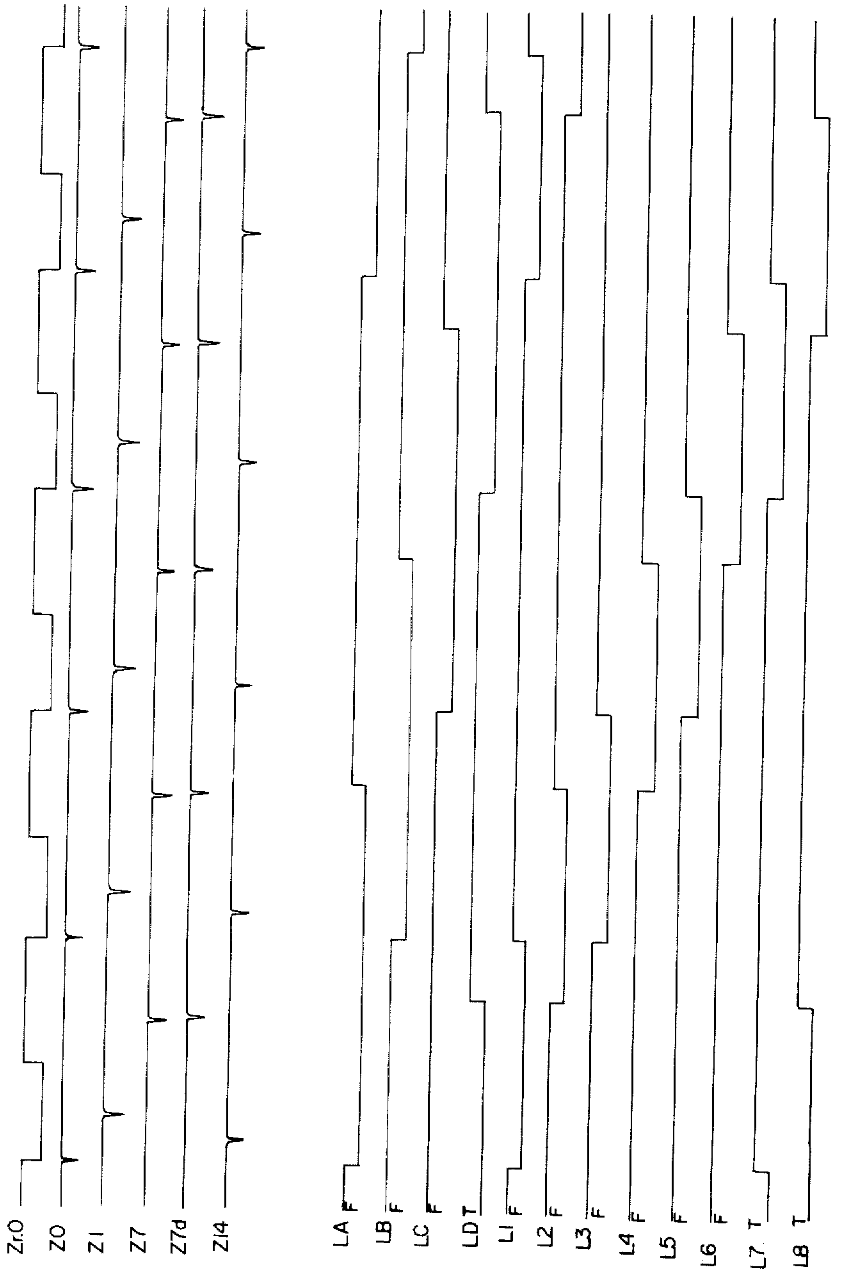
Figures 15, 16, 17:
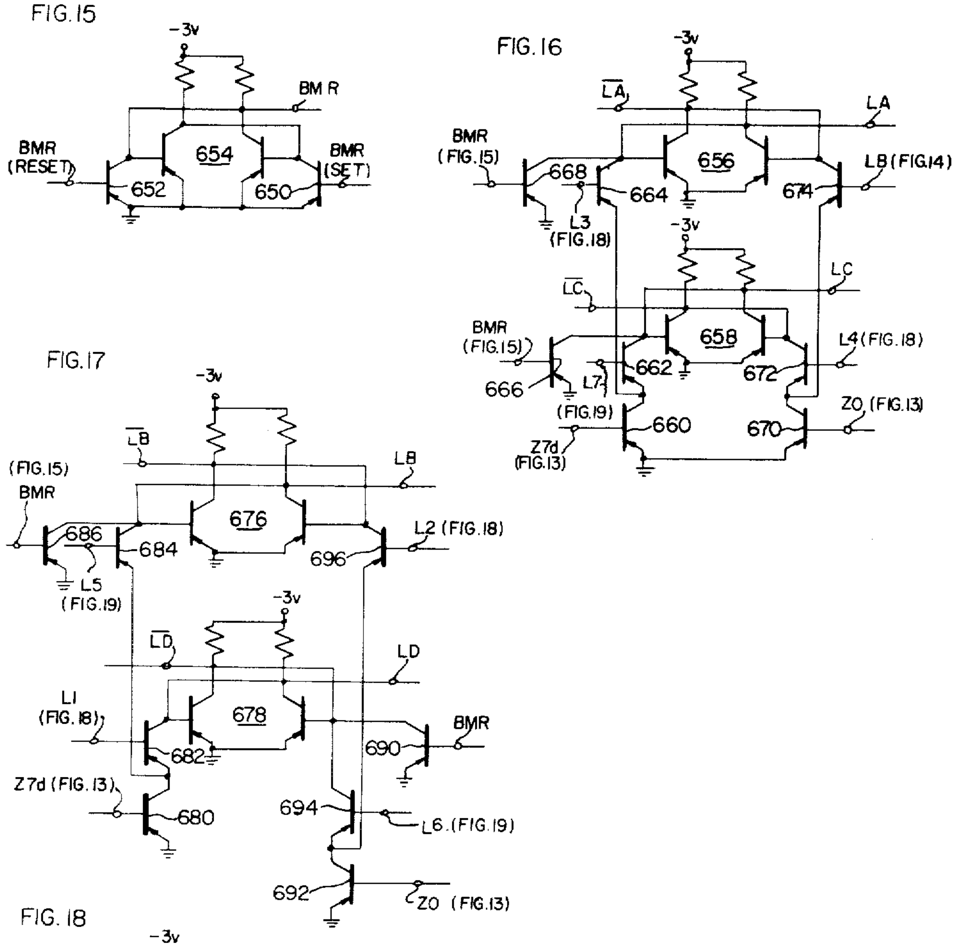
Figures 20, 21, 22:
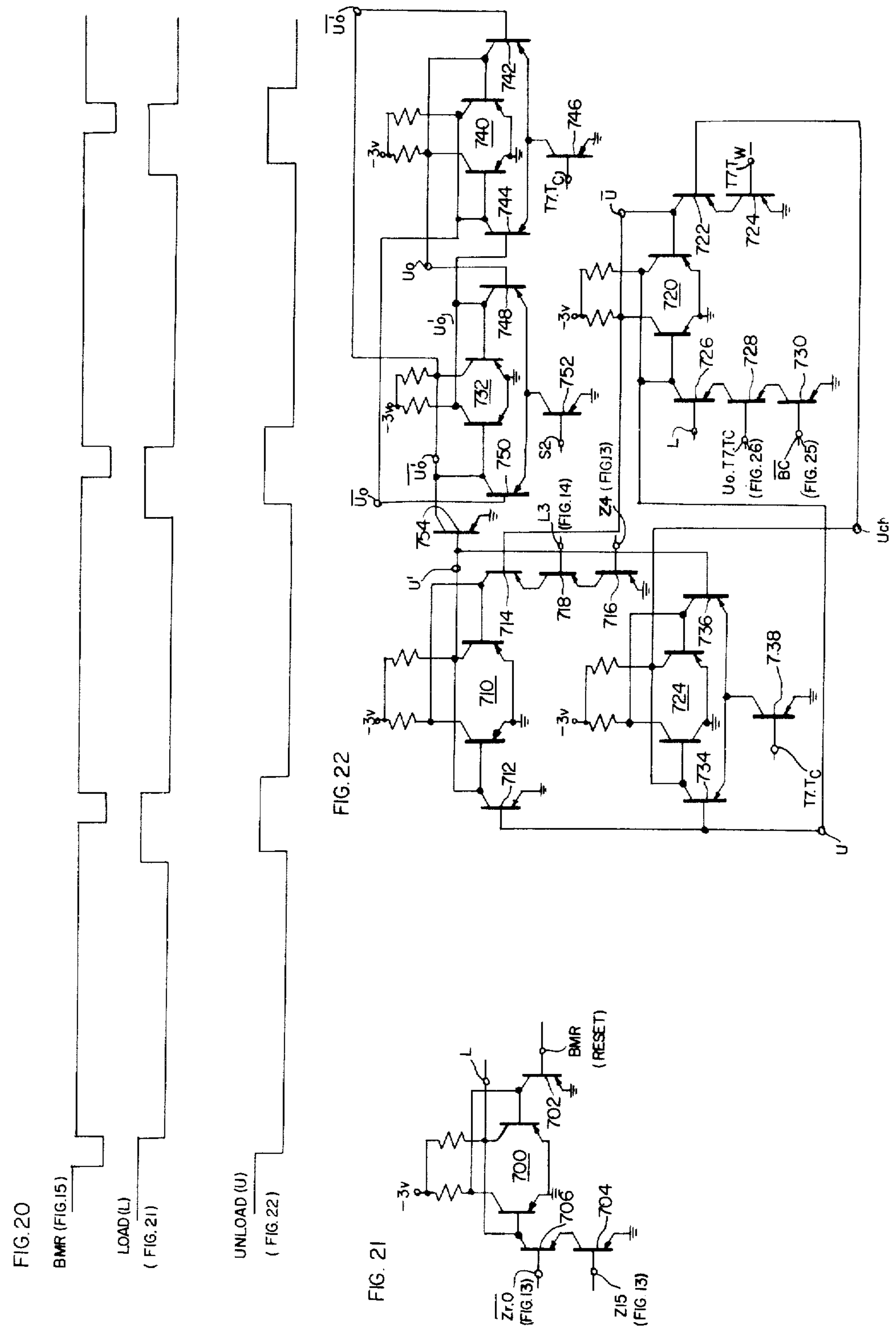
Figure 23:
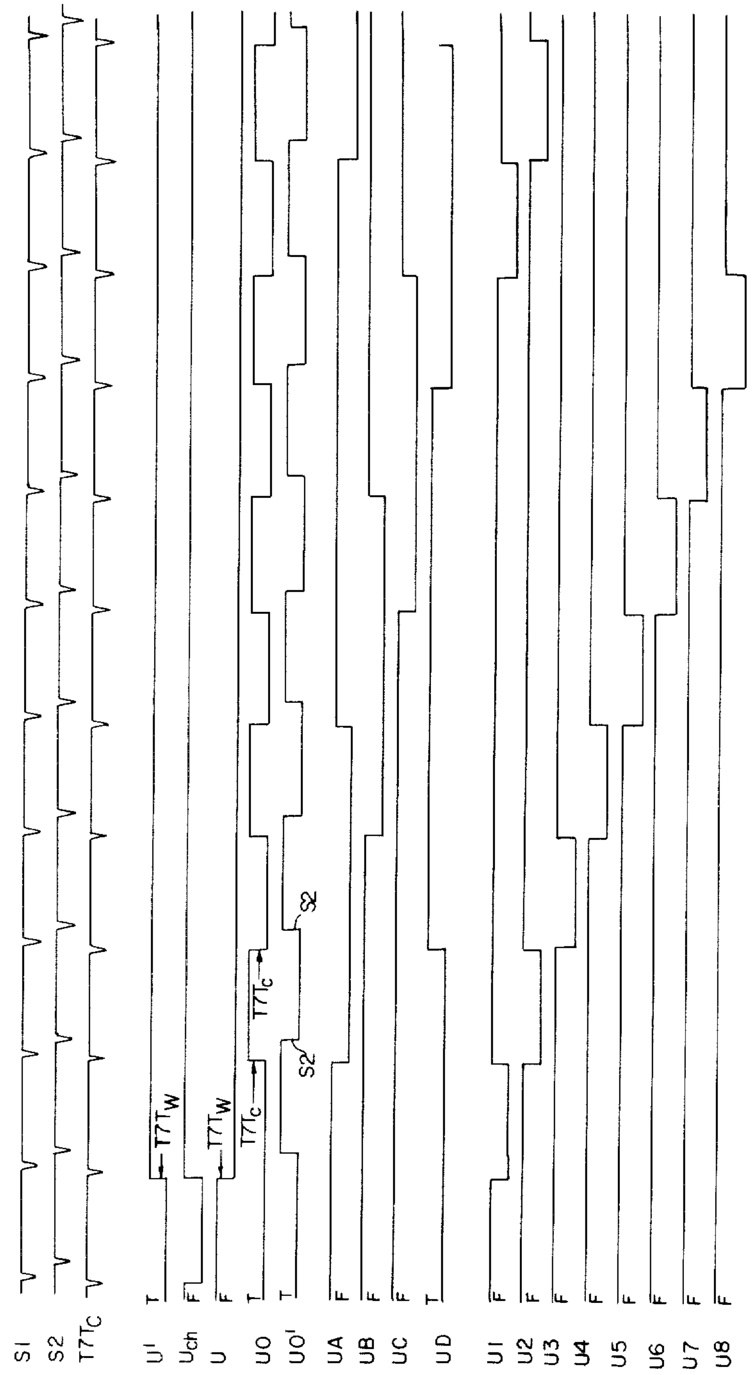
Figure 36:
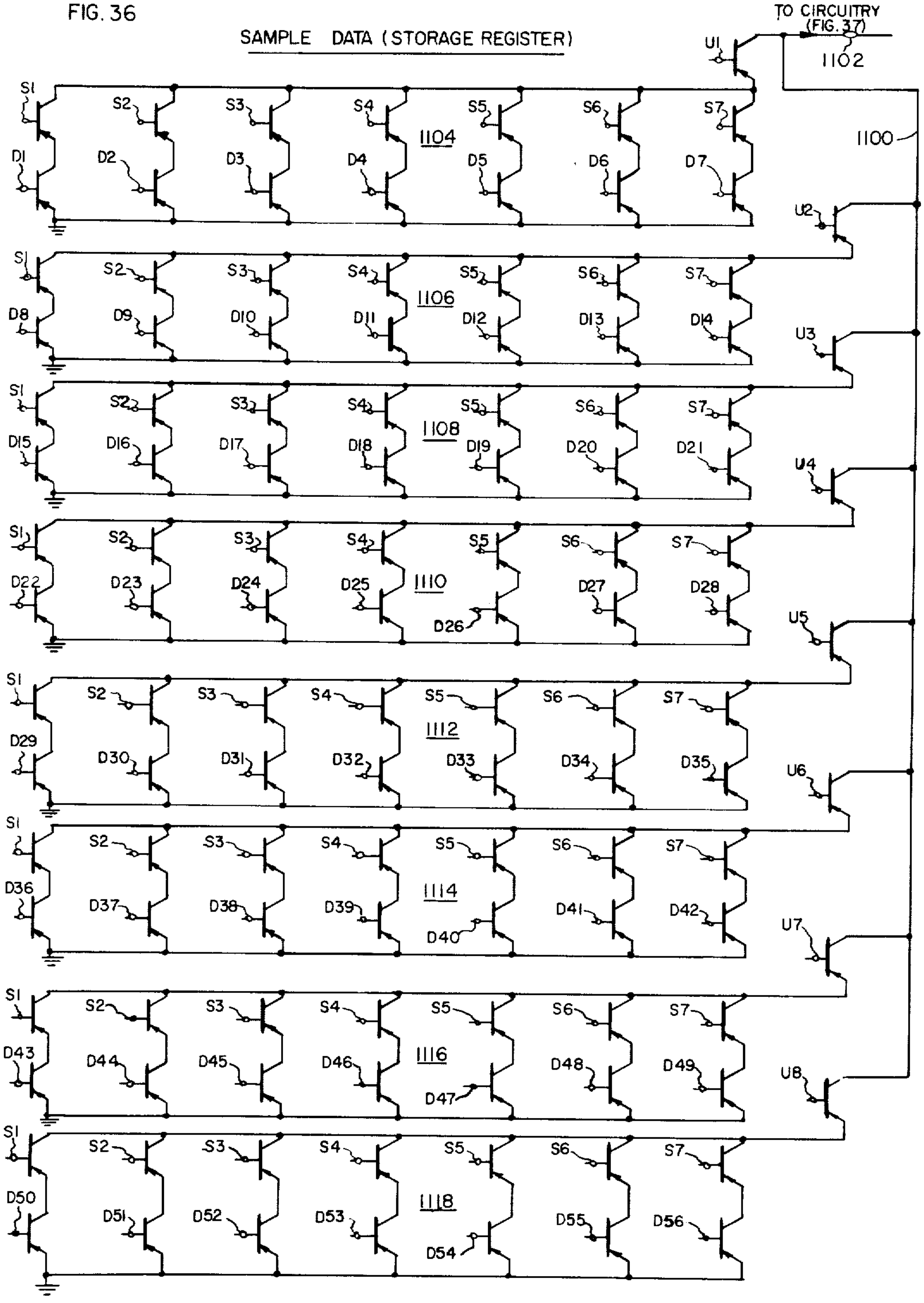
Figure 37:
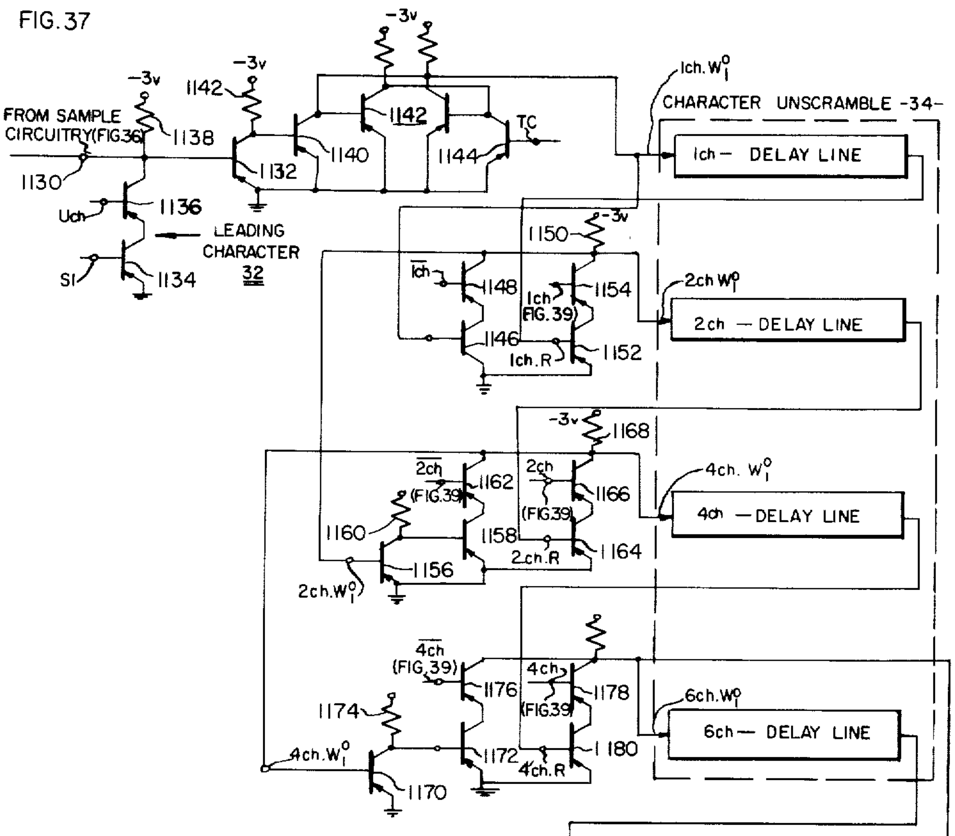
Figure 38:
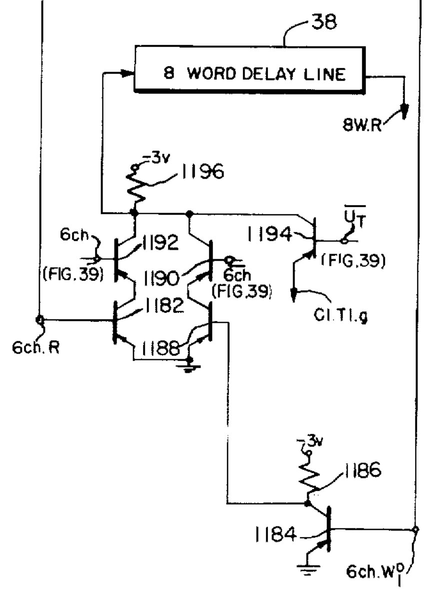
Figure 39:
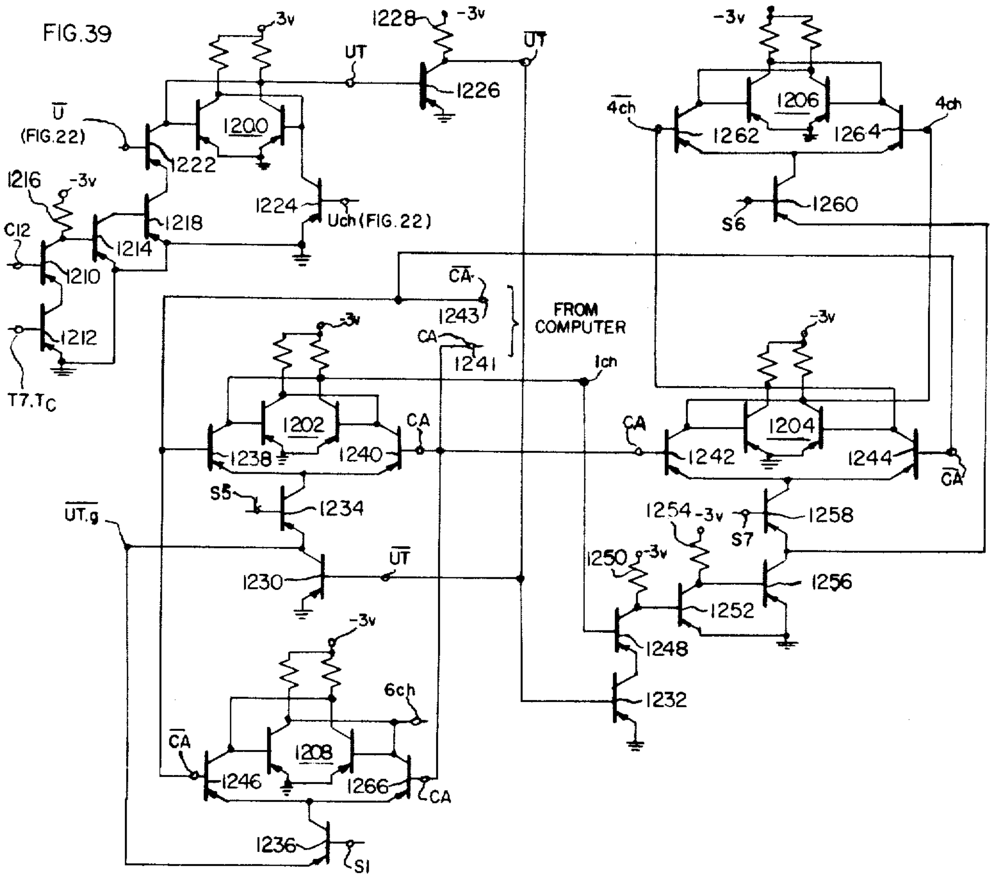
Figure 42:
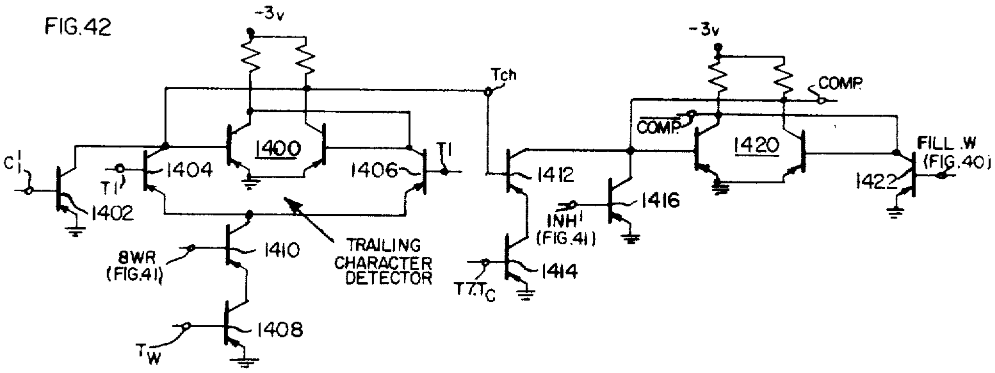
Figures 40, 41:
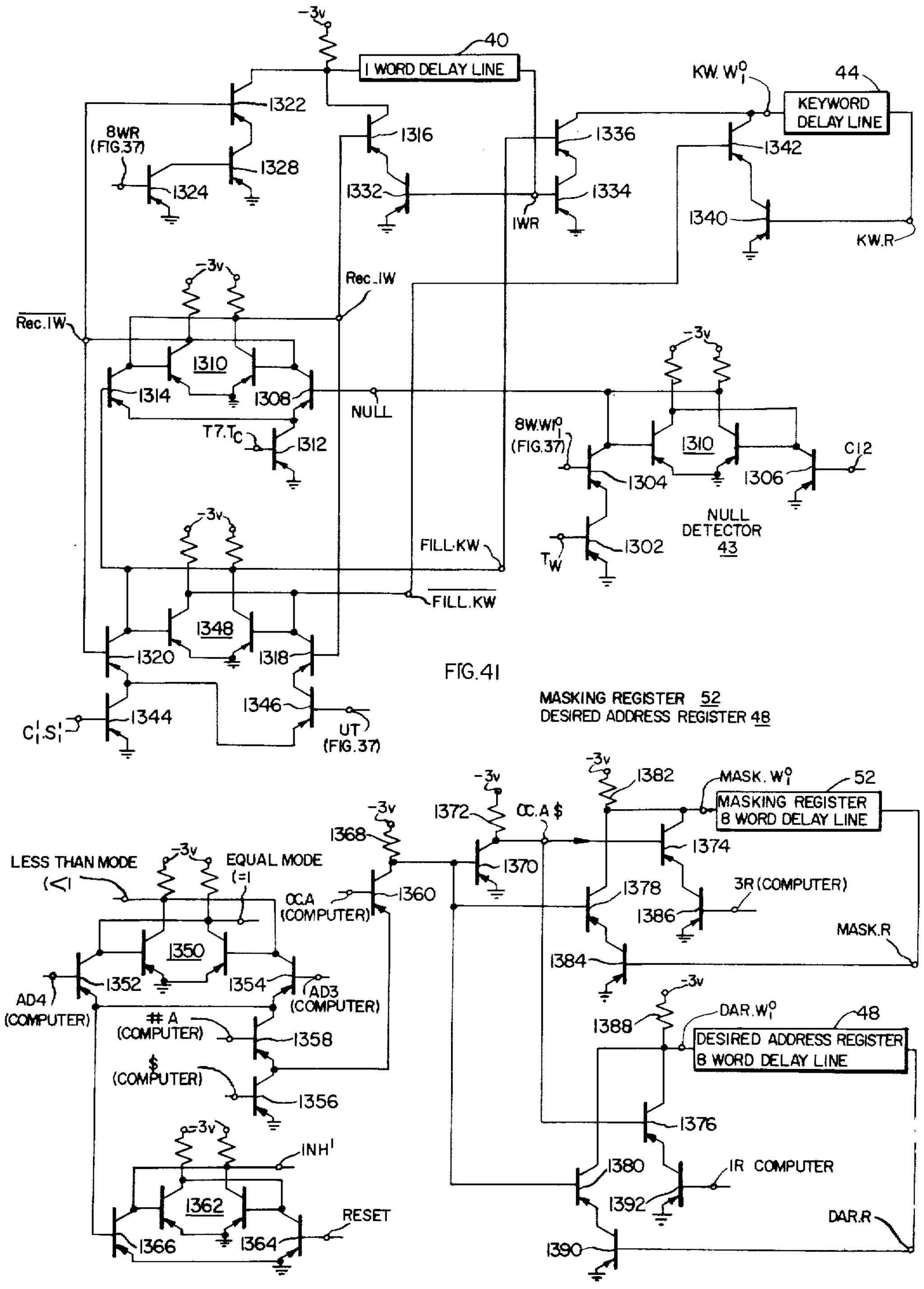
Figure 43:
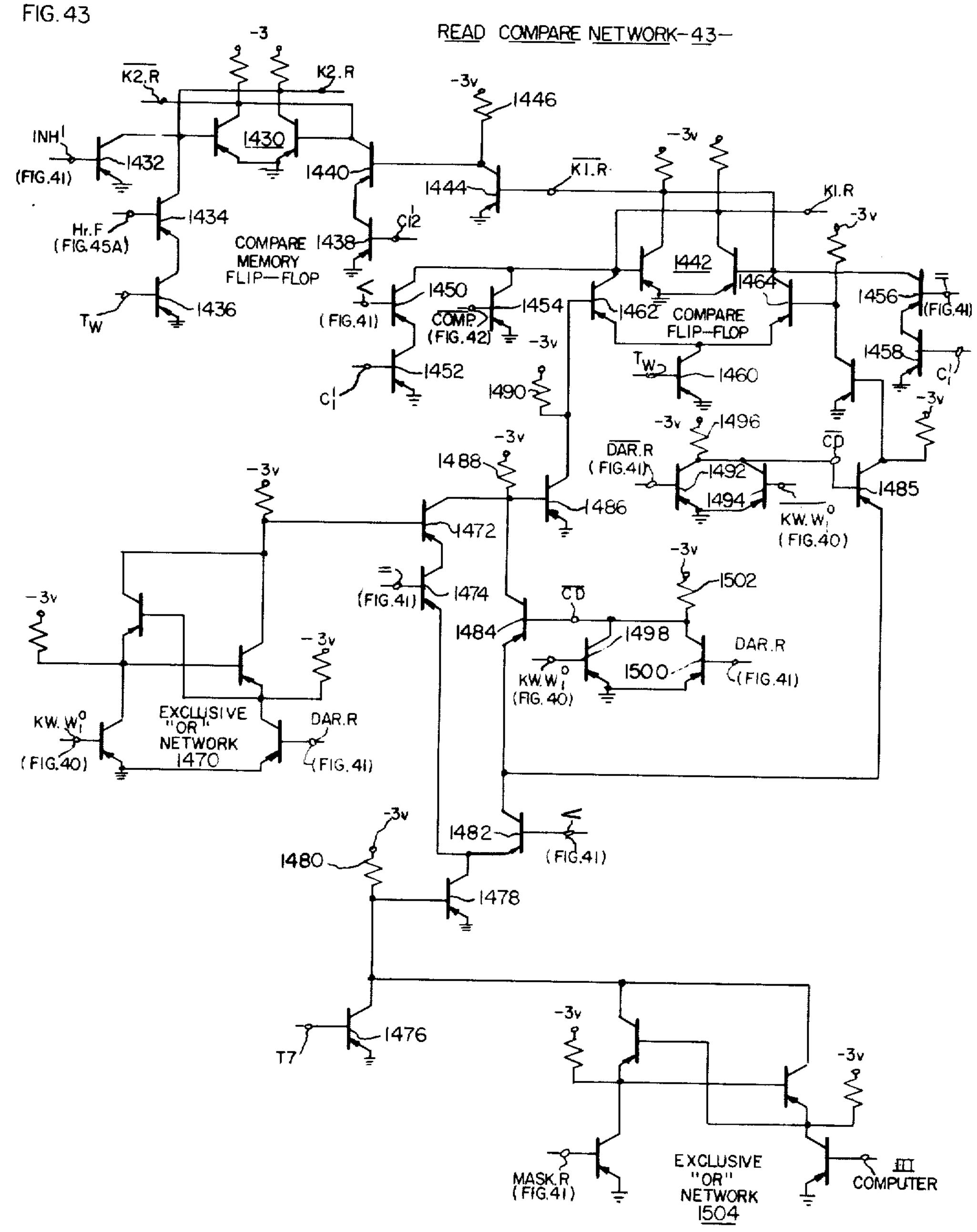
Figure 44:
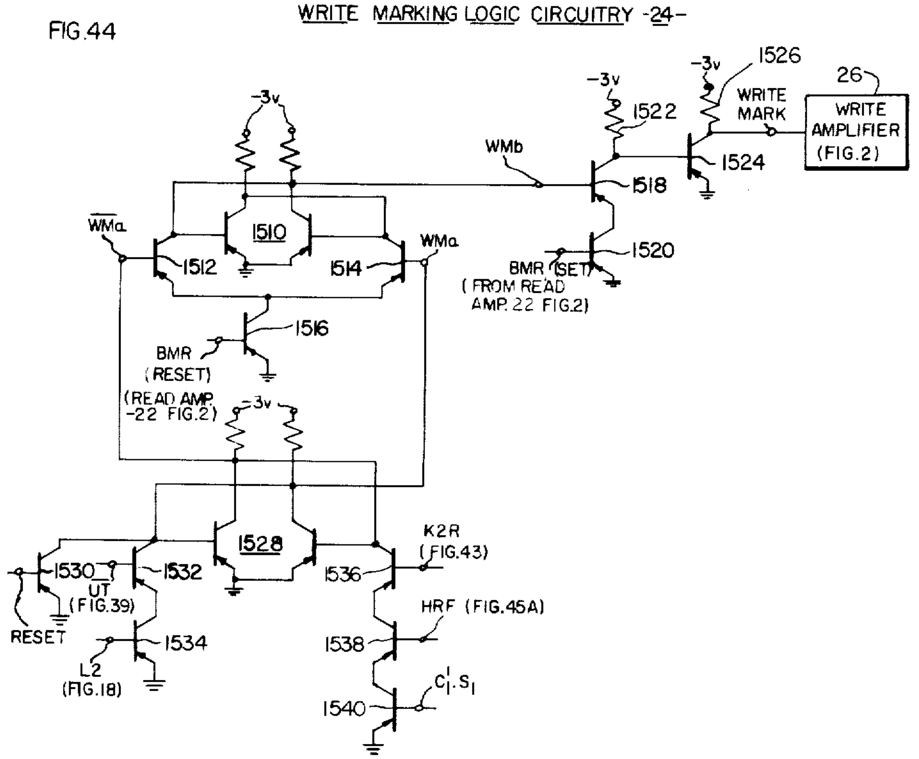
Figure 45A:
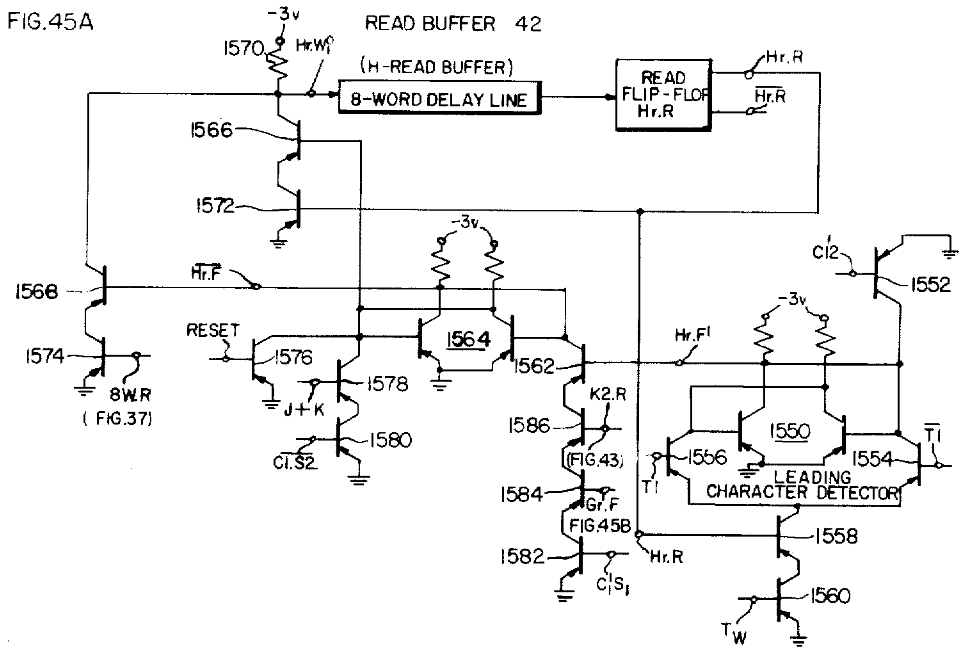
Figures 45B, 45C:
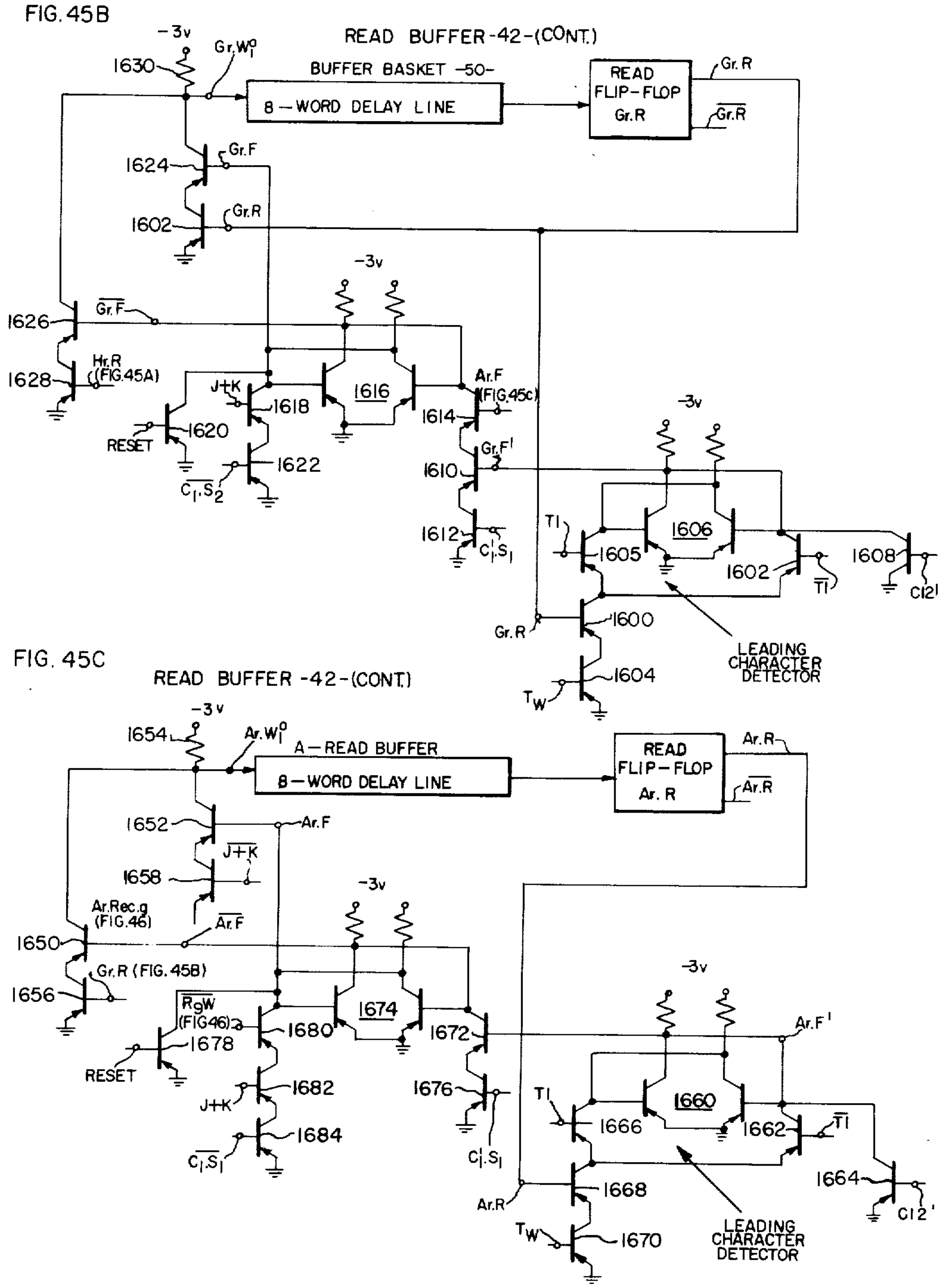
Figure 46:
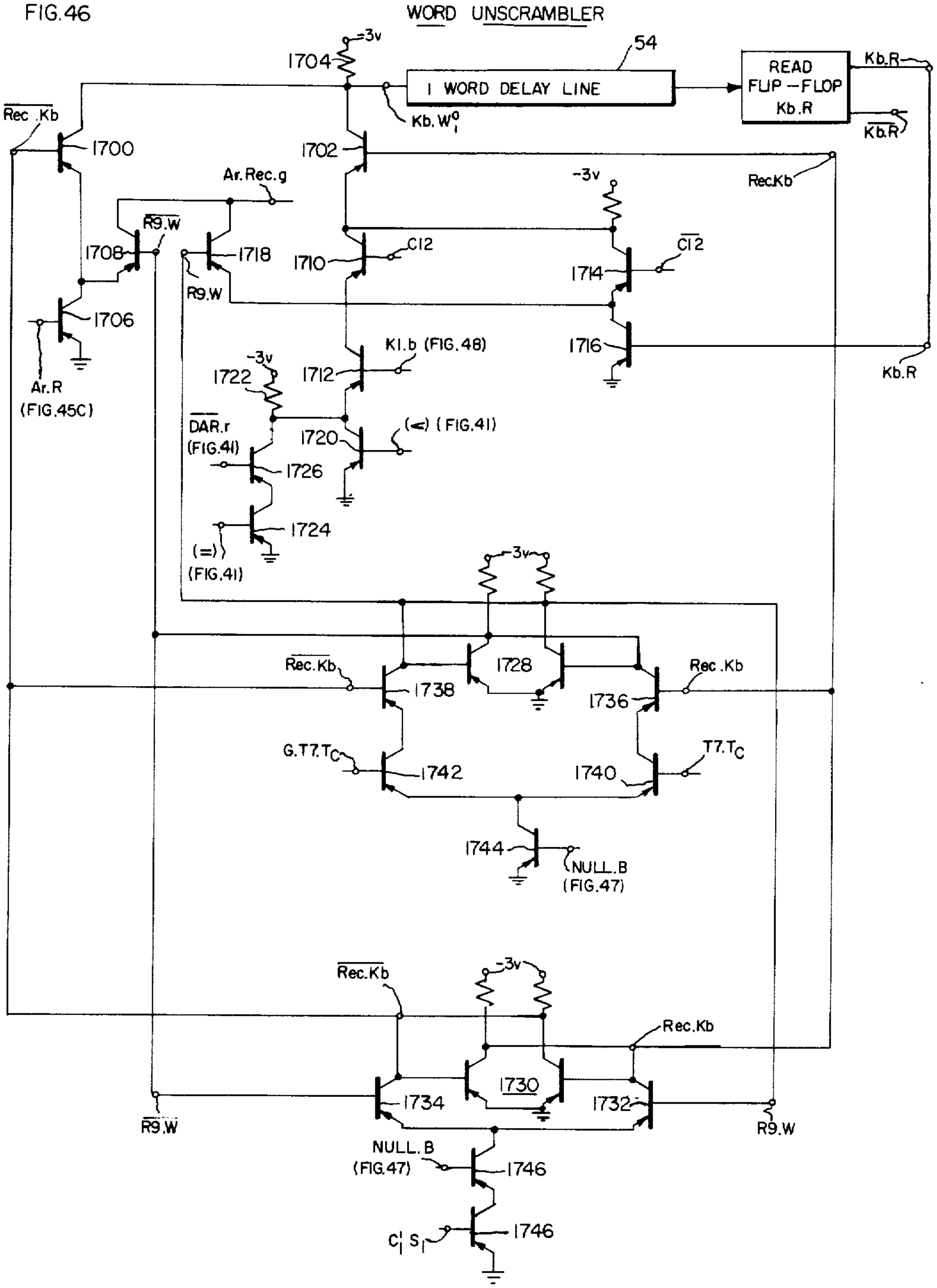
Figure 47:
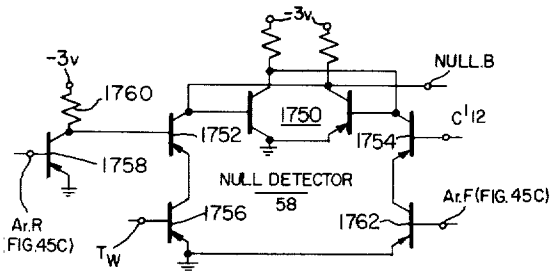
Figures 48, 49:
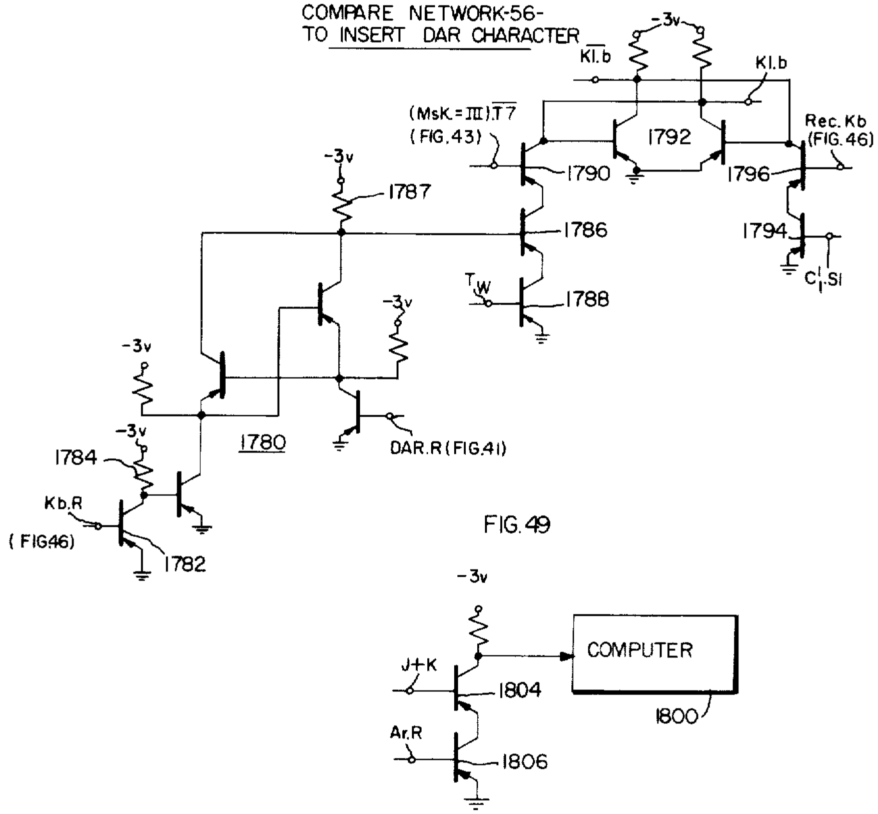

FIGURES 7*a*, 7*b* and 7*c* are logic circuit diagrams of an input write buffer included in the system of FIGURE 2; these logic circuit diagrams illustrating the manner in which information may be read into the write buffer and circulated in that buffer, and also illustrating the manner in which an indication is made when the buffer is full;

FIGURES 8, 9, 10, 11 and 12 are circuit diagrams of certain logic control circuitry which controls the recording of information from the write buffer of FIGURE 7*a* and 7*b* and 7*c* onto the magnetic memory tape unit included in the system of FIGURE 2;

FIGURE 13 is a circuit diagram of a tape clock delay line assembly which serves to respond to clock signals recorded on the magnetic memory tape and to use such signals for producing regularly timed pulses;

FIGURE 14 is a timing diagram which is useful in explaining the operation of the system which selects and reads certain blocks of information from the memory storage tape;

FIGURE 15 is a control circuit which responds to certain block markings on the magnetic memory storage tape to provide an indication of the beginning of each successive block location on the tape;

FIGURES 16–19 are logic diagrams of a control system for timing the removal of information from the memory storage tape;

FIGURE 20 is a timing diagram which is useful in explaining the means by which information is removed from the memory storage tape, loaded into a storage register and subsequently unloaded from the storage register;

FIGURE 21 is a logic diagram of a flip-flop circuit which serves to form a load term which in turn controls the loading into the storage register of information from the magnetic memory tape;

FIGURE 22 is a logic circuit diagram of a control system which serves to control the unloading of information from the storage register;

FIGURE 23 is a timing diagram illustrating certain signals which are used to control the unloading of the storage register;

FIGURES 24–27 are circuit diagrams illustrating appropriate logic circuitary which also assists in controlling the unloading of the storage register;

FIGURES 28–35 are circuit diagrams of a plurality of flip-flop circuits which serve to make up the storage register referred to above;

FIGURE 36 is a logic circuit diagram of control circuitary which is used for sampling data stored in the storage register;

FIGURE 37 is a circuit diagram of a control system which is controlled by an associated computer, and which control system serves to correlate the character timing of information read out of the storage register with the character timing of the associated computer;

FIGURE 38 is a table illustrating a succession of flip-flop configurations in correspondence to a corresponding succession of character times in the associated computer;

FIGURE 39 is a circuit representation of a logic control system associated with the character correlation circuitry of FIGURE 37;

FIGURE 40 illustrates in circuit detail a suitable system for selecting a key word out of the block of information selected from the magnetic memory tape;

FIGURE 41 illustrates the circuitry that may be used for storing desired address words from the computer so that such words may be compared with the key word selected by the circuitry of FIGURE 40;

FIGURE 42 is a detector circuit which serves to detect the key words in the block on information selected from the magnetic memory tape and to cause that word to be stored in the selector circuit of FIGURE 40;

FIGURE 43 is a circuit diagram of suitable comparison circuitry for causing the key word in the selecting system of FIGURE 40 to be successively compared with each of a plurality of desired address words stored in the circuitry of FIGURE 41;

FIGURE 44 is a circuit diagram of suitable writing circuitry which causes write markings to be entered on the magnetic memory tape to indicate the block location of information selected from the tape;

FIGURES 45*a*, 45*b*, 45*c* represent the various components of a read output buffer included in the system of FIGURE 1 and control circuitry for causing information to be circulated and stored in that buffer and further control circuitry for indicating when the buffer is full;

FIGURE 46 illustrates control circuitry which correlates the word times of the information circulated in the read output buffer with the word times of the associated computer;

FIGURES 47 and 48 illustrate control circuitry for assisting the circuitry of FIGURE 46 in correlating the word times of the information in the read output buffer with the word times of the associated computer, and also for causing a charatcer from a corresponding word in the desired address circuitry of FIGURE 41 to be inserted in the information in the output buffer; and FIGURE 49 is a diagram illustrating the manner in which the information in the read buffer may be controllably introduced to the associated computer or data processor.

The tape memory system of the invention includes briefly a magnetic storage tape on which the information is recorded by means of a plurality of read heads which are magnetically coupled to different channels or tracks on the tape. The system also includes an input, or write, buffer which receives the data to be recorded from the computer associated with the system. Finally, the system includes an output, or read, buffer which receives selected information from the tape and which holds that information until it is appropriate for it to be introduced into the associated computer.

The magnetic storage tape, as will be described, includes a track which contains block markings representative of the start of each block location on the tape. The block location at which a block of information is to be recorded is designated by a "write" marking in the start of that block location. To write an 8-word block of data on the tape, the block is first introduced into the input, or write, buffer. The successive block markings and the write markings are then sensed and then at the start of the next computer word time after the sensing of these markings, an entire block of information is serially written into the designated block location on the tape. The 8-word block of data written into the designated block location is selected from a circulating dynamic register in the input buffer, and the word times of the recorded block have no relation to the computer times.

A series of clock pulses are also written on a clock track of the magnetic storage tape as the block of information is being recorded in the designated block location. The 8-word block of information is written in fourteen data tracks, for example, with a pair of 7-bit characters being written from track to track in serial form between each successive ones of the clock pulses. It should be stressed that the bits of each pair of characters written on the magnetic storage tape are displaced along the tape from one another by respective particular intervals, with fourteen of these bits being disposed between each pair of clock pulses in the clock track of the tape. Each word of the 8-word block is made up, for example, of six pairs of characters.

The system of the present invention does not use a fixed block address concept, as noted above, instead, each 8-word block of information includes a key word, which, in turn, contains information identifying the particular block. The key word, like the other words, is made up of twelve 7-bit characters, and is itself identified by a null character (1111111) at the twelfth character position of the key word.

Each block of data on the magnetic storage tape is subsequently read into a flip-flop storage register, and the information is read out of that register in serial form and at the computer bit times. The resulting blocks of information successively derived from the flip-flop storage register are examined to select their key words, and these key words are compared with each of a plurality of desired key words which are set up in a desired address register. Upon each successful comparison, the corresponding block of information derived from the register is read into the output, or read, buffer for subsequent introduction to the computer. The readout operation also involves certain synchronizing and correlating processes, and these processes serve to correlate the timing of the characters and words of the selected blocks of information in the output buffer with the character times and word times of the associated computer.

The fragmentary representation of FIGURE 1 shows, as mentioned above, a portion of the magnetic storage tape, this portion being shown on an enlarged scale. As illustrated in FIGURE 1, the magnetic storage tape includes sixteen tracks which extend lengthwise along the tape. The tracks are numbered 1–16 in FIGURE 1. Track number 8 appears near the center of the magnetic storage tape, and this track is used to record the clock pulses. The clock pulses are preferably recorded in a center track, so that slight skewing of the tape will not result in the loss of a clock pulse.

As will be described in more detail subsequently, a new set of clock pulses are recorded in the track 8 of the tape as each new block of information is recorded on the tape. As also to be described, the fourteen bits of each pair of data characters making up the 12-character words of the 8-word blocks are recorded from track to track in serial manner between successive clock pulses.

The data tracks, as shown in FIGURE 1, include the tracks 1–7 and 9–15. The data, as mentioned previously, is recorded in these tracks between successive clock pulses, as pairs of 7-bit characters. The magnetic storage tape also includes a track 16, and this latter track includes a pair of block markings at the beginning of each block location on the tape. As mentioned above, the leading block marking of each pair is designated the "set" marking and the trailing block marking of each pair is designated the "re-set" marking. Under no circumstances is data ever recorded between two block markings of the particular pairs. However, to identify a particular block location on the tape which is to receive a block of data, a write marking is recorded in the data track 15, for example, between the block markings of the particular pair designating that block location.

The write marking in track 15 is sensed first by a read head which is displaced from the write heads along the magnetic storage tape in the opposite direction to the direction of motion of the tape. When such a write marking is sensed by the read head, the associated logic circuitry causes zeros to start to be written on the magnetic storage tape at a time corresponding to the corresponding "set" block marking on the tape. These zeroes are written in all the data tracks and they continue to be written (erasing the write marking in track 15), until the first word time as sensed from the computer. The logic system begins looking for the first word time from the computer after the corresponding re-set block marking on the tape is sensed by the read head. Then, beginning at the following first word time of the computer, the block of data is written in serial form in the following block location on the magnetic storage tape.

In the block diagram of FIGURE 2 the solid lines between the blocks in general represent the flow of data signals and the broken lines in general represent the introduction of control signals. As illustrated in FIGURE 2, the system includes a write or input buffer 10. The write buffer 10 is of the dynamic circulating type, and it includes an 8-word delay line H. A selected 8-word block of information from the computer is introduced to this 8-word delay line in the buffer 10. As the block of information is inserted, a null insert circuit 12 inserts a null character (111111) in the twelfth character position of the key word of the block to identify the key word. This null character is of the type which cannot normally be handled by the computer without producing parity error indications.

The write buffer 10 also includes a dynamic circulating buffer basket 14, and the output from the delay line H is introduced to the buffer basket. The buffer basket includes a plurality of 8-word delay lines. These delay lines are interconnected so that successive 8-word blocks of information from the delay line H may be stored in different ones of the delay lines in the buffer basket. The output from the buffer basket 14 is connected to an 8-word delay line A in the write buffer 10. This is the output register of the buffer 10, and whenever a block of information is to be written on the magnetic storage tape, that block is first introduced into the delay line A.

The output terminal of the delay line A in the write buffer 10 is connected to a plurality of write amplifiers 16. These write amplifiers are connected to respective write heads (not shown), and the write heads are magnetically coupled to different tracks of the magnetic memory storage tape. The magnetic memory storage tape is indicated schematically in FIGURE 2 as 18. This tape, in the manner described in the copending application Serial No. 848,016 is looped around suitable transport reels, and is moved past the write heads associated with the write amplifiers 16. These write heads are coupled to respective ones of the fourteen data tracks on the tape and to the clock track.

Appropriate logic circuitry 19 controls the write amplifiers 16, so that the clock pulses are successively recorded in the track 8 by the corresponding write head associated with that track, and so that the write heads associated with the data tracks 1–7 and 9–15 may be successively activated between each successive pair of clock pulses. This enables the binary bits of each pair of characters to be recorded between the successive pairs of clock pulses to be serially introduced to the appropriate write heads.

A pair of read amplifiers 20 are coupled to a corresponding pair of read heads. These read heads are magnetically coupled to the tape and they are displaced from the write heads associated with the amplifiers 16 in a direction opposite to the direction of motion of the tape. These particular read heads are respectively coupled to the tracks 14 and 16, and they serve to read the block markings and the write marking in those respective tracks.

Suitable logic circuitry represented by the block 19 responds to the reading of a write marking by the read head associated with the amplifiers 20, and to the reading of the associated re-set block marking to cause the write heads associated with the write amplifiers 16 to write zeroes into the block location designated by the write marking and to perform other controls, which will be described. An 8-word timing delay line 21 is coupled to the write logic circuitry 19 and to the A write buffer, for reasons to be described.

As noted, zeros are written in all the data tracks at the beginning of the block location on the magnetic memory tape 18 on which a block of information is to be recorded, and these zeros start with the corresponding set block marking. The zeros cause the write marking to be erased from the track 15. When the re-set block marking is sensed by the appropriate read head associated with the read amplifiers 20, an interval is started which is terminated by the beginning of the next computer word time. At the termination of that interval, the write heads associated with the write amplifier 16 stop writing zeros into the block location, and these write heads begin writing the data derived from the A delay line in the write buffer 10. Also, the appropriate write head starts writing clock pulses into the track 8. As mentioned above, the word times of the block written in the designated memory location on the tape 18 have no relation to the computer word times.

In order that a selected block of data may be read from the magnetic tape 18, a plurality of read heads is coupled to the tape and to a corresponding plurality of read amplifiers, as designated by the block 22. These read heads read the fourteen data tracks, and they also read the block track 8 and the block marking track 16. The signals corresponding to the block markings derived from the amplifier from the corresponding amplifier are introduced to a write marking logic circuitry, designated by the block 24. This circuitry is connected to a write amplifier 26, which in turn is coupled to a write head which serves to write the write marking in the track 15. The logic circuitry 24 responds to a successful compare signal, which indicates a desired block of information has been found. The logic circuitry 24 then causes the write head associated with the write amplifier 26 to record a write marking at the proper position in the track 15 to identify the block location of the desired block of information. This permits that block location to be subsequently relocated; so that the block of information, in a changed and modified form, may be re-recorded at its original block location on the tape 18.

The read amplifier included in the amplifiers 22, which amplifies the tape clock pulses $Z_0$, introduces these clock pulses to a delay line system 28. This tape clock delay line system incorporates a plurality of intermediate output terminals, and these output terminals produce fourteen successively timed output pulses in response to each clock pulses $Z_0$ read from the magnetic storage tape. The output pulse $Z_1$–$Z_{14}$ from the tape clock system correspond to the tape bit times of each pair of characters recorded on the tape between successive ones of the tape clock pulses $Z_0$.

The amplifiers in the group of read amplifiers 22 which respond to the data bits on the magnetic storage tape and amplify those bits, introduce the resulting electrical signals corresponding to the data bits in serial form to a group of 56 flip-flops in a data storage register 30. Each block of information is loaded into successive ones of the flip-flops in the data storage register under the control of the tape bit timing pulses $Z_1$–$Z_{14}$ derived from the tape clock delay line system 28. Shortly thereafter, the information is successively read out of the storage register 30 under the control of bit timing signals $S_1$–$S_7$ derived from the computer. For reasons to be described, the leading character of the leading word of the block of information introduced into the storage register is formed into a null character (111111) by a null insert network 32.

As each block of information is read in serial manner out of the storage register 30, the bit times of that information are synchronized with the bit times of the computer. Also, each word read out of the storage register is read in sequence, starting with the first character of the word. However, the timing of the words themselves does not necessarily correspond to the word timing in the block of information originally derived from the computer. Also, although the characters of each word are in proper sequence, they do not necessarily coincide with the corresponding character times of the computer. For that reason, the information read out of the storage register 30 is first introduced to a character unscrambler 34. This unscrambler includes, for example, a one character delay line, a two character delay line, a four character delay line, and a six character delay line. A delay control unit 36 selectively introduces different ones of the delay character lines into the character unscrambler 34, under the control of the character counter of the computer. The information emerging from the character unscrambler 34 now has its character times and its bit times both correlated with the character and bit times of the computer. However, the word times of the block of information may still be out of step with the word times of the computer.

The block of information emerging from the character unscrambler 34 is introduced to an 8-word delay line 38 and to a 1-word delay line 40 in a key word selector 42. A null detector 44 is coupled into the circuit, and the null detector responds to the null character of the key word to trap the key word in the 1-word delay line 40. The actual location of the key word in the block of information emerging from the character unscrambler 34 is unknown. However, each word of the block of information is read into the 8-word delay line 38 and into the 1-word delay line 40. Sometime before the first bit of the block of information reaches the end of the delay line 38, the null detector 44 will have discovered the key word by sensing its null twelfth character. The null detector will then set the 1-word delay line 40 into a recirculating mode, so that the key word is recirculated in the circuitry of the delay line 40.

The information from the delay line 38 is then read directly into an 8-word delay line H in a read output buffer 42. At the same time, the key word from the delay line 40 is introduced to a one-word delay line 44. The key word is circulated eight times in the circuitry of the delay line 44, and at each circulation is introduced to a read compare network 46 to be compared with different ones of eight desired address words in a desired adder register 48. When a successful comparison is realized, the block of information read into the H read buffer delay line in the read buffer 42 is passed on to a buffer basket 50 in that buffer. Otherwise, the information is passed out of the H read buffer and is discarded.

Therefore, each successive block of information read from the magnetic storage tape 18 is read into the 8-word delay line 38, and the key corresponding to that block is trapped in the key word delay line 44. Each block of information is then read into the H read buffer delay line in the read output buffer 42. The blocks of information for which successful comparisons are realized, are circulated in the H read buffer; or these blocks are circulated down into the buffer basket 50, and into an A read buffer 8-word delay line in the read buffer. All the other blocks of information passing through the H read buffer are discarded.

The desired addresses are introduced into the desired address register 48 from the computer associated with the system. The desired address register 48 may be, for example, an 8-word dynamic recirculating register. Each word introduced to the register may represent the key of each of a plurality of different desired blocks of information, and these words are successively introduced to the compare network 46. As mentioned above, the key word delay line 44 introduces its trapped key word eight times to the compare network 46, so that a comparison may be made between that key word and each of the words in the desired address register 48.

The system may also include a masking register 52. This latter register may also be an 8-word dynamic recirculating register. Under the control of the computer, certain bits and characters in the masking register 52 are used to mask corresponding bits and characters of particular words in the desired address register 48 to enable the system to make comparison on the basis of portions of the information contained in the key word and in the words in the desired address register.

Before a block of information in the read buffer 42 is introduced to the computer, the block is first read into the A read buffer 8-word delay line in the read buffer 42 and circulated in the A read buffer. The block of information now circulating in the A read buffer is correlated with the associated computer as to character times and bit times in the described manner. However, the block of information at the outset is not synchronized as to word times. This latter synchronization is carried out in a manner to be described by means of a 1-word delay line 54. A compare network 56 and a null detector 58 are used in a manner to be described to replace the null character of the key word of the block of information in the A read buffer by an identifying character from the corresponding word in the desired address register 48. This serves to identify the block with respect to the word in the register 48 with which it was successfully compared.

Upon an appropriate command from the computer, the block of information in the A read buffer, correlated with the computer as to word times, character times and bit times, is introduced from the A read buffer to the computer.

Certain timing signals are used in the system of FIGURE 2 which are derived from the computer associated with the system of the invention. These timing signals are set out in the curves of FIGURES 3, 4 and 6, and by the table of FIGURE 5. Most of these timing signals are described in detail in copending application, S.N. 832,522, which was filed August 10, 1959, in the name of Frank A. Hill.

As noted briefly above, the digital data utilized by the system of the invention is in the form of a plurality of individual blocks of information. A block of information is the greatest quantity which is transferred within the system at any one time. As was also explained above, each block is made up of eight words with each word being constituted by twelve 7-bit characters.

A clock signal $T_C$ (FIGURE 3) is generated in the computer and this clock signal has a negative going pulse which occurs once for every bit time. In addition to the clock signal $T_C$, a pair of clock signals $T_W$ and $T_R$ are also developed within the computer. The $T_R$ clock signal is the read clock, and its negative pulses occur just prior to the corresponding pulses of the $T_W$ write clock signal. The write clock signal $T_W$ occurs just prior to the clock signal $T_C$. The use of three clock signals, as explained in the copending Hill application Serial No. 832,522, permits data to be read, processed and written within a single clock interval.

Figure 3:
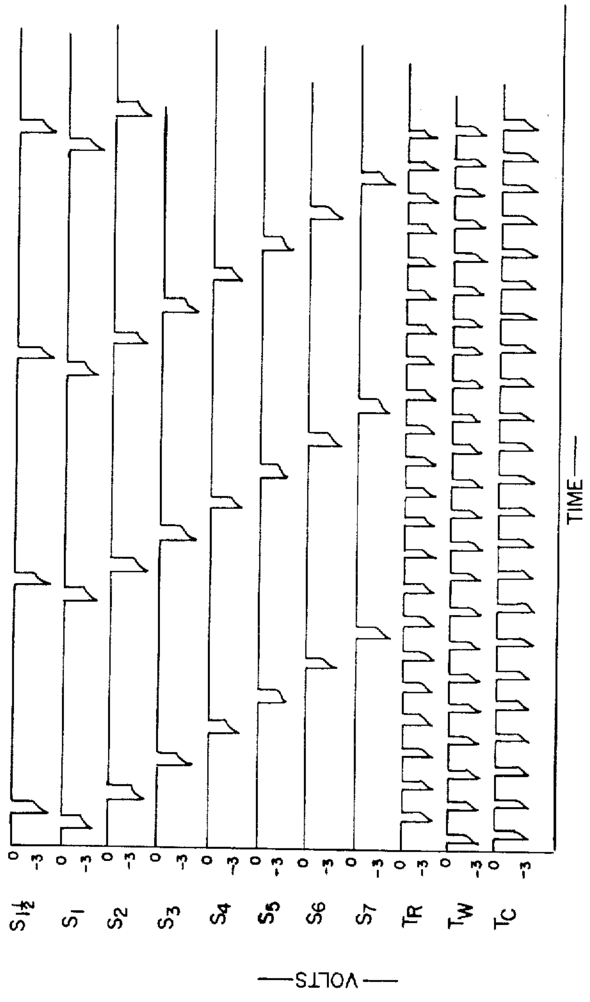

A series of bit timing signals S1–S7 are also developed in the computer, these signals also being shown in FIGURE 3. The bit timing signal S1 has a negative pulse which occurs at the first bit time of each character, the bit timing signal S2 has a negative pulse which occurs at the second bit time of each character, and so on. A signal S1½ is also developed, and this latter signal, which is a bit timing signal, has pulses which occur between the first and second bit times of each character, as shown in FIGURE 1.

Figure 4:
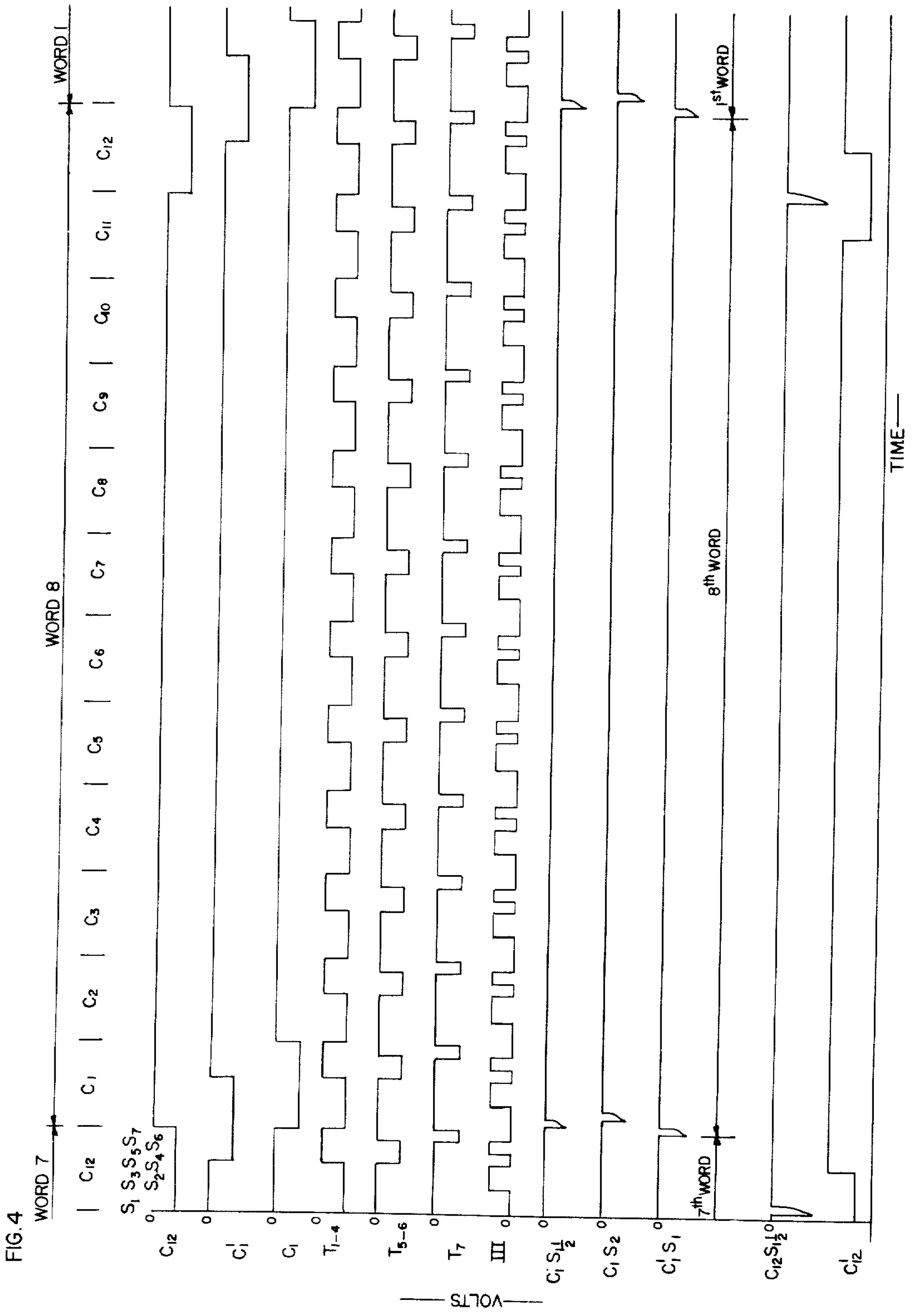

The curves of FIGURE 4 show a series of timing signals as they occur in the computer, for example, during the eighth word time of a block of information. It will be remembered that each word is made up of twelve seven-bit characters. The character timing signal C12 has a negative pulse which occurs at the twelfth character time of each word. Likewise, the character timing signal C1 has a negative component which occurs at the first character time of each word. The character timing signal C'1 is similar to the character timing signal C1, with the exception that the former is shifted forward in time by several bits with respect to the latter. A timing signal C1.S1½ is also developed in the computer, and this latter signal has a negative spike which occurs between the first and second bit times of the first character time of each word. Also developed is a timing signal C1.S2 which has a negative spike during the second bit time of the first character of each word, and a signal C'1.S2 is developed which has a negative spike occurring just before the first bit time of the first character of each word. Likewise, a signal C12.S1½ is developed which has a negative spike occurring between the first and second bit times of the twelfth character of each word.

A signal T1–T4 is also developed in the computer, and this signal goes negative from the first to the fourth bit times of each character of each word. Likewise, a signal T5–T6 is produced in the computer, and this latter signal goes negative for the fifth and sixth bit times of each character of each word. A signal T7 is developed which goes negative for the seventh bit timing of each character of each word.

In like manner, other T signals are developed in the computer which are negative for identified bit times of each character of each word. A "decimal zero" signal III is also developed in the computer, and this signal is controlled to be negative for the first and second bit times of each character of each word and for the fifth bit time of each character of each word.

A character count signal is also developed within the computer, and this signal is represented by the table of FIGURE 5. The signal is designated as the "CA" signal, and it is used to identify the character times of each word in the block. The character count signal CA is produced in a manner described in the copending Hill application S.N. 832,522. This signal is constituted by a seven bit code, and the signal has a negative component for each bit when that particular bit is a one. The four right hand bits of each component of the CA signal in the table of FIGURE 5 represent the character number of the corresponding character, and the three left hand bits of each component in the CA signal in the table represent the word in which the particular character is located.

For example, at the beginning of each block of data, the first character of the first word is designated by the term 100110. Of this term, the portion 0110 represents the first character of any word, and the portion 100 represents the first word. In like manner, the second character of the first word is represented by the designation 1001110, and so on. It will be seen, therefore, that each character of the CA signal has a different designation corresponding with the different characters of the different words throughout each block of information. In each instance, however, the four right hand bits are the same for any particular character, regardless of the word in which that character happens to appear, and the three left hand bits are the same for any particular word, regardless of the character time in that word. The shift from one word to the next is made by the 11th and 12th characters of the preceding word, for timing reasons.

Figure 6:
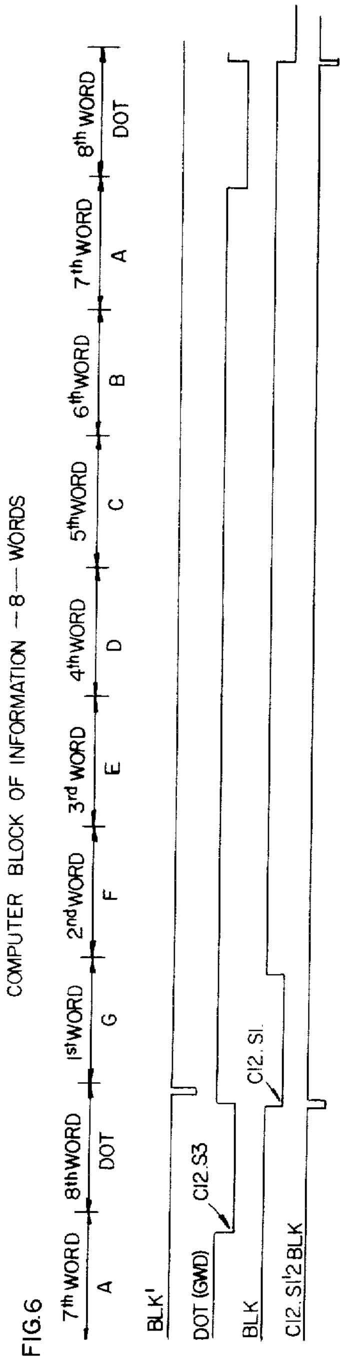

FIGURE 6 includes a representation of a particular block of information in which the eight words are successively designated as G. F. E. D. C. B. A and dot. Certain timing signals are also shown in FIGURE 6 and have particular time relationships with the block of information. A timing signal BLK' is illustrated in FIGURE 6, for example, and this timing signal has a negative going spike occurring at the beginning of the first word G in the block. A second timing signal dot' is also illustrated in FIGURE 6. This latter timing signal has a negative portion which occurs just before the beginning of the dot word time and which ends just before the end of the dot word time. More precisely, the leading edge of each negative component of the dot' timing signal occurs at C12.S3 time of the seventh word time and the trailing edge of each negative going component occurs at C12.S3 time of the eighth word time in the block.

A BLK timing signal is also illustrated in FIGURE 6, and this latter timing signal has a negative component which is initiated just before the first word time in the block, and which is terminated just before the end of the first word time in the block. That is, the BLK timing signal includes negative components, each having a leading edge occurring at C12.S1 time of the eighth word time in the block and terminating at C12.S1 time of the first word time in the block.

A timing signal C12.S1½.BLK is also illustrated in FIGURE 6, and this latter timing signal has a negative spike which occurs at S1½ bit time of the twelfth character time of the eighth word in the block. That is, the negative spikes of the latter timing signal occur just before the beginning of each successive block time. A further timing signal C1.BLK is also shown in FIGURE 6, and it has a negative component at the beginning of each new block time. The negative component of the latter signal occurs during the first character time of the first word time in each block.

The input write buffer 10 of FIGURE 2 is shown in more detail in FIGURES 7*a*, 7*b* and 7*c*. The function of this buffer is to receive successive blocks of information from the computer associated with the system of the invention, and to store the blocks until they can be recorded by the system on the magnetic memory tape 18. The blocks of information received from the computer are successively introduced to an input terminal 106 of the input write buffer 10.

As shown in FIGURE 7*a*, the terminal 106 is connected to the base of a transistor 108. This transistor, and the transistors in the logic circuitry to be described in the present specification, may all be of the PNP type, and may be of any suitable known construction capable of performing usual gating functions. The circuitry to be described includes a plurality of transistors which are connected as "and" gates or as "or" gates. These gates are well known to the electronic digital computer art. As is well known, an "and" gate requires that all its input terms be true, before its output term is true. An "or" gate, on the other hand, requires only that any one of its input terms be true before its output term is true.

The emitter of the transistor 108 is grounded, and the collector is connected to a resistor 109 and to the base of a transistor 110. The resistor 109 may have a resistance of 4.7 kilo-ohms, and it is connected to the negative terminal of the 3-volt direct voltage source. The timing signal C12 is introduced to the base of a transistor 112, and the timing signal BLK is applied to the base of a transistor 112. The emitter of the transistor 114 is grounded, and the collector of that transistor is connected to the emitter of a transistor 112. The collector of the transistor 112 is connected to the base of the transistor 110.

The emitter of the transistor 110 is grounded, and the collector of that transistor is connected to the input terminal 115 of an eight word delay line 100, this delay line being included in the H write buffer. The transistor 110 introduces a signal $Hw.W_1{}^0$ to the input terminal 115 of the delay line 100. The collector of the transistor 110 is also connected to a resistor 119 which has a resistance, for example, of 3.9 kilo-ohms, the resistor 119 being connected to the negative terminal of the 3-volt direct voltage source. The output terminal of the 8-word delay line 100 is connected to read flip-flop Hw.R to trigger that flip-flop between its true and false states. Each unity bit introduced to the delay line 100 causes the read flip-flop Hw.R to be triggered to its true state and each zero bit causes that flip-flop to be triggered to its false state.

The true output terminal Hw.R of the read flip-flop Hw.R is connected to the base of a transistor 116. The emitter of that transistor is grounded and its collector is connected to the emitter of a transistor 118. The collector of the latter transistor is connected back to the input terminal 115 of the 8-word delay line 100 and to the base of a transistor 130.

The clock signal $T_w$ is introduced to the base of a transistor 132. The emitter of the transistor 132 is grounded, and the collector of that transistor is connected to the emitter of the transistor 130. The collector of the transistor 130 is connected to the false input terminal of a null detector flip-flop 128. This null detector flip-flop is a usual bistable multi-vibrator which is well known to the electronic art. It is composed of a pair of transistors 124 and 126 which are connected in known manner.

The timing signal C'12 is introduced to the base of a transistor 134. The emitter of the transistor 134 is grounded, and the collector of the transistor is connected to the true input terminal of the null detector flip-flop 128. The null detector flip-flop develops the term Hw.F at its true output terminal, and this term is introduced to the base of a transistor 148. The timing signal C1'.S1 is introduced to the base of a transistor 150. The emitter of the latter transistor is grounded, and the collector of that transistor is connected to the emitter of a transistor 148. The collector of the transistor 148 is connected to the emitter of a transistor 146, and the collector of the latter transistor is connected to the true input terminal of a flip-flop 152. The latter flip-flop includes a pair of transistors 142 and 144.

The converse of the timing signal C1.S2, that is, the term $\overline{C1.S2}$ is introduced to the base of a transistor 140. The emitter of that transistor is grounded, and its collector is connected to the emitter of a transistor 138. The collector of the transistor 138 is connected to the false input terminal of the flip-flop 152. A term $W_d$ is introduced to the base of the transistor 138. This latter term, as will be described, is true during the interval when a block of information is output from the buffer 10 to be written on the magnetic memory tape 18 of FIGURE 2.

A reset term is introduced to the base of a transistor 136. This latter transistor has its emitter connected to ground, and the transistor has its collector connected to the base of the transistor 142. The term RESET is rendered true whenever the system is first turned on, and it assures that various flip-flops in the system are triggered to a particular desired initial state.

The flip-flop 152 develops a term $Hw.F$ at its true output terminal, and this term is applied to the base of the transistor 118. The flip-flop also develops the term $\overline{Hw.F}$ at its false output terminal.

The collector of a transistor 120 (FIGURE 7b) and the collector of a transistor 156 are both connected to the input terminal 157 of an 8-word delay line 102 which is included in the buffer basket 14 of FIGURE 2 and supply the term $Gw.W_1^0$ to that delay line. These collectors are also connected to a resistor 154, and the resistor may have a resistance of 3.9 kilo-ohms and is connected to the negative terminal of the 3-volt direct voltage source.

The output terminal of the 8-word delay line 102 is connected to the input terminal of a read flip-flop $Gw.R$. This read flip-flop has a true output terminal which is connected to the base of a transistor 162 and to the base of a transistor 206. The emitter of the transistor 162 is grounded, and the collector of that transistor is connected to the emitter of a transistor 160. The collector of the latter transistor is connected to the emitter of a transistor 158 whose collector is connected to the input terminal 157 of the delay line 102. The term $\overline{W_D}$ is applied to the base of the transistor 160.

The read flip-flop $Gw.R$ also has a false output terminal which is connected to the base of a transistor 214. The latter transistor is associated with a null detector flip-flop 224, which will be described.

The write timing signal $T_W$ is applied to the base of a transistor 166. The emitter of the transistor 166 is grounded, and the collector of that transistor is connected to the emitter of the transistor 164. The latter transistor has its collector connected to the false input terminal of the null detector flip-flop 175. This latter flip-flop includes a pair of transistors 168 and 174. A grounded emitter transistor 176 has its collector connected to the true input terminal of the flip-flop, and the timing signal $C'12$ is introduced to the base of the transistor 176. The null detector flip-flop 175 develops the term $Gw.F'$ at its true output terminal, and that term is applied to the base of a transistor 194.

The transistor 194 has its emitter connected to the collector of a grounded emitter transistor 196, and it has its collector connected to the emitter of a transistor 192. The timing signal $C1'S1$ is applied to the base of the transistor 196. The collector of the transistor 192 is connected to the true input terminal 186 of the flip-flop 198.

The bit timing signal S7 is applied to the base of a transistor 178 and a term $W_D.C1.g$ is applied to the emitter of that transistor. The collector of the transistor 178 is connected to the emitter of the transistor 180, and the collector of the latter transistor is connected to the false input terminal 184 of the flip-flop 198. A grounded emitter transistor 190 has its collector connected to the false input terminal of the flip-flop 198. The term RESET is applied to the base of the transistor 190.

The flip-flop 198 includes a pair of transistors 182 and 188 which are connected in usual manner to form a bistable multivibrator. The flip-flop develops the term $Gw.F$ at its true output terminal, and this term is introduced to the base of the transistor 146 and to the base of the transistor 158. The flip-flop develops the term $\overline{Gw.F}$ at its false output terminal, and this latter term is introduced to the base of the transistor 120.

The emitter of a transistor 206 (FIGURE 7c) is grounded and the collector is connected to the emitter of a transistor 200 and to the emitter of a transistor 204. The term $W_D$ is applied to the base of the transistor 204. The collectors of the transistors 200 and 204 are connected to a resistor 202 and to the input terminal 205 of an 8-word delay line 104, which is included in the A write buffer of FIGURE 2. The resistor 202 may have a resistance of 3.9 kilo-ohms, and it is connected to the negative terminal of the 3-volt direct voltage source. The term $Aw.W_1^0$ is introduced to the input terminal 205 of the A write buffer delay line.

The output terminal of the A write buffer 8-word delay line 104 is connected to a read flip-flop $Aw.R$. The true output terminal of the read flip-flop is connected to the base of a transistor 212. The emitter of the transistor 212 is grounded, and the collector of that transistor is connected to the emitter of a transistor 210. The collector of the latter transistor connects with the emitter of the transistor 208 and the collector of the transistor 208 is connected back to the input terminal 205 of the delay line 104. The term $\overline{W_D}$ is applied to the base of the transistor 210.

The write clock signal $T_W$ is introduced to the base of a grounded emitter transistor 216. The collector of that transistor is connected to the emitter of the transistor 214, and the collector of the latter transistor is connected to the true input terminal of the null detector flip-flop 224. The timing signal $C'12$ is introduced to the base of a transistor 226. The latter transistor has its emitter connected to ground, and has its collector connected to the input terminal 222 of the flip-flop 224. The flip-flop 224 develops the term $Aw.F'$, and this term is applied to the base of a transistor 238. The timing signal $C1'S1$ is applied to the base of a transistor 246, the emitter of which is grounded and the collector of which is connected to the emitter of the transistor 238. The collector of the latter transistor is connected to the true input terminal 242 of the flip-flop 244.

The timing signal $S_2$ is applied to the base of a transistor 230, and the term $W_D.C1.G$ is applied to the emitter of that transistor. The collector of the transistor 230 is connected to the emitter of the transistor 228. The collector of the transistor 228 is connected to the false input terminal 240 of the flip-flop 244. A grounded emitter transistor 232 has its collector connected to the input terminal 240, and the reset term RESET is applied to the base of that transistor. The flip-flop 244 develops a term $Aw.F$ at its true output terminal, and that term is introduced to the base of the transistor 192 (FIGURE 7b) and to the base of the transistor 208. The flip-flop 244 develops the term $\overline{Aw.F}$ at its false output terminal, and the latter term is applied to the base of the transistor 200.

When information is introduced into the write buffer 10 at the input terminal 106 in FIGURE 7*a*, it is first passed into the H write buffer 8-word delay line word 100. If the buffer basket 8-word delay line 102 is empty, the block of information is then circulated from the delay line 100 of FIGURE 7*a* down into the buffer basket delay line 102, of FIGURE 7*b*. However, if the buffer basket delay line 102 already contains a block of information, the block of information fed into the H write buffer delay line 100 is recirculated in that buffer.

The buffer basket 14 is illustrated in FIGURE 7*b* as containing one delay line only. However, a series of such delay lines and associated logic circuitry may be included in the buffer basket. The number of delay lines used in the buffer basket in any installation depends upon the amount of block storage capacity desired in the write buffer for that particular application.

The block of information fed into the buffer basket delay line 102 from the H write buffer delay line 100 is then passed from the delay line 102 to the delay line 104 in the A write buffer, if the latter delay line does not already contain a block of information. Otherwise, the block of information in the buffer basket is recirculated in the circuitry of the delay line 102. Any information passed to the A write buffer delay line 104 is recirculated in the A write buffer, until the write signal $W_D$ is true. When that occurs, the block of information in the A write buffer delay is serially written in a bit-by-bit manner at the appropriate block location on the magnetic memory tape 18 of FIGURES 1 and 2. Simultaneously with the tape writing operation, the block of information in the buffer basket delay line 102 passes in serial manner to the A write buffer delay line 102, and the block of information in the H write buffer delay line 100 passes in serial manner to the buffer basket delay line 102.

The write buffer 10 described above is advantageous because it permits a plurality of blocks of information to be read into the system of the invention, and for such blocks to be recirculated and thereby stored until the time is appropriate to record the blocks of information in the different block locations on the magnetic memory tape 18. The system is flexible, moreover, because any desired number of delay lines and associated circuitry can be incorporated in the buffer basket 14, depending upon the use to which the system of the invention is to be placed.

When a block of information is to be introduced to the write buffer 10 of FIGURE 7, the block is applied in serial form from the computer to the input terminal 106. The information is then introduced by the transistors 108 and 110 to the input terminal 115 of the 8-word delay line 100.

The BLK timing signal introduced to the transistor 112, and the C12 timing signal introduced to the transistor 114, produces a null at the twelfth character position of the dot word in FIGURE 6, this being the word which contains the key information described above. This null character appears as 1111111 which is unlike any word in the computer.

The block of information is then circulated down the delay line 10 and passes to the read flip-flop Hw.R. The read flip-flop is successively triggered, as mentioned above, by the binary bits in each character of each computer word in the block of information circulated down the delay line 100. The true output Hw.R from the read flip-flop is introduced to the transistor 116 to be recirculated through the transistor 118 to the input terminal 115 of the H buffer delay line 100 when the term Hw.F is true; or to be introduced to the input terminal 157 of the buffer basket delay line 102 through the transistor 120 when Gw.F is true, or through the transistor 156 to the input terminal 157 when the term $W_D$ is true.

The term Hw.F is false unless the buffer basket delay line 102 has a block of information recirculating in its associated circuitry. This term is derived in a manner now to be described. First, the null detector flip-flop 128 is triggered true just before the last character time of every word of the block of information fed into the H write buffer. The last character of each word in the block, except for the null character of the last (key) word in the block, contains at least one zero. Therefore, as a block of information is circulated into the H write buffer, the last character in each word in the block except the null character, triggers the null detector flip-flop 128 false some time before the end of that character. Only after the passage of the null character into the delay line 100 will the flip-flop 128 be true at the following C1.S1 time, causing the term Hw.F′ at the true output terminal of that flip-flop to be true at that time.

The flip-flop 152 is initially set false by the reset term RESET introduced to the transistor 136. This flip-flop remains false, until the term Gw.F is true, together with the term Hw.F′ at C1.S1 time. The term Gw.F is false, unless the flip-flop 198 (FIGURE 7B) is true; and the flip-flop 198 is false unless the flip-flop 244 (FIGURE 7B) is true to make the term Aw.F true.

Therefore, the first block of information is circulated from the H write buffer delay line 100 down into the buffer basket delay line 102 and then to the A write buffer delay line 104. When the first block of information circulates into the A write buffer delay line, the null detector flip-flop 224 detects when the last character (NULL) of the last word in the block passes through the read flip-flop Gw.R of FIGURE 7B and the flip-flop 244 is then set true to set the term Aw.F true. Then, as long as the term Aw.F is true, the next block of information circulated into the buffer basket delay line 102 will be recirculated through the circuitry associated with that delay line. The flip-flop 244 remains true until the term $W_D$ goes true to cause the block of information in the A write buffer to be written into the magnetic memory tape 18. Then, if the flip-flop 198 is false to make the term $\overline{Gw.F}$ true, the flip-flop 244 is triggered false at the next S2 bit time. This causes the term Aw.F to go false which permits the block of information recirculating in the buffer basket delay line 102 to be circulated into the A write buffer 104 as the block of information previously in the A write buffer passes out of that buffer and into the magnetic memory tape.

In like manner, the second block of information circulated into the buffer basket delay line 102 has its null character detected by the detector 175, and this causes the flip-flop 198 to be triggered true to make the term Gw.F true, so long as that flip-flop is true. A third block of information circulated into the H write buffer delay line 100 has its null character detected in the detector 128. This causes the flip-flop 152 to be triggered true to make the term Hw.F true, this occurring as the last character of the last word of that block passes into the delay line 100. This third block is then recirculated through the H write buffer delay line 100 until the term $W_D$ goes true. Then the flip-flop 152 is set false and the block of information in the H-write buffer is circulated down into the buffer basket delay line 102.

In the described manner, therefore, each new block of information introduced to the write buffer 10 of FIGURE 2 is passed down through the buffer until it meets with a delay line which already has a block of information recirculating through its associated circuitry. The information is then recirculated in the preceding delay line until the following delay line is unloaded by the writing of the block of information from the A buffer delay line 104 into the magnetic memory tape 18. Immediately upon the initiation of such a loading operation, the blocks of information in the preceding delay lines in the write buffer 10 begin to circulate serially into each succeeding delay line.

The information from the write buffer 10 is written in the magnetic memory tape 18 in a manner and by instrumentalities which will now be described.

The recording of the information on the magnetic memory tape 18 is controlled by the write logic circuitry 19 and associated write amplifiers 16 and read amplifiers 20 in FIGURE 2. The logic circuitry, as represented by block 19 in FIGURE 2, is shown in circuit detail, FIGURES 8–12.

The read amplifiers 20 include a double-ended amplifier which reads the block markings in the track 16 (FIGURE 1) of the magnetic memory tape 18. A first output circuit of the double-ended amplifier produces an output signal when a "set" block marking is read and the second output circuit of the double-ended amplifier produces an output signal when a "reset" block marking is read.

The block marking "reset" signals from the first output circuit of the double-ended amplifier in the read amplifiers 20 of FIGURE 2 are each designated B.Mw (reset). These signals are introduced to the base of a transistor 200 in FIGURE 8. The transistor 300 has its emitter connected to ground, and the collector of that transistor is connected to the false input terminal 302 of the flip-flop 304. The block marking "set" signals derived from the second output circuit of the track 16 double-ended amplifier in the read amplifiers 20 is designated B.M. (set). This latter signal is applied to the base of the transistor 306. The emitter of the transistor 306 is grounded, and the collector of the transistor is connected to the true input terminal 308 of the flip-flop 304.

The flip-flop 304, therefore, is triggered true as each of the set block marking in track 16 of the magnetic memory tape 18 in FIGURE 1 is read and amplified by the double-ended amplifier in the amplifier 16, and the flip-flop is set false by each following reset block marking in track 16 read and amplified by the double-ended amplifier. The flip-flop 304 develops a term B.M*w* to its true output terminal, and that term is introduced to the base of a transistor 310. The emitter of the transistor 310 is connected to the collector of a transistor 312, and the emitter of the latter transistor is grounded. A term W.M*w* derived from the read amplifiers 20 is introduced to the base of the transistor 312. This term W.M*w* is produced each time the corresponding read head coupled to the track 15 of FIGURE 1 reads a write marking on that track. This write marking appears between the pair of block markings as explained above, to designate a block location which is to receive information.

The collector of the transistor 310 is connected to the true input terminal 314 of a flip-flop 316. A term B.M*u* (set) is applied to the base of a grounded emitter transistor 318. The collector of the transistor 318 is connected to the false input terminal 320 of the flip-flop 316. The flip-flop 316 is a "block write mark" flip-flop. It produces a term W.M*o* at its true output terminal when a write marking is encountered in the track 15 of the magnetic memory tape 18 in FIGURE 1. It will be remembered that the write amplifiers 16 are controlled to start writing a block of information four block times after the write mark has been read by the track 15 read head of the amplifiers 20 to set the flip-flop 316 true. This is to permit the desired block location of the tape to reach the write heads associated with the write amplifiers 16. The necessary four block delay is provided by a counter which includes a plurality of flip-flops 322, 324, 326, 328 and 330.

The term W.M*o* from the flip-flop 316 is introduced to the true input terminal of the flip-flop 322, and the term $\overline{W.Mo}$ is applied to the false input terminal of the flip-flop 322. The triggering time of the flip-flop 322 is controlled by the term B.M*w* (reset) which is applied to the base of transistor 332 included in the input circuitry of the flip-flop 322. The flip-flop 322 introduces a term W.M1 from its true output terminal to the true input terminal of the flip-flop 324. In like manner, the flip-flop 322 applies a term $\overline{W.M1}$ from its false output terminal to the false input terminal of the flip-flop 324. The triggering time of the flip-flop 324 is controlled by the signal B.M*w* (set). This latter term is applied to the base of a transistor 334 which completes the input circuit of the flip-flop 324.

The flip-flop 324 applies the term $W.M_2{}^1$ from its true output terminal to the true input of the flip-flop 326. In addition, the flip-flop 324 applies the term $\overline{W.M_2{}^1}$ from its false output terminal to the false input terminal of a flip-flop 326. The timing of the flip-flop 326 is controlled by a transistor 336, and the term B.M*w* (reset) is applied to the base of that transsitor. The flip-flop 326 applies a term W.M2 from its true output terminal to a true input terminal of the flip-flop 328, and it applies a term $\overline{W.M2}$ from its false output terminal to a false input terminal flip-flop 328. The timing of the flip-flop 328 is controlled by a transistor 338, and the term B.M*u* (set) is applied to the base of that transistor.

The flip-flop 324 applies the term $W.M_2{}^1$ from its true output terminal to the true input terminal of the flip-flop 330. In addition, the flip-flop 328 applied a term $\overline{W.M_3{}^1}$ from its false output terminal to the false input terminal of the flip-flop 330. The timing of the flip-flop 330 is controlled by the term B.M*w* (reset). The latter term is applied to the base of a transistor 340 which is connected to complete the input circuitry of the flip-flop 330. The flip-flop 330 produces a pair of terms W.M3 and $\overline{W.M3}$, at its true output terminal and at its false output terminal respectively.

When the term W.M3 is true it indicates that a block location on the magnetic memory tape which is to receive a block of data from the A write buffer has reached the write heads associated with the write amplifiers 16. The term W.M3 is then used to develop the appropriate "write enable" terms and the write control signals, and this is accomplished by the circuitry of FIGURE 9. The term W.M3 is applied to the base of a transistor 350 in FIGURE 9, and the term $\overline{W.M3}$ is applied to the base of a transistor 352. The emitters of the transistors 350 and 352 are connected to the collector of a transistor 352. The emitter of the latter transistor is grounded, and the term B.M*w* (set) is applied to the base of that transistor. The collector of the transistor 350 is connected to the emitter of a transistor 356 and and to an output terminal 358. The term B.M*w* (set).W.M3.*g* is developed at the output terminal. The term AW.F from the flip flop 244 in FIGURE 7 is applied to the base of the transistor 356. The collector of the transistor 356 is connected to the false input terminal of a "write enable" flip-flop, 358, as is the collector of a grounded emitter transistor 360. The flip-flop 358 produces a write enable signal W' at its true output terminal.

The circuitry of FIGURE 9 includes a "write inhibit" flip-flop 362, and the function of this latter flip-flop is to prevent any information being recorded on the magnetic memory tape 18 in FIGURE 1. The flip-flop produces a term INH*w* at its true output terminal, the term being applied to the base of a transistor 360. The term A*w*.F from flip-flop 244 in FIGURE 7 is introduced to the base of a transistor 364, and the term appearing at the output terminal 358 is introduced to the emitter of that transistor. The collector of the transistor 364 is connected to the true input terminal of the inhibit flip-flop 362. A grounded emitter transistor 366 has its collector connected to the false input terminal of the flip-flop 362, and the collector of a transistor 368 is also connected to that input terminal. The emitter of the transistor 368 is connected to the collector of a grounded transistor emitter 370. A term B.M*r*, which is derived from a flip-flop in FIGURE 15 (to be described) is applied to the base of the transistor 368, and a term W.M*r* which is derived from the read amplifiers 20 of FIGURE 2 is applied to the base of the transistor 370.

The term $\overline{Aw.F}$ triggers the inhibit flip-flop 362 true if the A read buffer is empty. This means that the "write enable" flip-flop 358 is incapable of being triggered true unless there is a block of information in the A read buffer, and unless that block is ready to be recorded in the designated block location on the magnetic memory tape 18. The "inhibit" flip-flop 362 is set false when the write marking on track 14 of the tape 18 circulates to the track 14 read head coupled to the read amplifiers 22, thus causing the term W*mr* to be applied to the transistor 370. If, at that time the A write buffer is still empty, the term A*w*.*f* returns the flip-flop 362 to its true state to prevent the flip-flop 358 from being triggered true is sensed and amplified by the amplifiers 22. The flip-flop 362 remains false and the "write enable" flip-flop 358 may then be triggered true.

In the manner described, and assuming that the "inhibit" flip-flop 362 is in its false state, and that the A read buffer contains the block of information so that the term A*w*.F is true, the "write enable" flip-flop 358 is triggered true when the magnetic memory tape reaches the write heads associated as write amplifiers 16 so that the term $W^1$ becomes true. The actual recording in the transistor block location on the magnetic memory tape is initiated at the beginning of the computer word time following the time that $W^1$ becomes true. This is accomplished by a pair of flip-flops 374 and 376. These flip-flops combine to produce the term $W_D$ and the actual writing of the block onto the tape begins when that term is true and ends when that term is false.

The write enable term $W^1$ is introduced to the base of a transistor 377, and the collector of that transistor is connected to the true input terminal of the flip-flop 374. The emitter of the transistor 377 is connected to the collector of a transistor 378, and the emitter of the latter transistor is connected to the collector of a grounded emitter transistor 380. The term B.M*w* (reset) is introduced to the base of the transistor 378, and the $\overline{W_D}$ from the false output term of the flip-flop 376 is applied to the base of a transistor 380.

The collector of a transistor 382 and the collector of a transistor 384 are both connected to the false input terminal of the flip-flop 374. The emitter of the transistor 382 is grounded, and the term RESET is applied to the base of that transistor. The term $W_D$ from the true output terminal of the flip-flop 376 is applied to the base of the transistor 384. The emitter of the transistor 384 is connected to the collector of a transistor 386. The emitter of the latter transistor is grounded, and the timing signal S7 is applied to its base.

The flip-flop 374 applies the term $W_D^1$ from its true output terminal to the base of a transistor 390. The collector of the transistor 390 is connected to the true output terminal of the flip-flop 376 and the emitter of that transistor is connected to the collector of a transistor 392. The emitter of the transistor 392 is grounded and the timing signal C1.S1½ is applied to the base of the transistor.

The collector of the transistor 392 is connected to the emitter of a transistor 394. The collector of the latter transistor is connected to the false input terminal of the flip-flop 376. The collector of a transistor 396 is also connected to that input terminal. The emitter of the transistor 396 is grounded, and the term RESET is applied to its base.

The false output terminal $\overline{W_D}$ of the flip-flop 376 is also connected to the base of a transistor 400. The emitter of the transistor 400 is grounded, and the collector of that transistor is connected to the output terminal of the eight word timing delay line 21, which is also shown in FIGURE 2. The collector of the transistor 400 is also connected to a resistor 402, which is, in turn, connected to the negative terminal of the 3-volt direct voltage source. The term $\overline{W_D}^1$ from the false output terminal of the flip-flop 374 is applied to the base of a grounded emitter transistor 404, and the collector of that transistor is also connected to the input terminal of the eight word timing delay line 21. The delay line 21 produces the term $W_D$ (reset) and this term is applied to the base of the transistor 394.

When the sensed block location of the magnetic memory tape, on which the particular block is to be written, reaches the write heads associated with the write amplifiers 16, the flip-flop 374 is triggered true. Then, at the beginning of the following computer word time, namely C1.S1½ time in that word time, the flip-flop 376 is triggered true so that the writing of the information may begin, this under the control of the term $W_D$ which is now true. The moment that the flip-flop 376 is triggered true, after the flip-flop 374 has been triggered, both the terms $\overline{W_D}^1$ and $\overline{W_D}$ become false and the timing pulse is introduced to the delay line 21. This timing pulse emerges from the delay line eight word times later to produce the $W_D$ (reset) term. This latter term sets the flip-flop 376 false at the following C1.S1½ term to terminate the recording operation. Seven bit times after the flip-flop 376 is triggered true, the flip-flop 374 is triggered false to reset that flip-flop for the next writing operation.

As described above, the information is recorded on the magnetic memory tape 18 in FIGURE 1 in fourteen data tracks. A pair of characters is recorded by successive ones of the clock pulses in track 8 of the tape. Each pair of characters comprises fourteen bits, and these bits are recorded serially from track-to-track on the tape between the successive clock pulses. It will also be remembered that the clock pulses are recorded in track 8 on the tape concurrently with the recording of the data. The clock pulses represent successive pairs of characters, and they are recorded at the odd character times. The clock pulses are recorded in the track 8 on the magnetic memory tape 18 through one of the write amplifiers 16 having a write head associated with that track. The clock pulses are introduced to that write amplifier at successive odd character times by the circuitry of FIGURE 10. In that circuitry, the symbol E*c* represents the even character times, and the symbol O*c* represents the odd character times.

The circuitry of FIGURE 10 includes a flip-flop 410 which develops the O*c* signals at its true output terminal and the E*c* signals at its false output terminal. A transistor 412 has its collector connected to the false input terminal of the flip-flop 410, and a transistor 414 has its collector connected to the true input terminal of that flip-flop. The collector of a transistor 416 is connected to the emitters of the transistors 412 and 414. The emitter of the transistor 416 is grounded, and the timing signals S2 are introduced to its base.

A second flip-flop 418 is also included in the circuitry, and it is connected to the flip-flop 410 in a binary counter arrangement. The flip-flop 418 develops the signal $O_c'$ at its true output terminal, and that signal is applied to the base of the transistor 414. The flip-flop 418 produces the signal $\overline{Oc'}$ at its false output terminal, and the latter signal is applied to the base of the transistor 412.

A transistor 420 has its collector connected to the false input terminal of the flip-flop 418, and a transistor 422 has its collector connected to the true input terminal of that flip-flop. The signals E*c* from the true output terminal of the flip-flop 410 are introduced to the base of the transistor 422, and the signals O*c* from the true output terminal of the flip-flop 410 is introduced to the base of the transistor 420.

A transistor 424 has its collector connected to the emitters of the transistors 420 and 422, and the emitter of the transistor 424 is grounded. The timing signal S3 is applied to the base of the transistor 424. The transistor 426 has its collector connected to the true input terminal of the flip-flop 418. The emitter of the transistor 426 is grounded. The timing signal C1.S1½ is applied to the base of the transistor 426.

The false output terminal E*c* of the flip-flop 410 is connected to a grounded emitter transistor 428, and the true output terminal of that flip-flop is connected to a grounded emitter transistor 430. The transistor 428 produces the term E*c.g* at its collector, and the transistor 430 produces the term O*c.g* at its collector.

The false output terminal of the flip-flop 410 introduces the term E*c* to the base of a transistor 432. The emitter of the latter transistor is grounded, and its collector is connected to a resistor 434. The resistor 434 has a resistance of 6.8 kilo-ohms, for example, and it is connected to the negative terminal of the 3-volt direct voltage source. A grounded emitter transistor 436 also has its collector connected to the resistor 434 and to an output terminal 438. The term $\overline{W_D}$ of FIGURE 9 is applied to the base of the transistor 436. The output terminal 438 is connected to the write amplifier in the amplifiers 16 associated with the clock track.

The timing signal C1.S1½ introduced to the transistor 426 causes the flip-flop 418 to be triggered true at the beginning of the first character time of each word time. This causes the flip-flop 410 to be triggered true at the following S2 time. Then, the flip-flop 418 is triggered false at the following S3 time. The result is that the flip-flop 410 is triggered true for the odd character times, and it is triggered false for the even character times. This triggering of the flip-flop 410 causes the output terminal 438 to assume a negative value during the odd character times. This, in the presence of the write term $W_D$, causes a clock pulse to be recorded in the track 8 on the magnetic memory tape at the beginning of each odd character time.

The term E*c* is also introduced to the base of a transistor 439, and the term O*c* is introduced to the base of a transistor 440. The emitters of these transistors are connected together and to a resistor 442. One terminal of the resistor 442 is connected to the collectors of a pair of transistors 444 and 446, and the other terminal of that resistor is connected to the negative terminal of the 3-volt direct voltage source. The emitters of the transistors 444 and 446 are both grounded. The term $\overline{W_D}$ of FIGURE 9 is introduced to the base of the transistor 446.

The collector of the transistor 439 is connected to an output terminal 448, and the term (B8–B14)$g$ is established at that output terminal. The collector of the transistor 440 is connected to an output terminal 450, and the term (B1–B7)$g$ is developed at the latter output terminal. The circuitry of FIGURE 10 also includes a flip-flop 452, a transistor 454 has its collector connected to the false input terminal of the flip-flop, and a transistor 456 has its collector connected to the true input terminal of the flip-flop. The emitters of the transistors 454 and 456 are connected together and to the collector of a grounded emitter transistor 458.

The write clock pulses $T_W$ are applied to the base of the transistor 458. The term $A_wR$ from the read flip-flop $AwR$ in FIGURE 7 is applied to the base of the transistor 456, and the term $\overline{AwR}$ from that flip-flop is applied to the base of the transistor 454. The flip-flop 452 develops the term $\overline{ArD}$ at its false output terminal and that term is applied to the base of the transistor 444. The flip-flop 452 reads the information passing through the A write buffer read flip-flop $AwR$ of FIGURE 7 at the $Tw$ clock time. Its output signal $\overline{ArD}$, and the write signal term $\overline{W_D}$, causes the circuitry of the transistors 440 and 439 to be activated in the presence of the write signal $W_D$ and to respond to the information circulating through the A write buffer.

A pair of multiple element write heads are used to record the successive pair of characters in the different tracks on the magnetic memory tape 18. One of these heads is activated at the odd character times $Oc$, and the other is activated at the even character times $Ec$. The information signal (B1–B7)$g$ is introduced to the first head from the output terminal 450, and the information signal (B8–B14)$g$ is introduced to the second head from the output terminal 448.

Figure 11:
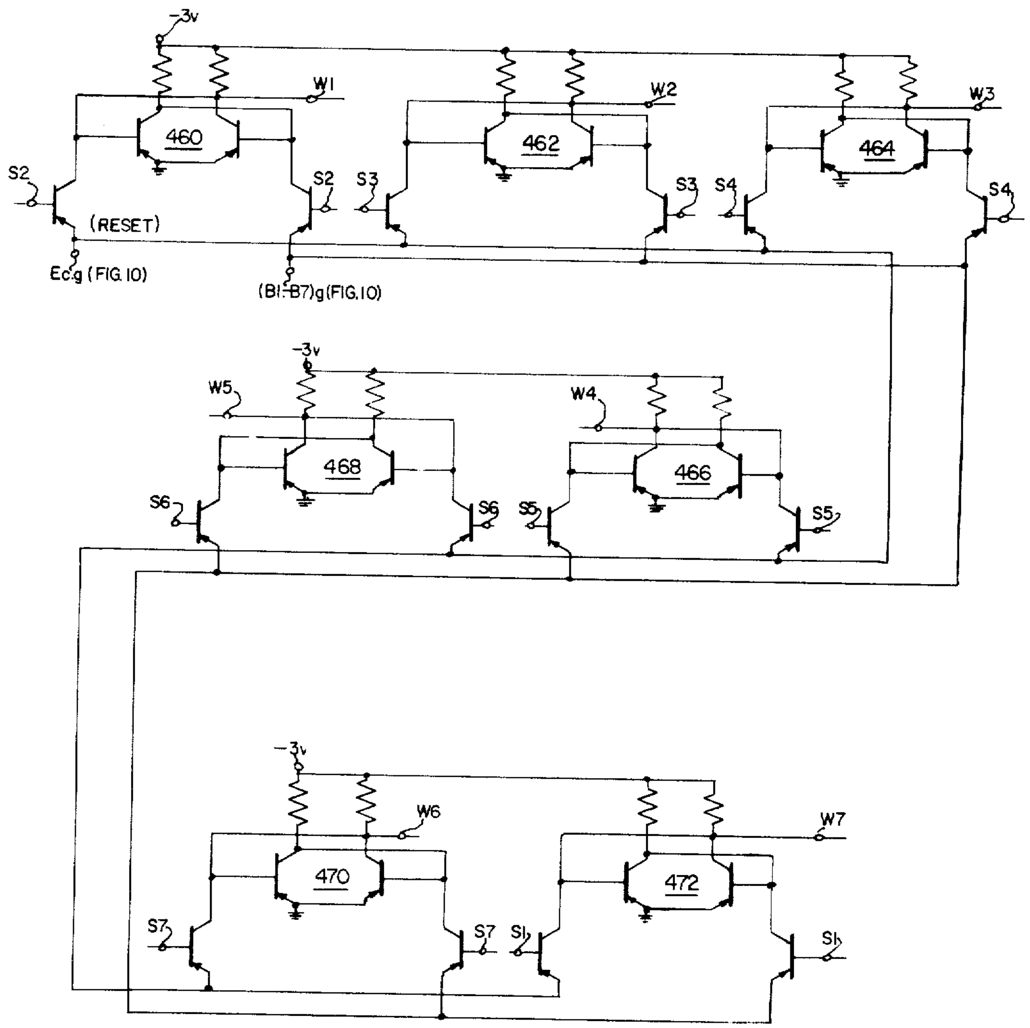
Figure 12:
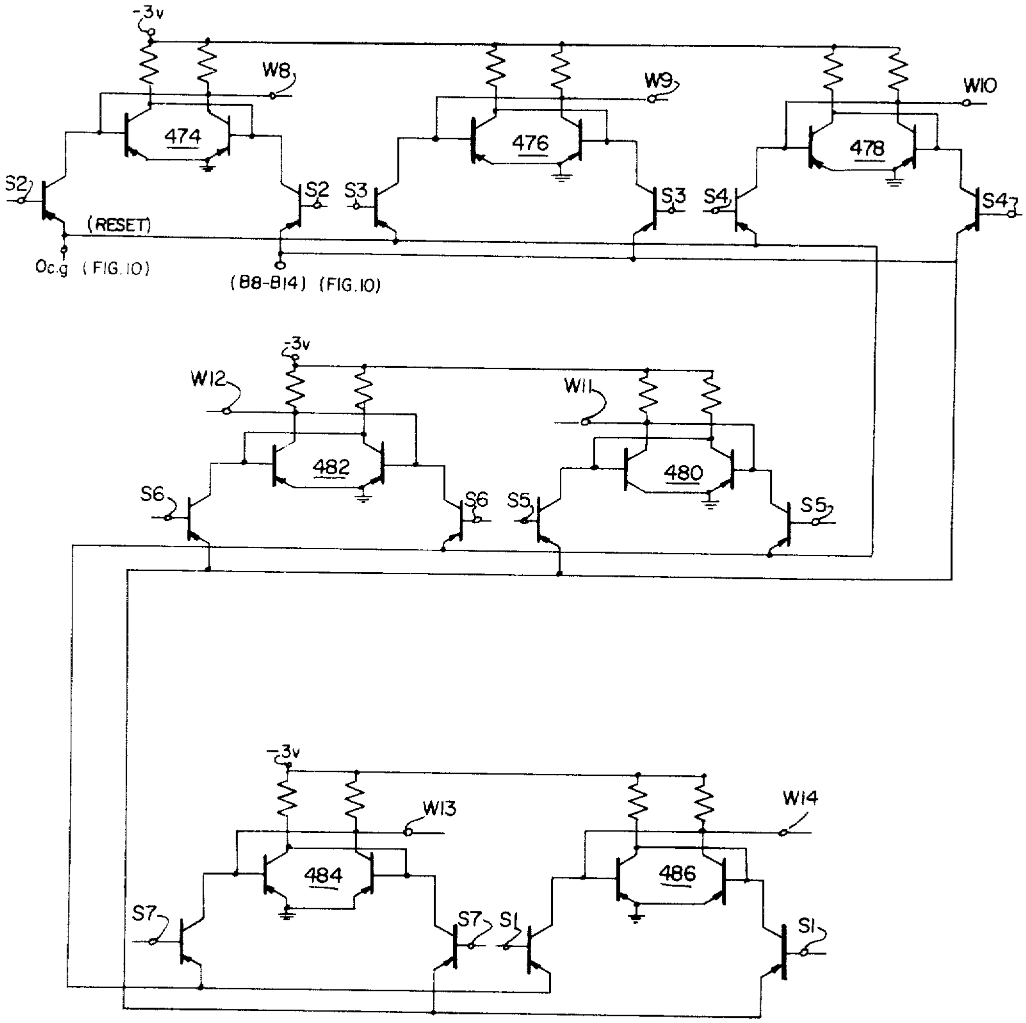

The logic circuitry of FIGURE 11 introduces the data to the different elements of the first head at the odd character times $Oc$, and the logic circuitry of FIGURE 12 introduces the information to the second head at the even character times $Ec$.

The write logic circuitry of FIGURE 11 includes a plurality of flip-flops 460, 462, 464, 466, 468, 470 and 472. These flip-flops develop a group of signals W1, W2, W3, W4, W5, W6 and W7 at their respective true output terminals. Each of the flip-flops is reset by the term $Ec.g$ derived from the transistor 428 in FIGURE 10. The information signal (B1–B7)$g$ derived from the terminal 450 in FIGURE 10 is also introduced to each of the flip-flops. The flip-flops are activated by the bit timing signals S1–S7 derived from the associated computer and illustrated by the curves of FIGURE 5. More specifically, the flip-flop 460 is activated by the timing signal S2, the flip-flop 462 is activated by the timing signal S3, the flip-flop 464 is activated by the timing signal S4, the flip-flop 466 is activated by the timing signal S5, the flip-flop 468 is activated by the timing signal S6, the flip-flop 470 is activated by the timing signal S7, and the flip-flop 472 is activated by the timing signal S1.

Therefore, in the presence of a binary "1" in the information signal (B1–B7)$g$ at S2 time, the flip-flop 460 causes the W1 term to introduce a 1 to the corresponding write element of the first write head, and so on. The information is clocked at $T_w$ time, so that the first bit timing pulse is S2, rather than S1. The last bit W7 is then timed by the S1 bit timing pulse.

The logic circuitry of FIGURE 11 permits the different elements of the first write head to be successively activated, so that the different bits in the first group of data tracks of the magnetic memory tape 18 in FIGURE 1 may be recorded at successive bit times in the odd character time on the tape.

In like manner, the logic circuitry of FIGURE 12 includes a group of flop-flops 474, 476, 478, 480, 482, 484 and 486. These latter flip-flops are reset during the odd character times by the term $Oc.G$ derived from the transistor 430 in FIGURE 10. The flip-flops respond to the information signal B8–B14 derived from the output terminal 448 in FIGURE 10 to be successively triggered to their true states, or left in their false states, depending upon whether that information signal represents a binary "1" or a binary "0" at the successive bit times. The flip-flops of the latter group are also timed by the bit timing pulses S2, S3, S4, S5, S6, S7 and S1 in the odd character times. The flip-flops of the second group develop the respective output terms W8–W14, and these terms are introduced to the different elements of the second write head. These elements cause data to be recorded in the tracks 9–15, for example, of the tape of FIGURE 1 during the odd character times, and at successive bit times therein.

Therefore, at the beginning of an odd character time, a clock pulse is recorded in the clock channel 8 at $T_w$ clock time. This clock pulse is succeeded by information serially recorded at successive bit times S2–S7, S1 in the tracks 1–7; and that information is succeeded by information serially recorded in the tracks 10–15 in the succeeding even character time and at the bit times S2–S7, S1 therein. Then a second clock pulse is recorded in the clock row 8, and the process is repeated.

As each block of data recorded on the magnetic memory tape 8 reaches the read heads associated with the read amplifier 22, that block is read and fed in serial form into the storage register 30. The block markings of track 16 of the tape are also read, as are the tape clock recordings in the track 8 of the tape. Each tape clock recording, as it is read from the tape, is designated as a tape clock pulse ZRO. It will be remembered that the 14 binary bits which make up each of the successive character pairs of each block of information on the tape are serially recorded at successive bit times in different ones of the data tracks on the magnetic memory tape and between successive ones of the recorded tape clock pulses. Tape bit timing pulses Z1–Z14 corresponding to the fourteen bit times between successive pairs of the recorded tape clock pulses $Zo$ are produced by the delay line assembly 28, in response to each tape clock pulse $Zo$ read from the tape. The tape clock pulses $Zo$ are introduced to the delay line assembly 28 from appropriate read amplifiers in the amplifier 22.

The tape clock assembly 28 is shown in more detail in FIGURE 13. The tape clock assembly 28 of FIGURE 13 includes a pair of delay lines 500 and 502. The delay line 500 to be picked up at successive read stations 506, and the tape clock pulse $Zo$ are successively introduced to that station. The pulses $Zo$ then travel down the delay line 500 to be picked up at sucessive read stations 506, 508, 510, 512, 514, 516 and 518; the read stations being coupled to the delay line 500 at spaced positions along the delay line.

The tape clock pulses $Zo$ derived from the read amplifier 22 are introduced to the base of a transistor 520. A loading signal L (to be described in conjunction with FIGURE 21) is applied to the base of a transistor 522. The emitter of the transistor 522 is grounded, and the collector of the transistor is connected to the emitter of the transistor 520. The collector of the transistor 520 is connected to a resistor 524 and to the base of a grounded emitter transistor 526. The resistor 524 may have a resistance of 3.9 kilo-ohms, and it is connected to the negative terminal of a 3-volt direct voltage source.

The collecter of the transistor 526 is connected to the primary winding of a transformer 528. The other terminal of the primary is connected to a resistor 530, which resistor may have a resistance of 3.9 kilo-ohms, and which is connected to the negative terminal of a 3-volt direct voltage source. The secondary winding of the transistor 528 is connected to ground and to the base of a grounded emitter transistor 532. The collector of the transistor 532 is connected to the primary of a transistor 534, the other terminal of the primary being connected to a resistor 536.

The resistor 536 may have a resistance of 1 kilo-ohm, and it is connected to the negative terminal of the 3-volt direct voltage source. The secondary winding of the transformer 534 is connected to ground and to the base of a grounded emitter transistor 538. The collector of the transistor 538 is connected through the winding of the write station 504 to a 20-ohm resistor 540 and to a grounded capacitor 542. The resistor 540 is connected to the negative terminal of the 3-volt direct voltage source.

The winding of the first read station 506 has one terminal connected to ground and the other terminal of that winding is connected to the emitter of a transistor 544. The transistor 544 is cascaded with a pair of further transistors 546 and 548 to form a usual transistor amplifier 550. The transistor amplifier 550 includes an output transformer 552. The transformer 552 has its secondary winding connected to an output terminal designated Z1. The read stations 508, 510, 512, 514, 516 and 518 have their windings connected to a plurality of amplifiers 554, 556, 558, 560, 562 and 564, respectively. These amplifiers each may be similar to the amplifier 550, and they are connected to respective output terminals to supply the bit timing pulses Z2, Z3, Z4, Z5, Z6 and Z7 to such output terminals.

The output terminal Z7 is connected to the base of a transistor 566. The emitter of the transistor 566 is grounded, and its collector is connected to one terminal of the primary of a transformer 568. The other terminal of the primary of the transformer 568 is connected to a resistor 570. This resistor may have a resistance of 1 kilo-ohm, and it is connected to the negative terminal of the 3-volt direct voltage source. The secondary of the transformer 568 is connected to an output terminal designated Z7*d*. The output pulses at this output terminal Z7*d* are delayed slightly with respect to the output pulses appearing at the output terminal Z7.

The output terminal Z5 is connected to the base of a transistor 572. The transistor 572 has a grounded emitter and the collector of the transistor is connected to one terminal of the primary winding of a transformer 574, the other terminal of the primary winding is also connected to a 1 kilo-ohm resistor 576, which, in turn, is connected to the negative terminal of the 3-volt direct voltage source.

The secondary winding of the transformer 574 is connected to the base of a grounded emitter transistor 578. The collector of the transistor 578 is connected to one terminal of the winding of a write station 580, which winding is coupled to the delay line 502. The other terminal of the write station winding is connected to a 1 kilo-ohm resistor 582, and that resistor is connected to the negative terminal of the 3-volt direct voltage source. The delay line 502 has a plurality of read stations 584, 586, 588, 590, 592, 594, 596 and 600. These read stations have respective windings, when they are coupled to the delay line 502, and which are displaced at particular distances from the write station 580 and from one another. The read station windings are connected to a plurality of amplifiers 602, 604, 606, 608, 610, 612, 614 and 616, respectively. These amplifiers are connected to respective ones of a plurality of output terminals to supply the bit timing pulses Z8, Z9, Z10, Z11, Z12, Z13, Z14 and Z15 to such output terminals.

The assembly of FIGURE 13 is designed so that each clock pulse Z*o* introduced to the write circuitry of the assembly in the presence of a loading signal L is passed to the write station 504 and circulated down the delay lines 500 and 502. Each of these pulses produce a series of successive timing pulses Z1–Z15, which appear with a particular timed sequence at the respective output terminals of FIGURE 13. These timing pulses Z1–Z15 serve to identify the bit times of the fourteen bits of the pair of characters which appear between successive ones of the tape clock pulses Z*o*.

The tape bit timing pulses Z1–Z15 derived from the delay line assembly 28 are introduced to the storage register 30 to time the introduction of each block of data from the tape 18 to the storage register. As mentioned above, the storage register includes, for example, 56 flip-flops, and it is controlled by a ring counter which permits four pairs of characters from the tape 18 to be loaded in a bit-by-bit sequence into successive flip-flops in the storage register, at which time the loading cycle is repeated for the next four pairs of characters, and so on. An unloading cycle follows a loading cycle so that the information loaded into the storage register 30 during a particular cycle may be unloaded from the register before the next loading cycle begins.

The loading cycle of the storage register 30 is controlled by the timing signals illustrated in FIGURE 14. The timing signals Z*ro* illustrated in FIGURE 14 are the clock signals derived from the tape, as described above. That clock signal includes a negative component which coincides in time to each odd character time on the tape and it has a positive component which coincides to each even character time on the tape.

The timing pulses Z*o* take the form of negative spikes occurring in time coincidence with the negative going edges of the clock signal Z*ro*. The timing pulses Z1, Z7 and Z14 derived from the delay line assembly 28 of FIGURE 13 have the illustrated timing, and these pulses are used to derive a plurality of loading signals LA, LB, LC and LD. These latter signals, in turn, are used to derive a group of loading gate signals L1–L8.

Each of the loading gate signals L1–L8 is timed by the set and reset block markings on track 16 of the magnetic memory tape (FIGURE 1). As these block markings are read by the track 16 read head coupled to a corresponding amplifier of the read amplifiers 22, the set and reset block markings are recorded in such a manner that the reset block markings as derived from the memory tape may be distinguished from the set block markings derived from the tape. A double-ended amplifier is used to produce a first output signal in a first output circuit in response to each of the set block markings, and to produce a second output signal in a separate output circuit in response to each reset block marking. The resulting set block marking signal BMR (SET) is introduced to the the base of a transistor 650 in FIGURE 15, and the resulting reset block marking signal from the amplifier BMR (RESET) is introduced to the base of a transistor 652. The emitter of the transistor 650 is grounded and its collector is connected to the true output terminal of a flip-flop 654. The emitter of the transistor 652 is grounded and its collector is connected to the false input terminal of the flip-flop 654. The term BMR is derived at the true output terminal of the flip-flop 654 and this term is true during the interval between the reading of each pair of set and reset block markings from track 16 of the tape 18 in FIGURE 1.

The timing signal LA and the timing signal LC is derived from the circuitry of FIGURE 16. That circuitry includes a pair of flip-flops 656 and 658. The delayed timing signal $Z7_d$ from the assembly of FIGURE 13 is applied to the base of a transistor 660. The emitter of the transistor 660 is grounded, and its collector is connected to the emitter of a transistor 662 and to the emitter of a transistor 664. The collector of the transistor 662 is connected to the false input terminal of the flip-flop 658 and the collector of the transistor 664 is connected to the false input terminal of the flip-flop 656. The term BMR derived from the flip-flop of FIGURE 15 is applied to the base of a grounded emitter transistor 666 and to the base of a grounded emitter transistor 668. The collector of a transistor 666 is connected to the false input terminal of the flip-flop 658, and the collector of a transistor 668 is connected to the false input terminal of the flip-flop 656.

The tape clock pulses $Zo$ are applied to the base of a grounded emitter transistor 670. The collector of the transistor is connected to an emitter transistor 672 and to the emitter of a transistor 674. The collector of the transistor 672 is connected to the true input terminal of the flip-flop 658, and the collector of the transistor 674 is connected to the true input terminal of the flip-flop 656.

Figure 18:
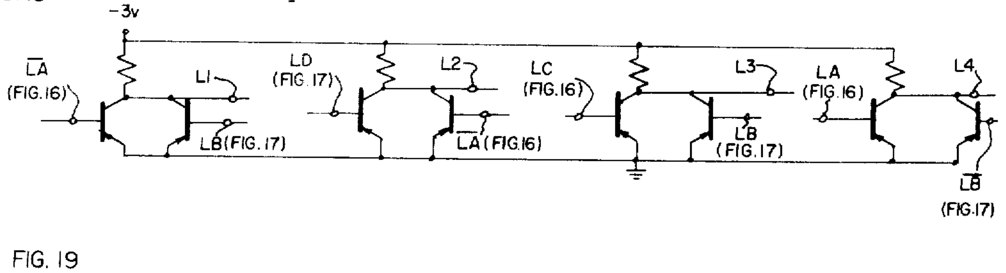
Figure 19:
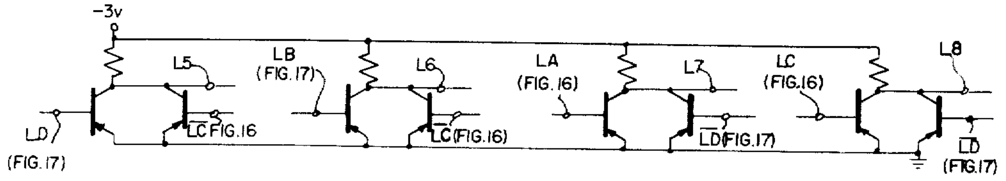

Timing signals L1–L8 of FIGURE 14 are derived by the logic circuitry of FIGURES 18 and 19. Of these timing signals, the timing signal L3 is applied to the base of the transistor 664, the timing signal L4 is applied to the base of the transistor 672, the timing signal L7 is applied to the base of the transistor 662 and the timing signal L8 is applied to the base of the transistor 674.

The timing signals LB and LD of FIGURE 14 are developed respectively by a pair of flip-flops 676 and 678 in FIGURE 17. The delayed timing signal $Z7_d$ from the assembly of FIGURE 13 is introduced to a grounded emitter transistor 680. The collector of that transistor is connected to the emitter of a transistor 682 and to the emitter of a transistor 684. The collector of a transistor 682 is connected to the false input terminal of the flip-flop 678, and the collector of a transistor 684 is connected to the false input terminal of a flip-flop 676. The term BMR from the flip-flop of FIGURE 15 is applied to the base of a grounded emitter transistor 686, the collector of which is connected to the false input terminal of the flip-flop 676. That term is also introduced to the base of a grounded emitter flip-flop 690, the collector of the later flip-flop being connected to the true input terminal of the flip-flop 678.

The clock pulses $Zo$ from the system of FIGURE 13 are applied to the base of a grounded emitter transistor 692. The collector of that transistor is connected to the emitter of a transistor 696. The collector of the transistor 694 is connected to the true input terminal of the flip-flop 678 and the collector of the transistor 696 is connected to the true input terminal of the flip-flop 676.

Of the timing signals developed by the circuitry of FIGURES 18 and 19, the timing L1 is introduced to the base of the transistor 682, and timing signal L2 is introduced to the base of the transistor 696. The timing signal L5 is introduced to the base of the transistor 684 and the timing signal L6 is introduced to the base of the transistor 694.

The logic circuitry of FIGURE 18 includes a plurality of logic gates which are used to form the signals L1, L2, L3 and L4. The signal L1 is formed by a pair of gates which respond to the terms $\overline{LA}$ and LB, the term L2 is formed by a pair of gates which respond to the terminals LD and $\overline{LA}$. The signal L3 is formed by a pair of gates which respond to the terms LC and $\overline{LB}$ and the signal L4 is formed by a pair of gates which respond to the terms LA and $\overline{LB}$.

In like manner the logic circuitry of FIGURE 19 is made up of a plurality of logic gates which are used to form the timing signals L5, L6, L7 and L8. The signal L5 is formed by a pair of gates which respond to the terms LD and $\overline{LC}$, and the signal L6 is formed by a pair of gates which respond to the terms LB and $\overline{LC}$. The signal L7 is formed by a pair of gates which respond to the terms LA and $\overline{LD}$, and the signal L8 is formed by a pair of gates which respond to the terms LC and $\overline{LD}$.

The timing signals L1–L8 are synchronized with the tape clock pulses $Zo$ and with the timing signals Z1–Z15 derived from these pulses. The timing signals L1–L8 are also synchronized and controlled by the block markings BM (SET) and BM (RESET) recorded on the magnetic memory tape 18. These timing signals are used in a manner to be described to control the activation of the flip-flops in the storage register 30 so that eight 7-bit characters may be successively loaded into the flip-flops of the storage register 30 during each loading cycle.

As shown in FIGURE 20, a load signal L is developed which goes true in timing coincidence with the trailing edges of each BMR pulse from the circuit of FIGURE 15, and which goes false at the termination of the tape clock pulse $Zo$ for any particular block of information recorded on the magnetic memory tape 18 in the block location following the block markings on the tap producing a corresponding BMR pulse. The BMR pulses are formed from the block markings on the tape as described in conjunction with FIGURE 15. The load signal L is used to condition the storage register for its loading cycle and to control the timing of a subsequent register unload signal U in a manner to be described. The unload signal U is used to control the timing of a plurality of gate signals and to precisely time those signals with the information read into the static register 30.

The load signal term L is formed by a flip-flop 700 in FIGURE 21. A transistor 702 has its collector connected to the true input terminal of the flip-flop 700. The emitter of the transistor 702 is grounded, and the BMR (RESET) block mark signal is introduced to the base of that transistor. The timing signal Z15 from the circuit of FIGURE 13 is introduced to the base of a grounded emitter transistor 704, the collector of that transistor is connected to the emitter of a transistor 706, and the collector of the latter transistor is connected to the left input terminal of the flip-flop 700. The timing signal $\overline{ZRo}$ (FIGURE 14) is introduced to the base of the transistor 706.

The flip-flop 700 forms the load signal term L of FIGURE 20 at its true output terminal. This signal L goes true at the trailing edges of the BMR signal because of the BMR (RESET) pulses introduced to the base of the transistor 702. At the termination of the reading of clock pulses from the tape, the term $\overline{ZRo}$ becomes true. Then, as the last pulse from the tape passes out of the delay line 502 in FIGURE 13, the term Z15 becomes true to trigger the flip-flop 700 false. This causes the load signal L to be formed, which signal is set true as each pair of block markings on the tape is read and remains true so long as there are clock pulses on the tape representing information recorded in the corresponding block location.

The information fed into the storage register 30 under the control of the L1–L8 gate signals of FIGURE 14 is read out of the storage register under the control of a group of unloading gate pulses U1–U8 of FIGURE 23. The information read into the storage register 30 is under the control of the clock pulses recorded on the tape and the information read out of the storage register is under the control of the associated computer bit timing pulses $S_z$–$S_7$, $T_7$.$T_w$. The information read out of the storage register 30 is subsequently processed to bring the timing of the characters comprising the words in the block of information to be brought into synchronization with the character timing of the associated computer. Then the block of information is further treated to bring the timing of the words in the block into correlation with the word timing of the associated computer.

It should also be noted that the loading of the storage register 30 proceeds in ring counter manner serially into the flip-flops D1–D56 of the register, and the unloading of the register also proceeds in the ring counter manner successively from the flip-flops D1–D56 of the register and at a predetermined displacement behind the loading.

The unloading gate signals U1–U8 have a timing illustrated in FIGURE 23. These gates are formed from a plurality of ring counter signals UA, UB, UC, and UD. A pair of counting signals UO and UO′ are also used to form the unload signal U. The timing of the unload signal U is caused to have a particular fixed relationship with respect to the loading signal L, as mentioned in conjunction with FIGURE 20, and as will be described in more detail. This causes all the unloading signals to lag the loading signals by a particular desired interval. Two further signals U′ and U*ch* are used in the formation of an additional character which is used to identify the leading character of the information readout of the storage register 30.

The signal U′ is formed by a flip-flop 710 in FIGURE 22. A grounded emitter transistor 712 has its collector connected to the false input terminal of the flip-flop 710, and a transistor 714 has its collector connected to the true input terminal of that flip-flop. A grounded emitter transistor 716 has its collector connected to the emitter of a transistor 718, and the collector of the latter transistor is connected to the emitter of the transistor 714.

The terms U and $\overline{U}$ are derived from a flip-flop 720 in FIGURE 22, the term U being introduced to the base of the transistor 712 and the term $\overline{U}$ being introduced to the base of the transistor 714. The term L3 of FIGURE 14 is applied to the base of the transistor 718, and the term Z4 of FIGURE 13 is applied to the base of the transistor 716.

A transistor 722 is connected to the true input terminal of the flip-flop 720 and a grounded emitter transistor 724 has its collector connected to the emitter of the transistor 722. A transistor 726 is connected to the false input terminal of the flip-flop 720, and a transistor 728 has its collector connected to the emitter of the transistor 726. A grounded emitter transistor 730 has its collector connected to the emitter of the transistor 728.

The flip-flop 724 develops the term U*ch*, and that term is applied to the base of the transistor 722. As mentioned above, and as shown in FIGURE 23, the term U*ch* is true for one character time preceding the leading character of the information readout of the register 30 by the unloading signal U, and an identifying leading character is inserted at this character time by the leading character insert circuit 32 of FIGURE 2, and in a manner to be subsequently described in detail.

The term $\overline{L}$ is introduced to the base of the transistor 726, so that the term U can be produced only after the termination of the loading cycle. The term $UO_1.T7.Tc$ is introduced to the base of the transistor 728, this latter term being formed from the term $UO_1$ derived from a flip-flop 732. A term $\overline{B.C}$ is applied to the base of the transistor 730, this latter term goes true when the last bit of a block of information is counted out of the register, and the term is formed in a manner to be described in conjunction with FIGURE 25. The term T7.TW is introduced to the base of the transistor 724, and it is derived from the computer associated with the system of the invention. This latter term, together with the U*ch* term, causes the unloading signal U to be set true one character time after the term U*ch* is set true.

The unloading signal U is applied to the base of a transistor 734, the collector of which is connected to the false input terminal of the flip-flop 724. The term U′ from the flip-flop 710 on the other hand is introduced to the base of a transistor 736, the collector of which is connected to the true input terminal of that flip-flop. The emitters of transistors 734 and 736 are connected to the collector of a grounded emitter transistor 738. The timing signal $T7.T_C$ is introduced to the base of the transistor 738.

The flip-flop 722 and a flip-flop 740 are used to count the odd and even characters out of the storage register. The flip-flop 732 produces the signal U′O as mentioned above, and the flip-flop 740 produces the signal UO.

The term $\overline{Uo'}$ is applied to the base of a transistor 742 in FIGURE 22, and the term UO′ is applied to the base of a transistors 744. The emitters of the transistors 742 and 744 are connected to the collector of a grounded emitter transistor 746. The timing signal $T7.T_C$ is applied to the base of the transistor 746. The collector of the transistor 742 is connected to the false input terminal of the flip-flop 740, and the collector of the transistor 744 is connected to the true input terminal of that flip-flop.

The term U*o* is applied to the base of a transistor 748, and the term $\overline{Uo}$ is applied to the base of a transistor 750. The emitters of the transistors 748 and 750 are connected to the collector of a transistor 752. The emitter of the latter transistor is grounded, and the bit timing signal S2 from the associated computer is applied to its base. The collector of the transistor 748 is connected to the false input terminal of the flip-flop 732, and the collector of the transistor 750 is connected to the true input terminal of that flip-flop. A grounded emitter transistor 754 also has its collector connected to the collector of the transistor 750. The term U′ is applied to the base of the transistor 754.

The circuitry of FIGURE 22 causes the signal U′ to go true at Z4 bit time of the L3 loading gate signal, and before the unloading signal U goes true. When the signal U′ goes true, it sets the flip-flop 732 true to cause the term U*o*′ to go true before the unloading signal U becomes true, and this in turn causes the flip-flop 740 to be set true at the next computer $T7.T_C$ time (FIGURE 23) to cause the signal U*o* to become true. The flip-flops 740 (U*o*) and 732 ($U_o'$) then proceed to count out character times, as shown in FIGURE 23, the transition in the signal U*o* occurring at T7.TC time in each character, and the transitions in the signal U*o*′ occurring at $S_z$ time in each character.

When the signal U′ goes true, it further serves to set the flip-flop 724 true at the following $T7.T_C$ time. The signal U*ch* serves as a timing signal for the leading character, which is introduced into the system by the leading character insert circuit 32 (FIGURE 2) at U*ch* time to identify the leading character of the leading word in the information readout of the storage register 30. As noted above, this timing signal U*ch* is true for one character time preceding the time the unloading signal U goes true.

The $T7.T_W$ time after the signal U*ch* goes true, the flip-flop 720 is set true to cause the unloading signal U to go true. At the immediately following $T_C$ time, the flip-flop 724 is set false to cause the signal U*ch* to go false. The unloading signal U now remains true until the loading signal L goes false, indicating that the loading into the register 30 has been completed, and the term $\overline{B}.C$ (FIGURE 25) goes true, indicating that the last bit of information has been counted out of the register 30. Then, at the following computer T7.TC time, the flip-flop 720 is set false to set the signal U false.

The unloading of the storage register 30 is controlled by a ring counter arrangement. The ring counter responds to the timing signals UA, UB, UC and UD of FIGURES 23 and 24. These timing signals are used by the ring counter to generate appropriate gate signals U1–U8, the gate signals having a timing illustrated by the corresponding curves of FIGURE 23.

Figure 24:
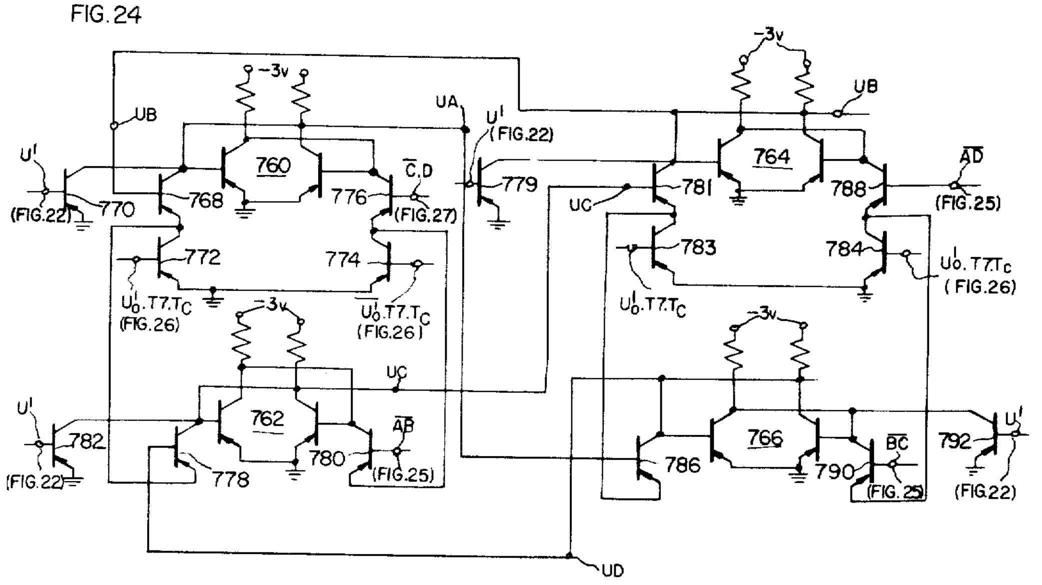
Figure 25:
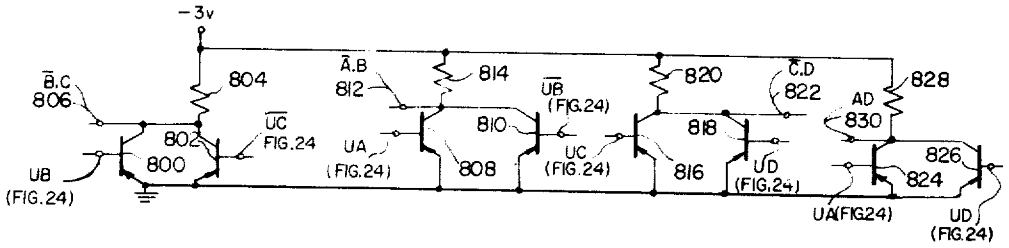
Figure 26:
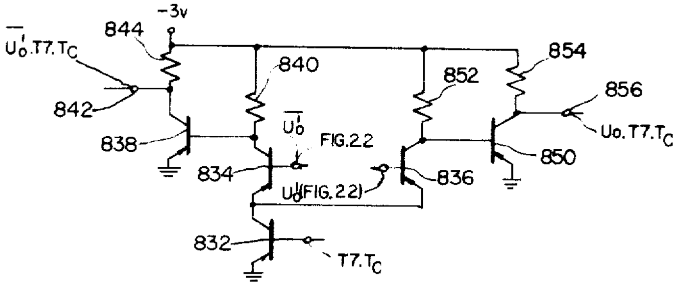

The timing signals UA, UB, UC and UD are formed by the logic circuitry of FIGURES 24, 25, and 26. The circuitry of FIGURE 24 includes four flip-flops which are designated 760, 762, 764 and 766, respectively. The flip-flop 760 develops the timing signal UA, the flip-flop 762 develops the timing signal UC, the flip-flop 764 develops the signal UB, and the flip-flop 766 develops the signal UD.

The signal UB is introduced to a transistor 768 in FIGURE 24. The collector of this transistor is connected to the false input terminal of the flip-flop 760, as is the collector of a grounded emitter transistor 770. The timing signal U' (FIGURE 22) is applied to the base of the transistor 770. A timing signal $Uo'T7.T_C$ is applied to the base of a grounded emitter transistor 772. This term is derived from the circuitry of FIGURE 26, as will be described, the collector of that transistor being connected to the emitter of the transistor 768.

The term $\overline{Uo}'.T7.T_C$, which is also derived from the circuitry of FIGURE 26, is applied to the base of a grounded emitter transistor 774 in FIGURE 24. The collector of the latter transistor is connected to the emitter of a transistor 776. A term $\overline{C}.D$ which is derived from the circuitry of FIGURE 25, to be described, is applied to the base of the transistor 776. The collector of the transistor 776 is connected to the true input terminal of the flip-flop 760.

The timing signal UD is applied to the base of a transistor 778, and a term $\overline{A}.B$ (FIGURE 25) is applied to the base of a transistor 780. The emitter of the transistor 778 is connected to the collector of the transistor 772, and the emitter of the transistor 780 is connected to the collector of a transistor 774. The emitter of the transistor 778 is connected to the false input terminal of the flip-flop 762, as is the collector of a grounded emitter transistor 782. The term U' (FIGURE 22) is applied to the base of the transistor 782.

The term U' (FIGURE 22) is also applied to the base of a grounded emitter transistor 779, and the timing signal UC is applied to the base of a transistor 781. The collectors of the transistors 779 and 781 are connected to the false input terminal of the flip-flop 764.

The timing signal $\overline{U}_o.T7.T_C$ (FIGURE 26) is also applied to the base of a grounded emitter transistor 783, and the term $\overline{Uo}'.T7.T_C$ (FIGURE 26) is applied to the base of a grounded emitter transistor 784. The collector of the transistor 782 is connected to the emitter of the transistor 780 and to the emitter of a transistor 786. The collector of the transistor 784 is connected to the emitter of the transistor 788 and to the emitter of a transistor 790. The collector of the transistor 788 is connected to the true input terminal of the flip-flop 764. The term $A.\overline{D}$ (FIGURE 25) is applied to the base of the transistor 788.

The timing signal UA is applied to the base of the transistor 786, and a term $\overline{B}.C$ (FIGURE 25) is applied to the base of the transistor 786, and a term $\overline{B}.C$ (FIGURE 25) is applied to the base of the transistor 790. The collector of the transistor 786 is connected to the false input terminal of the flip-flop 766, and the collector of the transistor 790 is connected to the true input terminal of that flip-flop. The term U' (FIGURE 22) is applied to the base of a grounded emitter transistor 792, and the collector of that transistor is also connected to the true input terminal of the flip-flop 766.

The terms $\overline{B}.C$, $\overline{A}.B$, $\overline{C}.D$ and $A.\overline{D}$ used in the circuitry of FIGURE 24 are developed by the logic circuitry of FIGURE 25. The timing signal UB (FIGURE 24) and the timing signal UC (FIGURE 24) are applied, respectively, to the bases of a pair of grounded emitter transistors 800 and 802 in FIGURE 25. The collectors of these transistors are connected to a resistor 804 and to on output terminal 806. The resistor 804 may have a resistance of 3.9 kilo-ohms and it is connected to the negative terminal of the 3-volt direct voltage source. The term $\overline{B}.C$ is developed at the output terminal 806.

The terms UA and $\overline{UB}$ are applied, respectively, to the bases of a pair of grounded emitter transistors 806 and 808. These terms are also derived from the circuitry of FIGURE 24, as described above. The collectors of the transistors 808 and 810 are connected to an output terminal 812 and to a resistor 814. The resistor 814 may have a resistance of 3.9 kilo-ohms, and it is connected to the negative terminal of the 3-volt direct voltage source. The term $\overline{A}.B$ is developed at the output terminal 812.

The timing signals UC and $\overline{UD}$ of FIGURE 24 are, respectively, applied to the bases of a pair of grounded emitter transistors 816 and 818. The collectors of these transistors are connected to a 3.9 kilo-ohm resistor 820 and to an output terminal 822. The resistors are connected to the negative terminal of the 3-volt direct voltage source and the term $\overline{C}.D$ is derived at the output terminal 822.

The timing signals $\overline{UA}$ and UD of FIGURE 24 are, respectively applied to the bases of a pair of transistors 824 and 826. The emitters of these transistors are grounded, and their collectors are connected to a resistor 828 and to an output terminal 830. The resistor may have a resistance of 3.9 kilo-ohms, and it is connected to the negative terminal of the 3-volt direct voltage source. The term $\overline{A}.D$ is derived at the output terminal 830.

As noted above, the term $\overline{Uo}'.T7.T_C$ and the term $Uo'.T7.T_C$ are developed by the circuitry of FIGURE 26. The circuitry includes a grounded emitter transistor 832 which receives the timing signal $T7.T_C$ (FIGURE 23). The collector of the transistor 832 is connected to the emitter of a transistor 834 and to the emitter of a transistor 836. The term $\overline{Uo'}$ (FIGURE 22) is applied to the base of the transistor 834, and the term Uo' (FIGURE 22) is applied to the base of the transistor 836. The collector of the transistor 834 is connected to a grounded emitter transistor 838 and to a resistor 840. The resistor 840 may have a resistance of 3.9 kilo-ohms, and it is connected to the negative terminal of the 3-volt direct voltage source. The collector of the transistor 838 is connected to an output terminal 842 and to a resistor 844. The resistor 844 may have a resistance of 2.2 kilo-ohms, and it is connected to the negative terminal of the 3-volt direct voltage source. The term $\overline{Uo}'.T7.T_C$ is developed at the output terminal 842.

The collector of the transistor 836 is connected to the base of a grounded emitter transistor 850 and to a resistor 852. The resistor 852 may have a resistance of 3.9 kilo-ohms, for example, and it is connected to the negative terminal of the 3-volt direct voltage source. The collector of the transistor 850 is connected to a resistor 854 and to an output terminal 856. The resistor 854 may have a resistance of 2.2 kilo-ohms, and it is connected to the negative terminal of the 3-volt direct voltage source. The term $Uo'.T7.T_C$ is developed at the output terminal 856.

Figures 27, 28:
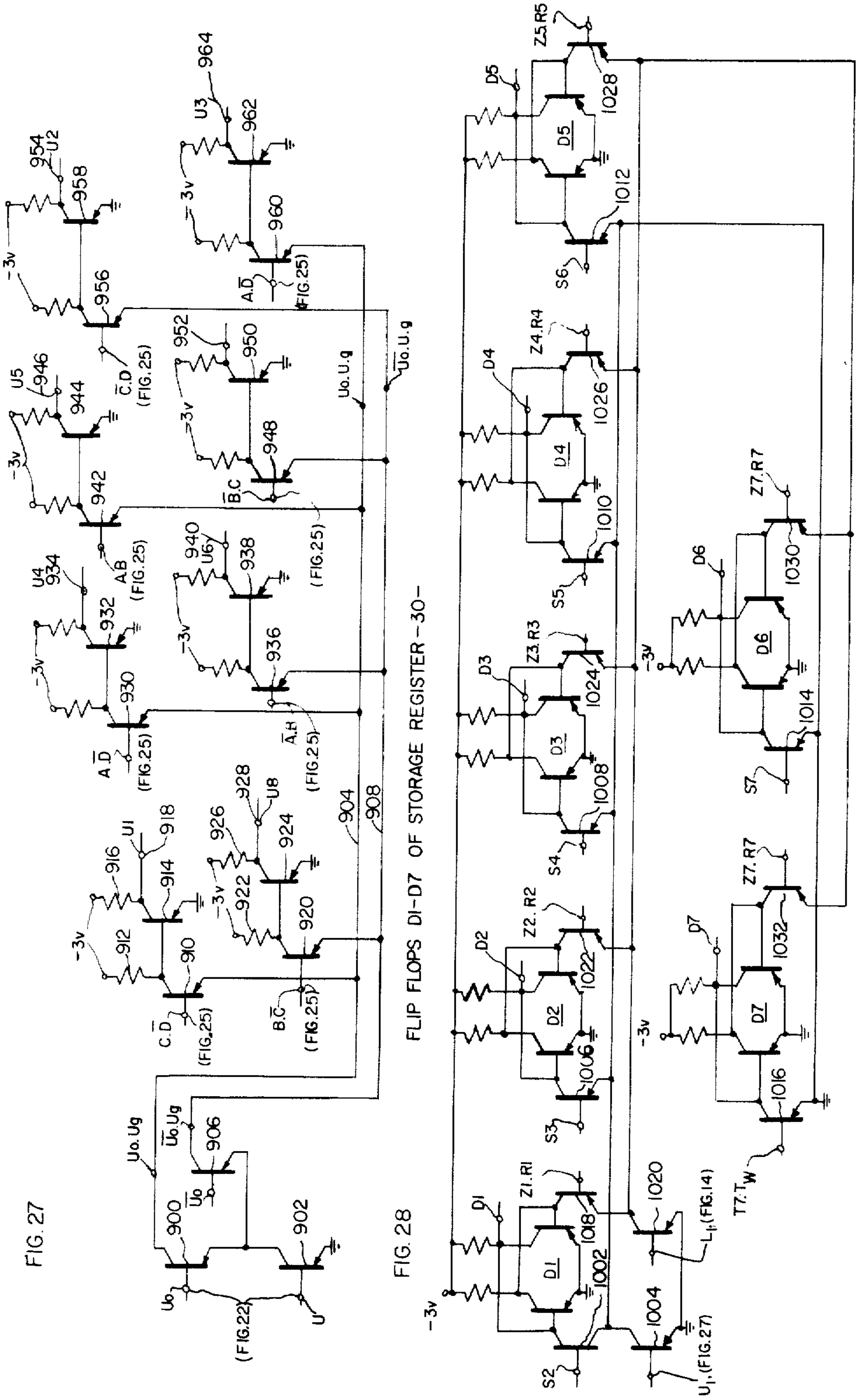

The unloading gate signals U1–U8 are formed by the logic circuitry of FIGURE 27. The timing signal *Uo* of FIGURE 22 is introduced to the base of a transistor 900 in FIGURE 27, and the timing signal U of FIGURE 22 is introduced to the base of a transistor 902. The emitter of the transistor 902 is grounded, and the collector of that transistor is connected to the emitter of the transistor 900. The collector of the transistor 900 is connected to a common lead 904, and the collector of the transistor 902 is connected to the emitter of a transistor 906. The term $\overline{Uo}$ is applied to the base of the transistor 906, and the collector of that transistor is connected to a common lead 908. The term *Uo*.U.*g* appears on the lead 904, and the term $\overline{Uo.U.g}$ appears on the lead 908.

The term $\overline{C.D}$, which is derived from the circuitry of FIGURE 25, is applied to the base of a transistor 910. The emitter of that transistor is connected to the lead 904, and the collector of the transistor is connected to a resistor 912 and to the base of a grounded emitter transistor 914. The resistor 912 may have a resistance, 2.2 kilo-ohms, and it is connected to the negative terminal of the 3-volt direct voltage source. The collector of the transistor 914 is connected to a resistor 916 and to an output terminal 918 at which the gate signal U1 appears. The resistor 916 may have a resistance of 2.2 kilo-ohms, and it is connected to the negative terminal of the 3-volt direct voltage source.

The term $\overline{B}$.C of FIGURE 25 is applied to the base of a transistor 920. The emitter of that transistor is connected to the common lead 908, and the collector is connected to a resistor 922 and to the base of a grounded emitter transistor 924. The resistor 922 may have a resistance of 2.2 kilo-ohms, and it is connected to the negative terminal of the 3-volt direct voltage source. The collector of the transistor 924 is connected to a resistor 926 and to an output terminal 928. The resistor 926 may have a resistance of 2.2 kilo-ohms, and it is connected to the negative terminal of the 3-volt direct voltage source. The gate signal U8 is developed at the output terminal 928.

The term A.$\overline{D}$ of FIGURE 25 is applied to the base of a transistor 930. The emitter of the transistor 930 is connected to the common lead 908. The collector of the transistor 930 is connected to the base of a second transistor 932. The circuitry of these transistors is similar to the circuitry described above, and the circuitry includes an output terminal 934 at which the gate signal U4 appears.

The term $\overline{A}$.B of FIGURE 25 is applied to the base of transistor 936. The emitter of the transistor 936 is connected to the common lead 908, and the collector of that transistor is connected to the base of a transistor 938. These transistors, likewise, are connected in a circuit similar to the circuit described above, and this circuit has an output terminal 940 at which the gate signal U6 is developed.

The term $\overline{A}$.B of FIGURE 25 is applied to a transistor circuit which includes a pair of transistors 942 and 944, and which has composition similar to the circuits described above. The emitter of the transistor 942 is connected to the common lead 904, and the collector of the transistor 944 is connected to an output terminal 946 at which the gate signal U5 appears.

The term $\overline{B}$.C of FIGURE 25 is introduced to a circuit which includes a pair of transistors 948 and 950. These transistors also are connected in a manner similar to the circuits described above. The emitter of the transistor 948 is connected to the common lead 904, and the collector of the transistor 950 is connected to an output terminal 952 at which the gate signal U7 appears.

The gate signal U2 is developed at an output terminal 954 of a circuit which includes a pair of transistors 956 and 958. These transistors also are connected in a circuit similar to the circuits described above. The term $\overline{C}$.D of FIGURE 25 is applied to the base of the transistor 956, and the emitter of that transistor is connected to the common lead 908.

The term A.$\overline{D}$ of FIGURE 25 is applied to the base of a transistor 960. The emitter of that transistor is connected to the common lead 904, and the collector of the transistor is connected to the base of a grounded emitter transistor 962. The transistors 960 and 962 are also connected in a circuit similar to the cricuit described above. The collector of the transistor 962 is connected to an ouput terminal 964 at which the gate signal U3 is developed.

As mentioned previously, the storage register 30 of FIGURE 2 includes 56 flip-flops. The circuitry of these flip-flops is set out in groups in FIGURES 28–35. The first group of flip-flops designated D1–D7 are represented in FIGURE 28. The false input terminal of the flip-flop D1 is controlled by an "and" gate formed by a pair of transistors 1002 and 1004. In like manner, the false input terminal of the flip-flops D2–D7 are controlled by "and" gates formed by the transistor 1004 and by a plurality of additional transistors 1006, 1008, 1010, 1012, 1014 and 1016, respectively.

The true input terminal of the flip-flop D1 is controlled by an "and" gate formed by a pair of transistors 1018 and 1020. The true input terminals of the flip-flops D2–D7 are controlled by "and" gates formed by the transistor 1020 and by additional transistors 1022, 1024, 1026, 1028, 1030 and 1032, respectively. The timing signals S2–S7 are respectively introduced to the bases of the transistors 1002, 1006, 1008, 1010, 1012 and 1014. The timing signal T7.TW is applied to the base of the transistor 1016. The gate signal U1 of FIGURE 27 is applied to the base of the transistor 1004. The gate signal L1 of FIGURE 14 is applied to the base of the transistor 1020. The timing signals Z1.R1, Z2.R2, Z3.R3, Z4.R4, Z5.R5, Z6.R6 and Z7.R7 from the clock assembly of FIGURE 13 are applied to bases of respective ones of the transistors 1018, 1022, 1024, 1026, 1028, 1030 and 1032.

Figure 29:
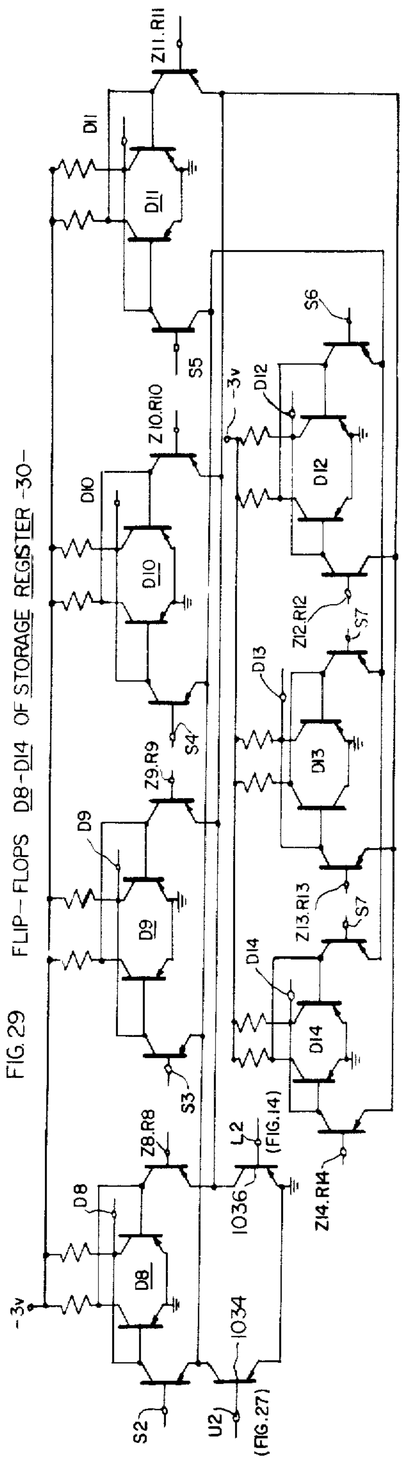

A second group of the flip-flops of the storage register 30, namely the flip-flops D8, D9, D10, D11, D12, D13 and D14, are set out in FIGURE 29. The control of these flip-flops is similar to the control described in conjunction with FIGURE 28. However, in the latter circuit, the common transistor for the false input terminals of the flip-flop is a transistor 1034, and the gate signal U2 of FIGURE 27 is applied to the base of that transistor. Likewise, the common transistor for the true input terminals of the flip-flops in FIGURE 29 is a transistor 1036, and the term L2 of FIGURE 14 is applied to the base of that transistor. The timing signals applied to the true input terminal transistors for the flip-flops D8–D14 are Z8.R8, Z9.R9, Z10.R10, Z11.R11, Z12.R12, Z13.R13 and Z14.R14. These latter timing signals, likewise, are derived from the clock assembly of FIGURE 13.

Figure 30:
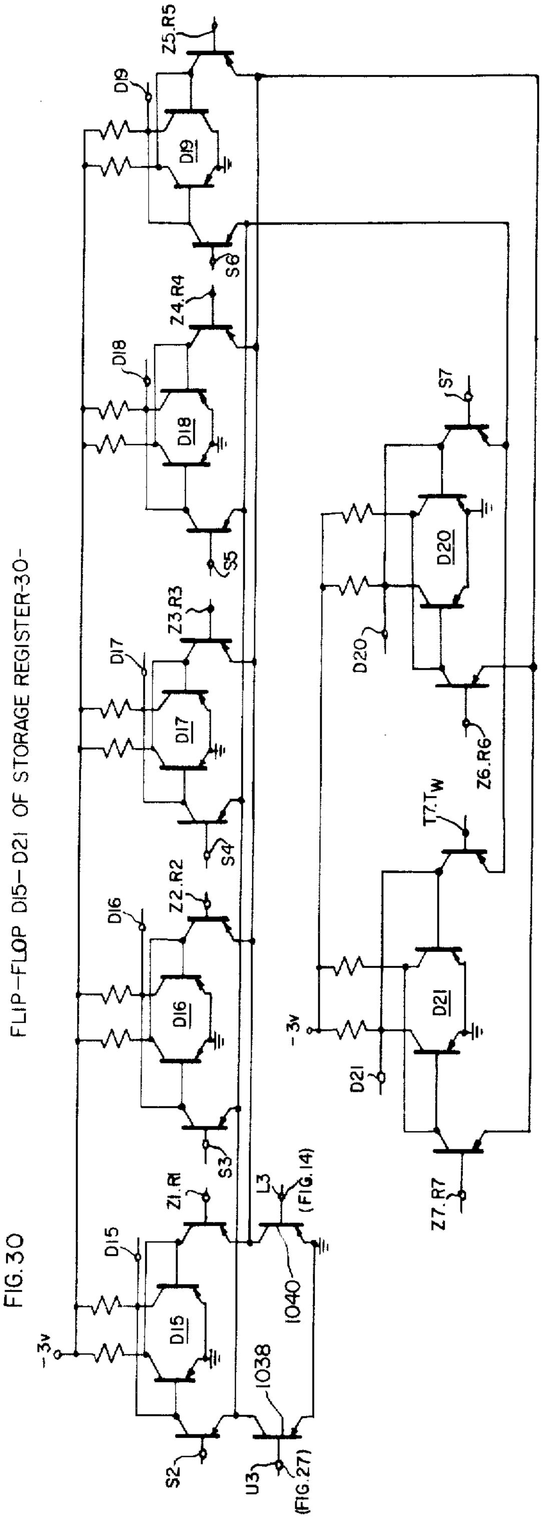

A further group of flip-flops in the storage register, namely the group D15–D21, are set out in FIGURE 30. The timing signals introduced to the flip-flops of the group of FIGURE 30 are the same as the timing signals introduced to the group in FIGURE 28. However, the common transistor for the false input terminals of the flip-flops D15–D21 is a transistor 1038, and the gate signal U3 of FIGURE 27 is applied to the base of that transistor. Likewise, the common transistor of the "and" gates for the true input terminals of the flip-flops D15–D21 is a transistor 1040, and the gate signal L3 of FIGURE 14 is applied to the base of that transistor.

Figure 31:
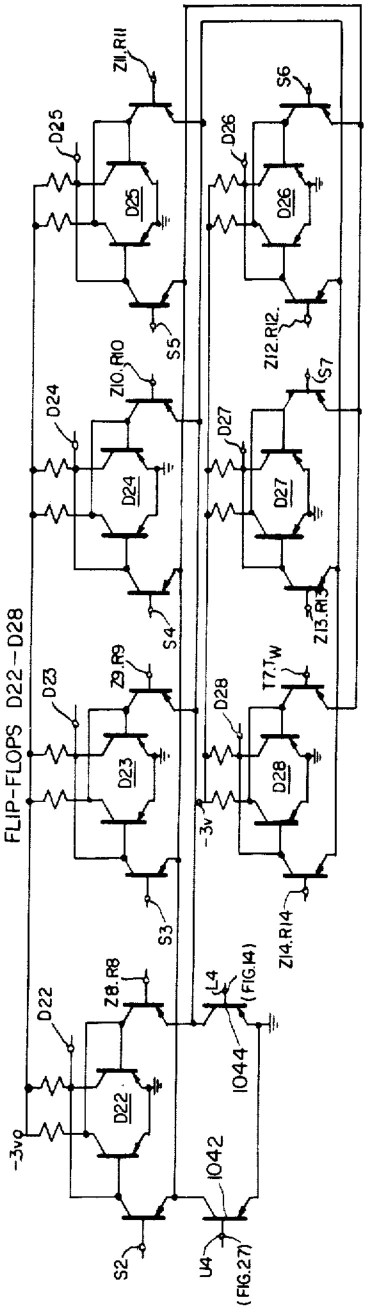

A fourth group of flip-flops in the storage register 30, namely the flip-flops D22–D28, are set out in FIGURE 31. The flip-flops of this latter group are controlled by the same timing signals as the flip-flops of FIGURE 29. However, the common transistor in the "and" gate for the false input terminals of the flip-flops D22–D28 is a transistor 1042, and the gate signal U4 of FIGURE 27 is applied to the base of that transistor. Likewise, the common transistor for the "and" gate for the true input terminals of the flip-flops D22–D28 is a transistor 1044. The gate signal L4 of FIGURE 14 is applied to the base of the transistor 1044.

Figure 32:
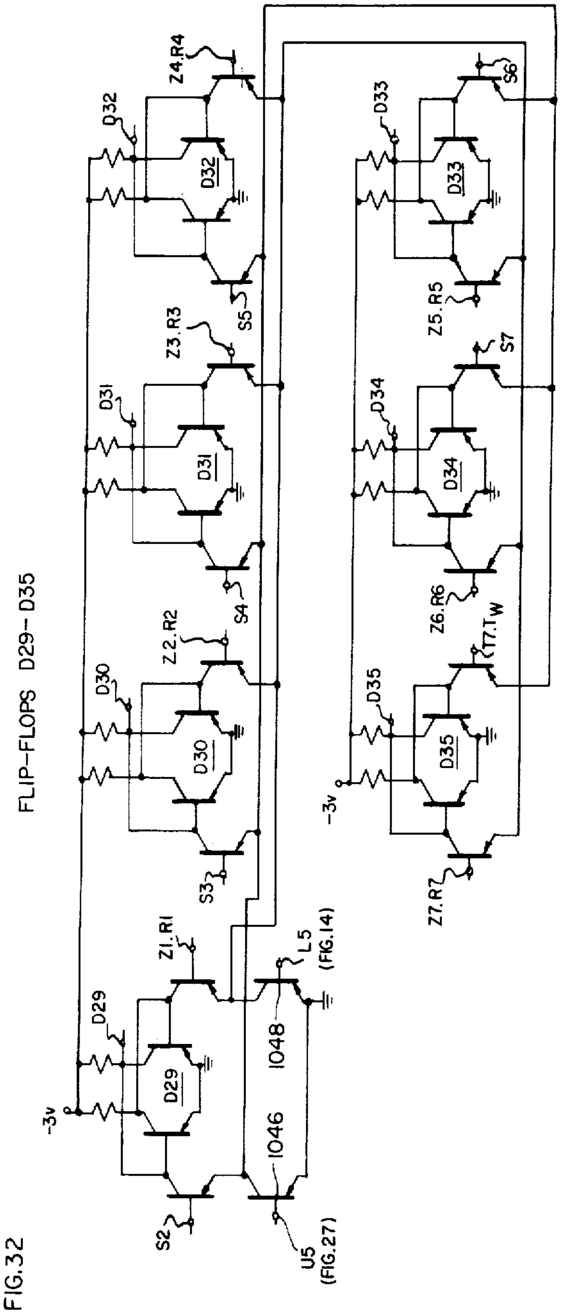

The flip-flops D29–D35 of the storage register 30 are set out in FIGURE 32. The timing of these flip-flops is controlled in the same manner as the flip-flops of FIGURE 28. However, the "and" gates connected to the false input terminals of the flip-flops D29–D35 include a common transistor 1046, and the gate signal U5 of FIGURE 27 is applied to the base of that transistor. The "and" gate connected to the true input terminals of the flip-flops D29–D35 include a common transistor 1048 and the gate signal L5 of FIGURE 14 is applied to the base of the latter transistor.

Figure 33:
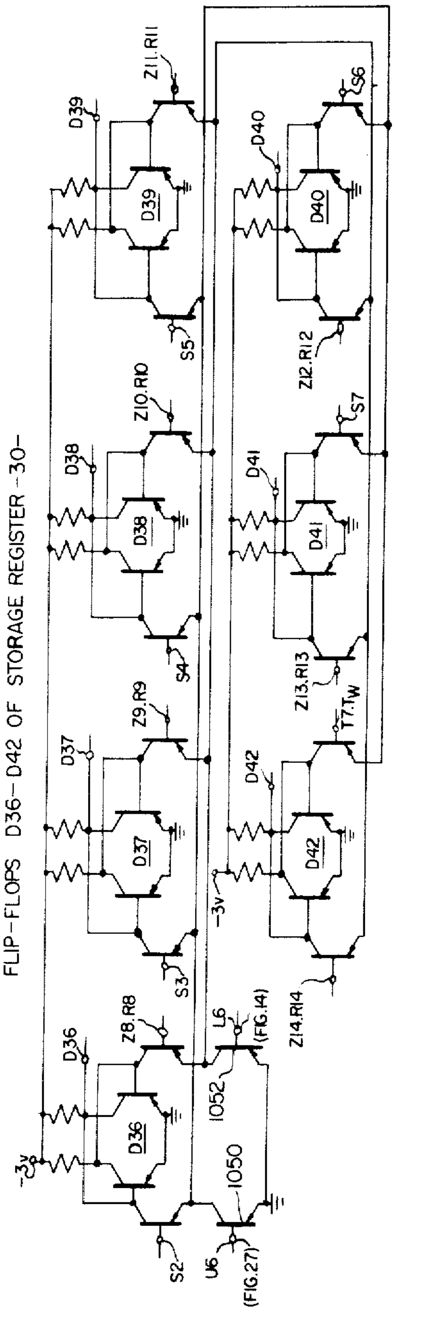

The flip-flops D36–D42 of the storage register 30 are set out in FIGURE 33. The timing of these flip-flops is controlled in the same manner as the flip-flops of FIGURE 29. However, the "and" gates connected to the false input terminals of the flip-flops D36–D42 include a common transistor 1050, and the gate signal U6 of FIGURE 27 is applied to the base of that transistor. Likewise, the "and" gate connected to the true input terminals of the flip-flops D36–D42 include a common transistor 1052, and the gate signal L6 of FIGURE 14 is applied to the base of that transistor.

A further group of flip-flops D43–D49 are set out in

Figure 34:
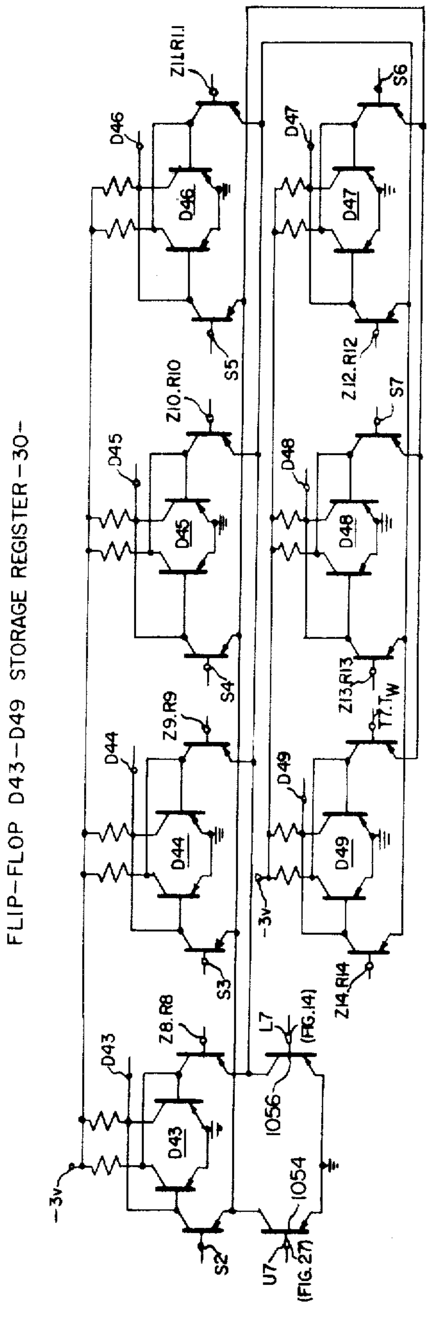

FIGURE 34. The timing of the flip-flops of this latter group is similar to the timing of the flip-flops of FIGURE 28. However, the "and" gates connected to the false input terminal of the flip-flops D43–D48 includes a common transistor 1054, and the gate signal U7 of FIGURE 27 is applied to the base of that transistor. In like manner, the "and" gates connected to the true input terminals of the flip-flops D43–D48 include a common transistor 1056, and the gate signal L7 of FIGURE 14 is applied to the base of that transistor.

Figure 35:
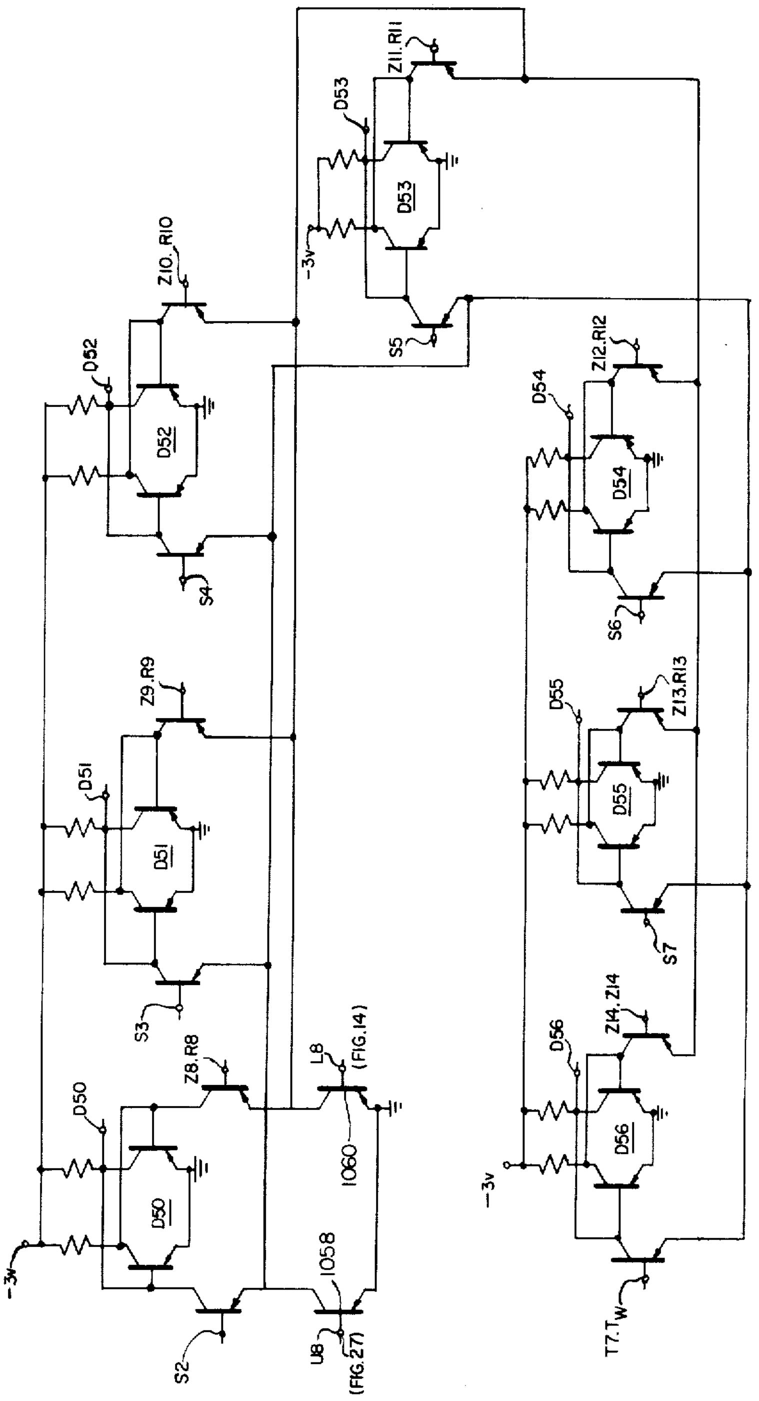

The final group of flip-flops, namely D50–D56, of the storage register 30, are shown in circuit detail in FIGURE 35. The timing of this latter group of flip-flops is similar to the timing of the flip-flops of FIGURE 29. However, the "and" gates connected to the false input terminals of the flip-flops D50–D56 include a common transistor 1058, and the gate signal U8 of FIGURE 27 is applied to the base of that transistor. Likewise, the "and" gates connected to the true input terminals of the flip-flops D50–D56 includes a common transistor 1060, and the gate signal L8 of FIGURE 14 is applied to the base of that transistor.

During the loading cycle the gate signals L1–L8 of FIGURE 14 goes true in succession, so that the flip-flop groups of FIGURES 28–35 may be successively loaded. For example, when the gate signal L1 goes true, the flip-flops D1–D7 of FIGURE 28 are conditioned for actuation. Then, during the succeeding tape bit timing signals Z1–Z7 derived from the tape clock assembly 28 of FIGURE 13, the corresponding first character bit signals R1–R7 from the tape are read into the flip-flops D1–D7, respectively. The individual flip-flops of groups D1–D7 are set true each time a corresponding unity bit from the tape is encountered by the read heads associated with the read amplifiers 22.

The flip-flops D1–D7 of FIGURE 28 are subsequently all reset to the false state during the unload cycle, and in the presence of the U1 gate signal. This reset occurs at successive times S2–S7, T7.TW for successive ones of the flip-flops in the group. The successive flip-flops are read out, however, in a manner to be described in each instance just before they are reset false.

In like manner, the flip-flops D8–D14 of the group in FIGURE 29 are conditioned to receive information from the tape by the gate signal L2, and the second character bits from the tape are read into successive ones of the flip-flops D8–D14 under the control of the tape bit timing signals Z8–Z14 from the system of FIGURE 13. The second group of flip-flops D8–D14 are unloaded under the control of the computer bit timing pulses, as will be described, and these flip-flops are then reset false successively by the computer bit timing pulses S2–S7, T7.TW and in the presence of the unload gate signal U2.

Likewise, the flip-flops of the groups illustrated in FIGURES 30–35 are controlled to receive successively the bits of the remaining characters of the block of information on the tape, as that block is read into the register 30. This loading control is by respective ones of the gates L3–L8. The flip-flops are then unloaded into the computer by successive series of bit timing pulses S1–S7 from the computer, as will be described, and under the control of successive ones of the gate signals U3–U8. The flip-flops of these latter groups are then successively reset false in a manner similar to that described above.

In the manner described, therefore, as each block of information is read from the tape, that block is serially loaded into the flip-flops D1–D56 of the storage register 30. The flip-flops D1–D56 are subsequently unloaded, and during that operation the flip-flops are successively set false to be in condition to receive the next block of information from the tape.

The circuitry of FIGURE 36 enables the information stored in the successive flip-flops of the storage register 30 to be read out of those flip-flops. The readout occurs successively under the control of the gate signals U1–U7. When the signal U1 is true, the outputs from the group of flip-flops D1–D7 are successively read to a common lead 1100 which is connected to an output terminal 1102. The output terminal is connected to the circuitry of FIGURE 37. The successive readout of the flip-flops D1–D7 is under the control of a group of "and" gates designated 1104, as timed by the bit timing signals S1–S7 from the computer. As mentioned above, just after the readout of the group of flip-flops D1–D7, these flip-flops are set false in readiness for loading from the next block of information read out of the memory tape. Immediately after the information has been read out of the group of flip-flops D1–D7, the gate signal U2 becomes true to cause a second group of "and" gates 1106 to be enabled. The information from the second group of "and" gates is then introduced in serial form by way of the common lead 1100 to the output terminal 1102. The "and" gates of the group 1106 cause the information stored in the flip-flop D10–D14 to be read successively to the output terminal 1102 at S1–S7 computer bit times. In like manner, the gate signal U3 controls a group of "and" gates 1108 to permit the information from the group of flip-flops D15–D21 to be successively read to the output terminal 1102 at the same successive computer bit times.

The gate signal U4 then goes true to connect a group of "and" gates 1110 to the common lead 1100. This latter group of "and" gates causes the information from the flip-flops D22–D28 to be successively read to the lead 1100 in successive S1–S7 computer bit times. Likewise, the gate signal U5 connects a group of "and" gates 1112 to the common lead 1100 to permit the flip-flops D29–D36 to have their information read into the circuitry of FIGURE 37 at S1–S7 bit times successively. The gate signal U6 connects a group of "and" gates 1114 to the common lead 1100 to permit the flip-flops D36–D42 to have their contents serially read into the circuitry of FIGURE 37. The group of "and" gates 1116 is connected to the common lead 1100 when the gate signal U7 is true, so that the contents of the flip-flops D43–D49 may be serially read into the circuitry of FIGURE 37 at S1–S7 bit times. Finally, the gate U8 connects a group of "and" gates 1118 to the common lead 1100, to permit the contents of the flip-flops D50–D56 to be read into the circuitry of FIGURE 37.

It will be appreciated from a consideration of the circuits of FIGURES 28–36 that the groups of flip-flops in the storage register 30 are loaded successively, and that the individual flip-flops in each group are also successively loaded. Successive pairs of groups of the flip-flops contain successive pairs of characters from the memory tape. The entire operation, therefore, proceeds on a serial basis. The block of information from the magnetic storage tape is read into the storage register 30 on a bit-by-bit basis under the control of the tape timing clock pulses, and the block of information is read out of the storage register serially on a bit-by-bit basis under the control of the computer bit timing signals S1–S7 which repeat for each group.

The circuitry described above, therefore, causes the blocks of information to be successively loaded from the tape 18 into the storage register 30 at the tape bit times, and to be successively unloaded from the storage register 30 at the computer bit times. The first character of the first word of each block of information read from the tape is indicated by the preceding leading character symbol which is inserted at Uc.*h* time in the manner to be described in conjunction with FIGURE 37. However, although the bit times of the information readout of the register 30 are synchronized with the computer bit times, the character times of this information are not so synchronized nor are the word times.

The character times of the information readout of the register 30 are synchronized with the computer character times in the circuitry of FIGURE 37. This circuitry is contained in the character unscrambler block 34 referred to in FIGURE 2. The circuitry of FIGURE 37 includes an input terminal 1130 which receives the information from the output terminal 1102 of FIGURE 36. This input terminal 1130 is connected to the base of a transistor 1132. A grounded emitter transistor 1134, has its collector connected to an emitter of a transistor 1136, and the collector of the latter transistor is also connected to the base of the transistor 1132 and to a resistor 1138. A resistor 1138 may have a resistance of 4.7 kilo-ohms, and it is connected to the negative terminal of the 3-volt direct voltage source. The timing signal U*ch* is applied to the base of the transistor 1136, and the timing signal S1 is applied to the base of the transistor 1134.

The collector of the transistor 1132 is connected to the base of a transistor 1140 and to a resistor 1142. A resistor 1142 may have a resistance of 3.9 kilo-ohms, and it is connected to the negative terminal of the 3-volt direct voltage source. The collector of the transistor 1142 is connected to the false input terminal of the flip-flop 1142. The collector of a transistor 1144 is connected to the true input terminal of that flip-flop, and the emitter of that transistor is grounded. The clock pulses $T_C$ are applied to the base of the transistor 1144. The true output terminal of the flip-flop 1142 develops a term 1*ch*.$W_1^0$, and that term is introduced to the base of a grounded emitter transistor 1146 and to the input terminal of a delay line which is designated 1*ch*.

The collector of the transistor 1146 is connected to the emitter of a transistor 1148. The collector of the transistor 1148 is connected to the input terminal of a delay line designated 2*ch* and to a resistor 1150. The resistor 1150 may have a resistance of 3.9 kilo-ohms, and it is connected to the negative terminal of the 3-volt direct voltage source. A term $\overline{1ch}$ is applied to the base of the transistor 1148, and that term is derived from the circuitry of FIGURE 39, in a manner to be described.

The delay line 1*ch* develops an output signal 1*ch*.R, and that output signal is applied to the base of a grounded emitter transistor 1152. The collector of the transistor 1152 is connected to the emitter of a transistor 1154, and the collector of the latter transistor is also connected to the input terminal of the delay line 2*ch*. The input signal to that delay line is designated 2*ch*.$W_1^0$. The term 1*ch* is derived from the circuitry of FIGURE 39, and is applied to the base of the transistor 1154. The term 2*ch*.$W_1^0$ is also applied to the base of a grounded emitter transistor 1156. The collector of the latter transistor is connected to the base of a grounded emitter transistor 1158 and to a resistor 1160. A resistor 1160 may have a resistance of 3.9 kilo-ohms, for example, and it is connected to the negative terminal of the 3-volt direct voltage source. The collector of a transistor 1158 is connected to the emitter of a transistor 1162 and the collector of the latter transistor assists in introducing a term for 1*ch*.$W_1^0$ to a delay line 2*ch*. A term 2*ch* is derived from the circuitry of FIGURE 39, and is applied to the base of the transistor 1162.

The delay line 2*ch* develops an output signal 2*ch*.R, and this output signal is applied to the base of a grounded emitter transistor 1164. The collector of the transistor 1164 is connected to the emitter of a transistor 1166, and the collector of the latter transistor is connected to the delay line 4*ch* and to a resistor 1168. A resistor 1168 may have a resistance of 3.9 kilo-ohms, and it is connected to the negative terminal of the 3-volt direct voltage source. The term 2*ch* of FIGURE 39 is applied to the base of the transistor 1166.

The term 4*ch*.$W_1^0$ is also introduced to the base of a grounded emitter transistor 1170. The collector of the latter transistor is connected to the base of a grounded emitter transistor 1172 and to a resistor 1174. The resistor 1174 may have a resistance of 3.9 kilo-ohms, and it is connected to the negative terminal of the 3-volt direct voltage source. The collector of the transistor 1172 is connected to the emitter of a transistor 1176. A term $\overline{4ch}$ is derived from the circuitry of FIGURE 39 and is applied to the base of the transistor 1176, and the term 4*ch* from that circuitry is applied to the base of a transistor 1178. The collectors of the transistors 1176 and 1178 supply an input signal 6*ch*.$W_1^0$ to a delay line designated 6*ch*. The delay line 4*ch* develops an output signal 4*ch*.R, and that output signal is applied to the base of a grounded emitter transistor 1180. The collector of the transistor 1180 is connected to the emitter of the transistor 1178. The collectors of the transistors 1176 and 1178 are connected to a resistor 1182. The resistor may have a resistance of 3.9 kilo-ohms, and it is connected to the negative terminal of the 3-volt direct voltage source.

The delay line 6*ch* develops an output signal 6*ch*.R, and that output signal is applied to the base of a grounded emitter 1182. The term 6*ch*.$W_1^0$ is applied to the base of a grounded emitter transistor 1184. The collector of the latter transistor is connected to a resistor 1186, and it is further connected to the base of a grounded emitter transistor 1188. The resistor 1186 may have a resistance of 3.7 kilo-ohms, and it is connected to the negative terminal of a 3-volt direct voltage source.

A term $\overline{6ch}$ is derived from the circuitry of FIGURE 39, and that term is applied to the base of a transistor 1190. The term 6*ch* is derived from the circuitry, and the latter term is applied to the base of a transistor 1192. The transistor 1190 has its emitter connected to the collector of the transistor 1188, and the emitter of the transistor 1192 is connected to the collector of the transistor 1182. The collector of a transistor 1194, together with the collectors of the transistors 1190 and 1192, supply an input term 8W.$W_1^0$ to the input of the eight-word delay line 38 referred to in FIGURE 2. These collectors are also connected to a resistor 1196, which has a resistance of 2.2 kilo-ohms, and which is connected to the negative terminal of the 3-volt direct voltage source. A term $\overline{U_T}$ is derived from the circuitry of FIGURE 39, and is applied to the base of the transistor 1194, and the timing signal C1.T1.G is applied to the emitter of that transistor to insert a trailing character 0000001 (least significant digit on right) into the block fed into the 8-word delay line 38. The eight-word delay line 38 develops the term 8W.R at its output terminal.

The delay line 1*ch* introduces a 1 character delay time to the information introduced to it. In like manner, the delay line 2*ch* introduces a 2 character delay. The delay line 4*ch* introduces a 4 character delay and the delay line 6*ch* introduces a 6 character delay. A circuitry described in conjunction with FIGURE 34 is controlled by the timing signal (FIGURE 5) from the character counter CA in the computer. This control is through the circuitry of FIGURE 37, as will be described. Selected ones of the delay lines referred to above are switched into the circuitry of FIGURE 37 in accordance with the CA character count of the computer. This switching is such that the block of data finally read into the 8-word delay line 38 is synchronized with respect to the character times of the computer.

The sampling circuit of FIGURE 36 introduces the blocks of data read out of the register 30 in serial form to the character unscrambler 34 of FIGURE 37. A distinctive leading character is inserted at U*ch* time by the transistors 1134 and 1136. This leading character takes the form of 0000001 (least significant digit on right), and it is unlike any character normally encountered in the system. This character and the following block of information are introduced to the base of the transistor 1140 of the character unscrambler circuitry. A similar trailing character is inserted at the time by the circuitry of the transistors 1182 and 1192.

The character counter CA of the computer provides character count signals as shown by the tables of FIGURES 5 and 38. These signals are used by the logic circuitry of FIGURE 39 (as will be described) to generate the group control signals 1*ch*, 2*ch*, 4*ch* and 6*ch*.

These control terms determine the number of character delay times, which must be introduced to the information read into the character unscrambler 34, to cause the character times of that information to be correlated with the computer character times.

The terms *1ch*, *2ch*, *4ch* and *6ch* assume different configurations, as shown by the table of FIGURE 38, and these configurations correspond to the number of character time delays which must be introduced to the information serially read into the unscrambler 34 to cause that information to be synchronized with the character times of the computer. The logic circuitry of FIGURE 37 uses the different configurations of the terms *1ch*, *2ch*, *4ch* and *6ch* to connect one or more of the delay lines *1ch*, *2ch*, *4ch* and *6ch* into the signal path through the character unscrambler 34. The block of information emerging in serial form from the character unscrambler 34 is read into the 8-word delay line 38, and that block is synchronized with the timing of the associated computer as to its bit times, and as to its character times. However, the multi-character words which make up the block of information in the 8-word delay line 38 are still not synchronized with the word times of the associated computer. This latter synchronization is performed subsequently, and in a manner to be described.

The character unscrambler control logic of FIGURE 39 includes a group of five flip-flops 1200, 1202, 1204, 1206 and 1208. The flip-flop 1200 develops the term $U_T$ at its true output terminal; the flip-flop 1202 develops the term *1ch* at its true output terminal; the flip-flop 1204 develops the term *2ch* at its true output terminal; the flip-flop 1206 develops the term *4ch* at its true output terminal, and the flip-flop 1208 develops the term *6ch* at its true output terminal.

The character timing signal C12 is applied to the base of a transistor 1210, and the timing signal T7.TC is applied to the base of a transistor 1212. The emitter of the transistor 1212 is grounded, and the collector of that transistor is connected to the emitter of the transistor 1210. The collector of transistor 1210 is connected to the base of a grounded emitter transistor 1214 and to a resistor 1216. The resistor 1216 may have a resistance of 4.7 kilo-ohms, and it is connected to the negative terminal of the 3-volt direct voltage source.

The collector of the transistor 1214 is connected to the base of a grounded emitter transistor 1218 and to a resistor 1220. The resistor 1220 may have a resistance of 2.2 kilo-ohms, and it is connected to the negative terminal of the 3-volt direct voltage source. The collector of the transistor 1218 is connected to the emitter of a transistor 1222, and the unload term $\overline{U}$ of FIGURE 22 is applied to the base of the transistor 1222. The collector of the transistor 1222 is connected to the false input terminal of the flip-flop 1200. The term U*ch* of FIGURE 22 is applied to the base of a grounded emitter transistor 1124. A collector of that transistor is connected to the true input terminal of the flip-flop 1200. The term $U_T$ developed by the flip-flop 1200, is introduced to the base of a grounded emitter transistor 1226. The collector of the latter transistor is connected to a resistor 1228 which may have a resistance of 2.2 kilo-ohms, and which is connected to the negative terminal of the 3-volt direct voltage source.

The term $U_T$ is developed at the collector of the transistor 1126, and that term is applied to the base of a grounded emitter transistor 1230 and to the base of a grounded emitter transistor 1232. The collector of the transistor 1232 introduces the term $\overline{U}_{T.g}$ to the emitter of a transistor 1234 and to the emitter of a transistor 1236. The timing signal $S_5$ is applied to the base of the transistor 1234 of the timing signal, and the timing signal $S_1$ is applied to the base of the transistor 1236. The collector of the transistor 1234 is connected to the emitter of a transistor 1238 and to the emitter of a transistor 1240. The collector of the transistor 1238 is connected to the false input terminal of the flip-flop 1202, and the collector of the transistor 1240 is connected to the true input terminal of that flip-flop. The character counter of the computer introduces the term CA to the base of the transistor 1240 and to the base of a transistor 1242, by way of an input terminal 1241, and that counter introduces the term $\overline{CA}$ to the base of the transistor 1238 by way of an input terminal 1243, and to the base of a transistor 1244, and to the base of a transistor 1246.

The collector of the transistor 1232 is connected to the emitter of a transistor 1248, and the term *1ch* from the flip-flop 1202 is applied to the base of that transistor. The collector of the transistor 1248 is connected to a resistor 1250 and to the base of a grounded emitter transistor 1252. The resistor 1250 may have a resistance of 4.7 kilo-ohms, and it is connected to the negative terminal of a 3-volt direct voltage source.

The collector of the transistor 1252 is connected to a resistor 1254 and to the base of a grounded emitter transistor 1256. The resistor 1254 may have a resistance of 2.2 kilo-ohms, and it is connected to the negative terminal of the 3-volt direct voltage source. The collector of the transistor 1256 is connected to the emitter of a transistor 1258 and to the emitter of a transistor 1260. A timing signal S7 is applied to the base of the transistor 1258, and the timing signal S6 is applied to the base of the transistor 1260.

The collector of the transistor 1258 is connected to the emitter of the transistor 1242 and to the emitter of the transistor 1244. The collector of transistor 1242 is connected to the false input terminal of the flip-flop 1204, and the collector of the transistor 1244 is connected to the true input terminal of that flip-flop. The flip-flop 1204 introduces the term $\overline{4ch}$ to the base of a transistor 1262, and it introduces the term *4ch* to the base of a transistor 1264.

The collector of the transistor 1260 is connected to the emitter of the transistor 1262 and to the emitter of the transistor 1264. The collector of the transistor 1262 is connected to the false input terminal of the flip-flop 1206, and the collector of the transistor 1264 is connected to the true input terminal of that flip-flop. The collector of the transistor 1236 is connected to the emitter of a transistor 1266 and to the emitter of the transistor 1246. The computer character counter term CA from the input terminal 1241 is applied to the base of the transistor 1266. The collector of the transistor 1266 is connected to the false input terminal of the flip-flop 1208, and the collector of the transistor 1246 is connected to the true input terminal of that flip-flop.

When the register 30 is not in its unload mode of operation, so that the term $\overline{U}$ is true, the flip-flop 1200 is set false at the end of the following 12th character time by the timing signals C12 and $T7.T_C$. This causes the term $\overline{U}_T$ to be true at the beginning of the next first character time of the computer. So long as the term $\overline{U}_T$ is true, the counter formed by the flip-flops 1202, 1204, 1206 and 1208 is actuated from one step to the next by the character counter signals CA and $\overline{CA}$ derived from the computer. During such actuation of the counter, the flip-flop 1202 counts out each 1-character time, the flip-flop 1204 counts out each 2-character time, the flip-flop 1206 counts out each 4-character time, and the flip-flop 1208 counts out each 6-character time.

When the term U*ch* becomes true, the flip-flop 1200 is set true so that the term $\overline{U}_T$ becomes false. This causes the stepping of the counter formed by the flip-flops 1202, 1204, 1206 and 1208 to be stopped, so that the counter remains in the particular configuration to which it was set at the moment the term U*ch* became true. This particular configuration of the counter establishes the path to be followed through the circuit of FIGURE 37 by the successive bits which makes up the character, which, in turn, make up the words of the corresponding block of information introduced to the input terminal 1130 of FIGURE 37. This is achieved by the relative states of the terms 2*ch*, 4*ch* and 6*ch*, which are controlled by the counter made up by the flip-flops 1202, 1204, 1206 and 1208 in FIGURE 39. The particular control is in accordance with the table of FIGURE 38. The counter means is stopped throughout the entire unloading cycle of the corresponding block of information. This is because the term $\overline{U}$ is false during that cycle, causing the flip-flop 1200 to be triggered to its true state.

The block of information, after it has passed through the character unscrambler, or timing correlation circuit 34, flows into the 8-word delay line 38. The information flowing into the 8-word delay line 38 has a correlated timing relation with the computer, with respect to the bit times and character times of the computer. As mentioned above, however, the different words of the block of information in the delay line 38 are not necessarily synchronized with respect to the word times of the computer.

It will be remembered that the flip-flop 1200 of FIGURE 39 is triggered false at the end of the unloading cycle to make the term $\overline{U}_T$ true. This enables the transistor 1194 of FIGURE 37 to pass the term C1.T1.*g* to the 8-word delay line 38. The resulting term is introduced to the delay line 38 at the end of the corresponding block of information, and it forms an identifying trailing character for that block. As noted above, the trailing character has the composition 0000001 (least significant digit on right).

As the blocks of information recorded on the memory tape 18 are successively circulated past the read heads associated with the read amplifiers 22, they are read into the system described above. The blocks are then correlated as to bit times and character times in the described circuitry. After this has been effectuated, the key word of each block is examined to determine which one of the successive blocks read into the system from the tape 18 is a desired block of information. This examination is accomplished by the key word selector 42 of FIGURE 2, and appropriate circuitry for that block is set out in FIGURE 40. It will be remembered that the key word in each block of information is identified by a null character at its 12th character position; the null character taking the form of 1111111. The circuitry of FIGURE 40 includes the null detector 43 (referred to in conjunction with FIGURE 2) which detects the null character so as to locate the key word in each block of information read into the 8-word delay line 38.

The null detector 43 includes a flip-flop 1300. The computer clock pulses $T_W$ are applied to the base of a grounded emitter transistor 1302, and the collector of that transistor is connected to the emitter of a transistor 1304. The term 8W.$W_1^0$ of FIGURE 37 is applied to the base of the transistor 1304. The collector of the transistor 1304 is connected to the false input terminal of the flip-flop 1300. The timing signal $C_{12}'$ from the computer is applied to the base of a grounded emitter transistor 1306. The collector of that transistor is connected to the true input terminal of the flip-flop 1300.

The flip-flop 1300 develops the term NULL at its true output terminal, and that term is applied to the base of a transistor 1308. The collector of the transistor 1308 is connected to the true input terminal of a flip-flop 1310. The timing signal T7.$T_C$ from the computer is applied to the base of a grounded emitter transistor 1312. The collector of the transistor 1312 is connected to the emitter of the transistor 1308 and to the emitter of a transistor 1314. The collector of the transistor 1308 is connected to the true input terminal of the flip-flop 1310, and the collector of the transistor 1314 is connected to the false input terminal of that flip-flop.

The flip-flop 1310 develops the term R*ec*.1W at its true output terminal, and that term is applied to the base of a transistor 1316 and to the base of a transistor 1318. The flip-flop 1310 develops the term $\overline{Rec.1W}$ at its false output terminal, and that terminal is connected to the base of the transistor 1320 and to the base of a transistor 1322.

The term 8W.R of FIGURE 37 is applied to the base of a grounded emitter transistor 1324. The collector of that transistor is connected to a resistor 1326 and to the base of a grounded emitter transistor 1328. The resistor 1326 may have a resistance of 2.2 kilo-ohms, and it is connected to the negative terminal of the 3-volt direct voltage source. The collector of the transistor 1328 is connected to the emitter of the transistor 1322, and the collector of the latter transistor is connected to a resistor 1330. The resistor 1330 may have a resistance of 3.9 kilo-ohms, and it is connected to the negative terminal of the 3-volt direct voltage source.

The collector of the transistor 1322 is also connected to the input terminal of the one word delay line 40 which was referred to in conjunction with FIGURE 2. The term 1W.$W_1^0$ is applied to the delay line 40, and the delay line develops an output term 1W.R. The output term 1W.R is applied to the base of a grounded emitter transistor 1332 and to the base of a grounded emitter transistor 1334. The collector of the transistor 1332 is connected to the emitter of the transistor 1316, and the collector of the latter transistor is also connected to the input terminal of the delay line 40.

The collector of the transistor 1334 is connected to the emitter of a transistor 1336, and the collector of the latter transistor is connected to a resistor 1338. The resistor 1338 has a resistance, for example, of 2.2 kilo-ohms, and it is connected to the negative terminal of the 3-volt direct voltage source. The collector of the transistor 1336 also is connected to the input terminal KW.W$1^0$ of the key word delay line 44, which was referred to in conjunction with FIGURE 2. This latter delay line develops the term K*w*.R, and that term is applied to the base of a grounded emitter transistor 1340. The collector of the transistor 1340 is connected to the emitter of a transistor 1342, and the collector of the latter transistor is also connected to the input terminal of the key word delay line 44.

The timing signal $C_1'$.S1 from the computer is applied to the base of a transistor 1344, and the collector of that transistor is connected to the emitter of the transistor 1320 and to the emitter of a transistor 1346. The term $\overline{U}_T$ of FIGURE 39 is applied to the base of the transistor 1346, and the collector of that transistor is connected to the emitter of the transistor 1318. The collector of the transistor 1320 is connected to the false input terminal of a flip-flop 1348, and the collector of the transistor 1318 is connected to the true input terminal of that flip-flop.

The flip-flop 1348 develops the term FILL.K*w* at its true output terminal, and that term is introduced to the base of the transistor 1314 and to the base of the transistor 1336. The flip-flop develops the term $\overline{FILL.Kw}$ at its false output terminal and the latter term is applied to the base of the transistor 1342.

As each block of information from the character timing correlation circuit 34 of FIGURE 37 is circulated into the 8-word delay line 38 of FIGURES 2 and 37, each word of the block is circulated into the one word delay line 40 of FIGURES 2 and 40. At the same time, each word of the block of information circulated into the 8-word delay line 38 is passed through the null detector 44. The null detector 44 is set true just before each 12th character time of each word of each block of information passed through the null detector. The twelfth character of the key word is the only character to have a 1111111 configuration. All the other characters, therefore, set the null character flip-flop false before the end of the C12 character time. Only for the key word is the flip-flop 1300 of the null detector 44 true at the end of the 12th character time. This causes the term NULL to be true at that time to set the flip-flop 1310 true.

The flip-flop 1310 is set true, therefore, the moment that the entire key word is in the one word delay line 40. The term R*ec*.1W is now set true, so that the key word is trapped in the one word delay line 40 and is caused to be recirculated through the transistor 1316. One word time later, the term C'1.S1 causes the term R*ec*.1W to trigger the flip-flop 1348 true, to cause the term FILL.K*w* to be set true. This sets the flip-flop 1310 false at the next T7.TC time to cause the term R*ec*.1W to be true. The latter term sets the flip-flop 1348 false at the following C1'.S1 time.

When the term FILL.K*w* is true, the key word is introduced from the one word delay line 40 into the key word delay line 44. Then, when the flip-flop 1348 is set false to cause the term FILL.K*w* to be true, the key word is trapped and recirculated in the key word delay line 44. The key word circulating in the delay line 44 is compared in each address word in the desired address register 48 of FIGURE 2 to determine whether the block of information presently in the 8-word delay line 38 is one of the desired blocks of information. This comparison is carried out in the read compare network 46 of FIGURE 2, and which network will be described in more detail in conjunction with FIGURE 43. If a successful comparison occurs to show that the block in the delay line 38 is one of the desired blocks, it is then read into the H-read buffer of the 8-word delay line of the read buffer 42. Otherwise, the block is shifted out of the 8-word delay line 38 and discarded.

The read compare network 46 is devised, as will be described, so that a successful comparison may occur on the basis of equality between the key word in the delay line 44 and the word in the desired address register 48 in a first selected mode of operation; or on the basis of the key word in the delay line 44 representing a quantity less than the word in the desired address register in a second selected mode of operation. The desired address register 48 of FIGURE 2 is capable of holding eight words corresponding to the key words of eight different desired blocks of information on the magnetic memory tape 18, and each key word in the delay line 44 is compared with each of the eight words in the desired address register. This operation, as mentioned above, produces a control signal representing a successful comparison between the key word in the delay line 44 and any one of the eight words in the desired address register, either on an equality basis for one mode of operation, or on a "less than" basis for another operating mode.

The masking register 52 is loaded at the same time as the desired address register, as will be described in conjunction with FIGURE 41, and the masking register serves to mask any number of bits of any character in any word in the desired address register. This enables the comparisons with the key word in the delay line 44 to be on the basis of only the unmasking bits of the respective words in the desired address register. This masking operation permits comparisons to be carried out on a partial basis, to enable blocks of information to be selected from the magnetic memory tape 18 on the basis of a more general classification than a complete equality, for circumstances when such blocks are desired.

The circuitry associated with the masking register 52 and with the desired address register 48 is illustrated in FIGURE 41. This circuitry includes a flip-flop 1350. An address term AD4 from the computer is introduced to the base of a transistor 1352, and an address term AD3 from the computer is introduced to the base of a transistor 1354. The collector of the transistor 1352 is connected to the false input terminal of the flip-flop 1350, and the collector of the transistor 1354 is connected to the true input terminal of that flip-flop. The flip-flop 1350 develops an equal mode term (=) at its true output terminal, and it develops a less than mode term (<) at its false output terminal.

A command term ($) from the computer is applied to the base of a grounded emitter transistor 1356, and a general address term (#A) from the computer is applied to the base of a transistor 1358. The collector of the transistor 1356 is connected to the emitter of the transistor 1358 and to the emitter of a transistor 1360. The collector of the transistor 1358 is connected to the emitters of the transistors 1352 and 1354.

The circuitry of FIGURE 41 includes a second flip-flop 1362. A grounded emitter transistor 1364 has its collector connected to the true input terminal of the flip-flop 1362. The RESET term is applied to the base of the transistor 1364. A grounded emitter transistor 1366 has its collector connected to the false input terminal of the flip-flop 1362. The collector of the transistor 1358 is connected to the base of the transistor 1366. The flip-flop 1362 develops the term INH' at its true output terminal.

A general address term αA from the computer is applied to the base of the transistor 1360. The collector of the transistor 1360 is connected to a resistor 1368 and to the base of a grounded emitter transistor 1370. The resistor 1368 may have a resistance of 2.2 kilo-ohms, and it is connected to the negative terminal of the three volt direct voltage source.

The collector of the transistor 1370 is connected to a resistor 1372. The latter resistor may have a resistance of 4.7 kilo-ohms, and it is connected to the negative terminal of the 3-volt direct voltage source. The collector of the transsitor 1370 is also connected to the base of a transistor 1374 and to the base of a transistor 1376. The collector of the transistor 1360 is connected to the base of the transistor 1378 and to the base of a transistor 1380.

The collectors of the transistors 1378 and 1374 introduce the term MASK.$W1^0$ to the masking register 8-word delay line 52. These collectors are also connected to a resistor 1382 which may have a resistance of 3.9 kilo-ohms, and which is connected to the negative terminal of the 3-volt direct voltage source. The register 52 develops the term MASK.R, and that term is applied to the base of a grounded emitter transistor 1384. The collector of the transistor 1384 is connected to the emitter of the transistor 1378. The contents of a one-word circulating register in the computer, designated 3R, are applied to the base of a grounded emitter transistor 1386. The collector of the transistor 1386 is connected to the emitter of the transsitor 1374.

The transistors 1376 and 1380 introduce the term DAR.$W1^0$ to the desired address register 48. These collectors are also connected to a resistor 1388. The resistor 1388 may have a resistance of 3.9 kilo-ohms, and it is connected to the negative terminal of the 3-volt direct voltage source. The desired address register 48 develops the term DAR.R, and that term is applied to the base of a grounded emitter transistor 1390. The collector of the transistor 1390 is connected to the emitter of the transistor 1380. The contents of a one word circulating register 1R in the computer are applied to the base of a grounded emitter transistor 1392. The collector of that transistor is connected to the emitter of the transistor 1376.

The flip-flop 1350 is the mode selector flip-flop. The presence of a $ command in the computer and of any numeric address #A enables the trigger circuitry of that flip-flop. This command and address composition is in accordance with a particular instruction coding for the computer which is described in more detail in the above-mentioned co-pending application S.N. 832,522, which was filed August 10, 1959, in the name of Frank A. Hill et al.

In accordance with the instruction coding referred to above, the computer instruction makes the term AD4 true when the desired address comparisons are to be on the basis of the key words of the blocks of information on the momeroy storage tape being less than the corresponding words in the desired address register for a successful comparison. For this instruction, the mode selector flip-flop 1350 is triggered true to make the term < true. In like manner, the computer instruction makes the term AD3 true when the comparison is to be on the basis of the key words being equal to the corresponding words in the desired address register for a successful compare.

It is appropriate at this time to recapitulate the purpose of the desired address register. Whenever the computer requires one or more selected blocks of information from the magnetic storage tape, one or more words respectively corresponding to the key words of the required blocks are inserted into the desired address register. The words in the desired address register are then successively compared with each of the key words of the blocks of information, as the blocks are successively read from hte magnetic storage tape and as the corresponding key words are successively circulated in the key word delay line 44. Whenever a successful comparison is achieved between a word in the desired address register and a key word in the delay line 44, the block of information corresponding to that key word is read into the read buffer 42 to be subsequently introduced to the computer. As indicated above, the comparisons may be on the basis of a word in the desired address register being equal to a key word in the delay line 44, or on the basis of the key word being less than the desired address register word.

The reset term RESET sets the flip-flop 1362 in FIGURE 41 true when the power is first turned on to make the term INH' true at the outset. This term, as will be described, prevents any comparisons from being made so long as it is true. The term INH' remains true until the mode selection has been made through the flip-flop 1350. When this has been accomplished the terms #A and $ are true so that the flip-flop 1362 is set false.

The mode selection is made by an appropriate control by the computer which, for an "equal" comparison, causes the term AD3 to be true to set the flip-flop 1350 true; and which, for a "less than" comparison, causes the term AD4 to be true to set the flip-flop 1350 false. After the mode selection has been made by the computer, the computer command is accompanied by a general address term $\alpha$A to cause the information to be loaded from the one-word circulating register 1R in the computer into the register 48 by way of the transistors 1392 and 1376. At the same time, information is loaded from the one-word circulating register 3R in the computer into the masking register 52 by way of the transistors 1386 and 1374.

The desired address register 48 and the masking register 52 normally recirculate through their respective circulating loops including the transistors 1390, 1380, 1384 and 1378. The information is serially loaded into these registers simultaneously, one word at a time and in a bit-by-bit manner. The word to be loaded into the masking register 52, for example, is first placed in the one-word circulating register 3R in the computer in the manner described in the copending Hill application, S.N. 832,522, referred to above; and the word to be loaded into the desired address register 48 is first placed in the manner described in that application, in the one-word register 1R in the computer. Then, under the control of the instruction $\alpha$A.$, the circulating loops of the registers 48 and 52 are broken, and these words are placed in properly timed positions in those registers. The operations described above are repeated until each of the registers 48 and 52 is loaded, for example, with eight words serially circulating through its circulating loop.

Each character in the masking register 52 whose corresponding character in the desired address register 48 is not to be masked is made equal to a decimal zero. For an excess 3 computer, for example, such a character would take the form 1100000, with the least significant digit being at the left. Then, for each bit of each character in the desired address register which is to be masked, the corresponding bit in the corresponding character in the masking register is set in the opposite binary state from the 1100000 configuration mentioned above. In this manner, and by providing appropriate word structure in the masking register 52, any bit of any character of any word in the desired address register 48 can be masked. This permits whole characters, or any parts thereof, of different words in the desired address register to be masked and not used for comparison purposes.

The circuitry of FIGURE 42 includes a trailing character detector flip-flop 1400. The timing signal $C_1'$ is applied to the base of a grounded emitter transistor 1402, and the timing signal $\overline{T}_1$ is applied to the base of a transistor 1404. The collectors of these transistors are connected to the false input terminal of the flip-flop 1400. The timing signal $T_1$ is applied to the base of a transistor 1406, and the collector of the latter transistor is connected to the true input terminal of the flip-flop 1400. The clock pulses $T_W$ are applied to the base of a grounded emitter transistor 1408, and the collector of that transistor is connected to the emitter of a transistor 1410. The output from the eight-word delay line 38 (8*w*R) of FIGURE 41 is applied to the base of the transistor 1410. The collector of the transistor 1410 is connected to the emitter of the transistor 1404 and to the emitter of the transistor 1406.

The trailing character detector flip-flop 1400 develops a term T*ch* at its true output terminal, and that term is applied to the base of a transistor 1412. The timing signal $T7.T_C$ is applied to the base of a grounded emitter transistor 1414, and the collector of the latter transistor is connected to the emitter of the former. The term INH' of FIGURE 41 is applied to the base of a grounded emitter transistor 1416. The collectors of the transistors 1412 and 1416 are connected to the true input terminal of a flip-flop 1420. The term FILL.K*w* of FIGURE 40 is applied to the base of a grounded emitter transistor 1422. The collector of the latter transistor is connected to the true input terminal of the flip-flop 1420. The flip-flop 1420 develops the term COMP at its true output terminal, and the flip-flop develops the term $\overline{\text{COMP}}$ at its false output terminal.

As noted above, each time a key word is inserted into the key word register delay line 44 of FIGURE 40, that key word is compared in the next eight word times with each of the eight words in the desired address register 48. Then, no further comparisons are made with that key word. This operation is controlled by the term COMP developed by the circuitry of FIGURE 42. This term must be true before any comparison can be made, and the term is first set true whenever a key word is read into the key word register 44. The term COMP is subsequently set false by the INH' term described in conjunction with FIGURE 41, or when the trailing character of the block of information corresponding to that key word passes out of the eight-word delay line 38 of FIGURE 34. This occurs exactly eight-word times after the key word is first introduced into the key word register delay line 44.

The term COMP is developed by the flip-flop 1420. This flip-flop is set true by the term FILL.K*w* (FIGURE 40) denoting that a key word has just been introduced into the key word register delay line 44. The term INH' of FIGURE 41 causes the flip-flop 1420 to be set false so that no comparison can be made so long as that term is true. The flip-flop 1420 is also set false at $\overline{T7}.T_C$ time by the term T*ch* after eight comparisons have been made by the key signal and the eight words in the desired address register 48.

The flip-flop 1400 detects the trailing character (0000001—least significant digit on the right) inserted by the circuitry of the transistors 1182 and 1192 in FIGURE 37, as that character passes out of the eight word delay line 38. As the block of information is serially read out of that delay line, the term 8wR goes true and false in correspondence with the successive bits of each character of each word of the block. Just before each first character time, the flip-flop 1400 is set false by the term C1′. Then at T1 time, if the first bit of the corresponding character is a one, the flip-flop is set true. Then, if any other bit in that character is a one, the flip-flop 1400 is subsequently set false. Only the trailing character appearing at C1 time has only zeroes after the first bit. The flip-flop 1400 therefore remains true for that character time and is true at T7.TC time to cause the flip-flop 142 to be set false.

The read compare network 46 is shown in circuit detail in FIGURE 43. The circuitry of FIGURE 43 includes a compare memory flip-flop 1430. The term INH′ of FIGURE 41 is applied to the base of a grounded emitter transistor 1432 and the term HrF of FIGURE 45*a* is applied to the base of a transistor 1434, and the clock pulses $T_W$ are applied to the base of a grounded emitter transistor 1436. The collector of the transistor 1436 is connected to the emitter of the transistor 1434. The collectors of the transistors 1432 and 1434 are connected to the false input terminal of the compare memory flip-flop 1430. The timing signal $C_{12}'$ is applied to the base of a grounded emitter transistor 1438. The collector of the transistor 1438 is connected to the emitter of a transistor 1440, and the collector of the latter transistor is connected to the true input terminal of the flip-flop 1430. The flip-flop 1430 develops the term K2.R at its true output terminal, and it develops the term $\overline{\text{K2.R}}$ at its false output terminal.

The circuitry of FIGURE 43 also includes a compare flip-flop 1442. This latter flip-flop develops the term K1.R at its true output terminal, and it develops the term $\overline{\text{K1.R}}$ at its false output terminal. The false output terminal of the flip-flop 1442 is connected to the base of a grounded emitter transistor 1444. The collector of that transistor is connected to the base of the transistor 1440 and to a resistor 1446. The resistor 1446 has a resistance of 6.8 kilo-ohms, and it is connected to the negative terminal of the 3-volt direct voltage source.

The term > of FIGURE 41 is applied to the base of a transistor 1450, and the timing signal C1 is applied to the base of a grounded emitter transistor 1452. The collector of the transistor 1452 is connected to the emitter of the transistor 1450. The term $\overline{\text{COMP}}$ of FIGURE 42 is applied to the base of a grounded emitter transistor 1454. The collectors of the transistors 1450 and 1454 are both connected to the false input terminal of the flip-flop 1442.

The term = of FIGURE 41 is applied to the base of a transistor 1456, and the timing signal $C_1'$ is applied to the base of a grounded emitter transistor 1458. The collector of the transistor 1458 is connected to the emitter of the transistor 1456, and the collector of the latter transistor is connected to the true input terminal of the compare flip-flop 1442.

The clock pulses $T_W$ are applied to the base of a grounded emitter transistor 1460, and the collector of that transistor is connected to the emitters of a pair of transistors 1462 and 1464. The collector of the transistor 1462 is connected to the false input terminal of the flip-flop 1442, and the collector of the transistor 1464 is connected to the true input terminal of that flip-flop.

The circuitry of FIGURE 43 includes an "exclusive-or" network 1470. This "exclusive-or" network may be constructed in the manner described and claimed in copending application Serial Number 760,031, which was filed September 9, 1958, in the name of Frank A. Hill. As is well known, an "exclusive-or" gate provides an output term which is true when one of its two input terminals is true, but which is false when both of its input terminals are true or when both of its input terminals are false.

The term $KwW_1{}^0$ of FIGURE 40 is applied to one of the input terminals of the "exclusive-or" network 1470, and the term DAR.R of FIGURE 41 is applied to the second input terminal of the "exclusive-or" network. The output terminal of the "exclusive-or" network is connected to the base of a transistor 1472. The term = of FIGURE 41 is applied to the base of a transistor 1474. The timing signal T7 is applied to the base of a grounded emitter transistor 1476. The collector of the grounded emitter transistor is connected to the base of a grounded emitter transistor 1478 and to a resistor 1480. The resistor 1480 may have a resistance of 2.2 kilo-ohms, and it is connected to the negative terminal of the 3-volt direct voltage source.

The collector of the transistor 1478 is connected to the emitter of the transistor 1474 and to the emitter of a transistor 1482. The term > of FIGURE 41 is applied to the base of the transistor 1482. The collector of the transistor 1482 is connected to the emitter of a transistor 1484 and to the emitter of a transistor 1486. The collector of the transistor 1474 is connected to the emitter of the transistor 1472, and the collectors of the transistors 1472 and 1484 are both connected to the base of a grounded-emitter transistor 1486 and to a resistor 1488. The resistor 1488 may have a resistance of 6.8 kilo-ohms, and it is connected to the negative terminal of the 3-volt direct voltage source. The collector of the transistor 1486 is connected to the base of the transistor 1462 and to a resistor 1490. The resistor 1490 may have a resistance of 6.8 kilo-ohms, and it is connetced to the negative terminal of the 3-volt direct voltage source.

The term $\overline{\text{DAR.R}}$ of FIGURE 41 is applied to the base of a grounded emitter transistor 1492, and the term $\overline{Kw.W_1{}^0}$ of FIGURE 40 is applied to the base of a grounded emitter transistor 1494. The collectors of the transistors 1492 and 1494 are connected to the base of the transistor 1486 and to a resistor 1496. The resistor 1496 may have a resistance of 6.8 kilo-ohms, and it is connected to the negative terminal of the 3-volt direct voltage source. The transistors 1492 and 1494 introduce a term designated $\overline{\text{C}}$.D to the base of the transistor 1486.

The term $Kw.W_1{}^0$ of FIGURE 40 is applied to the base of a grounded emitter transistor 1498, and the term DAR.R of FIGURE 41 is applied to the base of a grounded emitter transistor 1500. The collectors of these latter transistors are connected to the base of the transistor 1484 and to a resistor 1502. The resistor 1502 may have a resistance of 6.8 kilo-ohms, and it is connected to the negative terminal of the 3-volt direct voltage source. The transistors 1498 and 1500 introduce the term C.$\overline{\text{D}}$ to the base of the transistor 1484.

The circuitry of FIGURE 43 also includes an "exclusive-or" network 1504. This latter network may be similar to the "exclusive-or" network 1470. The term MASK.R of FIGURE 41 is applied to one of the input terminals of the "exclusive-or" network 1504, and the term III from the computer is applied to the other input terminal of the "exclusive-or" network 1504. The output terminal of the "exclusive-or" network 1504 is connected to the base of the transistor 1478.

Each time a key word is circulated into the key word delay line 44, the resulting term $Kw.W_1{}^0$ is compared in the "exclusive-or" network 1470 successively with the words in the desired address register 48; the contents DAR.R from the desired address register 48 being introduced to the "exclusive-or" network 1470 for that purpose. This comparison is on a bit-by-bit and character-by-character sequence. The results of the comparison are introduced to the base of the transistor 1472, and that transistor is enabled only if the transistors 1474 and 1478 are enabled.

The transistor 1474 is enabled if the compare system is in the "equality" comparison mode, as established by the term = from the circuitry of FIGURE 41. The transistor 1478 is enabled only for the bits at which the comparison is to be made. There is no comparison at the T7 bit time, as this is usually a parity bit. For that reason, the transistor 1478 is disabled by the transistor 1476 at the T7 bit time. The transistor 1478 is also controlled by the output from the "exclusive-or" gate 1504. This latter gate compares each character from the masking register 52 (MASK.R) with decimal zero (III) from the computer. Each time there is a difference between a bit from the masking register 52 and the corresponding III bit, no comparison is made. Only when the MASK.R bit is the same as the III bit is a comparison made.

Therefore, the transistor 1472 is enabled during the equality comparison mode only for the unmasked bits of each character, and only during the bit times other than the T7 bit time.

The circuitry of the "exclusive-or" network 1504 and of the transistor 1476 is used to enable the transistor 1484 during the "less than" comparison mode of the system, during which the transistor 1482 is enabled. During the latter mode, the term $C.\overline{D}$ is applied to the transistor 1484 from the circuitry of the transistors 1498 and 1500. This term $C.\overline{D}$ is true each time the key word exhibits a "one" bit and the corresponding DAR word exhibits a "zero" bit. In like manner, the term $\overline{C}.D$ is applied to the transistor 1486 from the circuitry of the transistors 1494 and 1492. This latter term is true each time the key word in the key word register exhibits a "zero" bit and the corresponding word in the desired address register exhibits a "one" bit.

If the comparison is to be made during the equality mode, as evidenced by the term = from the circuitry of FIGURE 41, the compare flip-flop 1442 is set true by the timing signal $C_1'$ at the beginning of each word time, this being accomplished by means of the circuitry of the transistors 1456 and 1458. Then, if during the following word time a successful comparison is made, the compare flip-flop remains true. However, if the comparison is not successful, the compare flip-flop 1442 is set false through the circuit of the transistors 1472, 1474 and 1478.

If the term $\overline{COMP}$ is true, the transistor 1454 is conductive, and the compare flip-flop 1442 is set false so that no successful comparison can be made, this being desired for the reasons described above. If the compare flip-flop 1442 is true at the end of the word time, a successful comparison during the equality mode has been made.

When the comparison is on the basis of the "less than" mode, the term > from FIGURE 41 is true, and the flip-flop 1442 is set false at the beginning of each word time by the circuitry of the transistors 1450 and 1452. Then, throughout the word time, the compare flip-flop 1442 is triggered back and forth by the terms $C.\overline{D}$ and $\overline{C}.D$. If at the end of the word time the flip-flop 1442 is true, it means that the compared word in the desired address register was greater than the key word.

Therefore, each time a successful comparison is made, either in the "equality" mode or in the "less than" mode, the compare flip-flop 1442 is set true at the end of the compared words in the desired address register 48 and key word delay line 44. This is evidenced by the term $\overline{KI.R}$ being false.

The compare memory flip-flop 1430 is initially set false by the term INH'. Then upon a successful comparison this flip-flop is set true at $C_{12}'$ time just before the twelfth character time of the key word, this being the null character which is not appropriate for comparison purposes. The compare memory flip-flop 1430 remains true to permit the block of information for which the successful comparison was achieved to be read into the read buffer 42 of FIGURE 2. When the read buffer 42 is full and can accept no further information, the term H*r*.F of FIGURE 45*a* becomes true to support the compare memory flip-flop 1430 false. So long as the flip-flop 1430 is false, no further information can be read into the read buffer 42.

The circuitry of FIGURE 44 corresponds to the block 24 in FIGURE 2. This circuitry is used to cause the write head associated with the write amplifier 26 of FIGURE 2 to write a write marking in track 14 of the magnetic memory tape 18 (FIGURE 1) between a corresponding pair of block markings in track 16 in FIGURE 1. This write marking identifies the block location on the tape of a block of information for which a successful comparison was achieved in the circuitry of FIGURE 41. Such a block of information is introduced to the read buffer 42 of FIGURE 2 for use by the computer, and the write marking is used in the manner described subsequently to permit a block of information from the computer to be returned to the same block location on the magnetic memory tape 18. The block returned from the computer may correspond, for example, to the original block read from the magnetic memory tape, with certain changes being made in the information contained in that block in accordance with the computations performed on the information by the computer.

The write marking logic circuitry of FIGURE 44 includes a flip-flop 1510. A transistor 1512 has its collector connected to the false input terminal of the flip-flop 1510, and a transistor 1514 has its collector connected to the true input terminal of that flip-flop. The emitters of the transistors 1512 and 1514 are connected together and to the collector of a grounded emitter transistor 1516. The BMR (reset) block marking term from the read amplifier 22 of FIGURE 2 is introduced to the base of the transistor 1516.

The flip-flop 1510 develops the term WM*b* and introduces that term to the base of a transistor 1518. The emitter of the transistor 1518 is connected to the collector of the grounded emitter transistor 1520. The block marking term BMR (set) from the read amplifier 22 of FIGURE 2 is applied to the base of the transistor 1520.

The collector of the transistor 1518 is connected to a resistor 1522 and to the base of a transistor 1524. The resistor 1522 may have a resistance of 2.2 kilo-ohms, and it is connected to the negative terminal of the 3-volt direct voltage source. The emitter of the transistor 1524 is grounded, and the collector of that transistor is connected to the write amplifier 26 in FIGURE 2 to introduce the write mark term to that amplifier. The collector of the transistor 1524 is also connected to a resistor 1526. The resistor 1526 may have a resistance of 2.2 kilo-ohms, and it is connected to the negative terminal of the 3-volt direct voltage source.

The circuitry of FIGURE 44 also includes a flip-flop 1528. The true output terminal of the flip-flop 1528 develops a term WM*a*, and that term is introduced to the base of the transistor 1514. The false output terminal of the flip-flop 1528 develops a term $\overline{WMa}$, and the latter term is applied to the base of the transistor 1512.

A grounded emitter transistor 1530 has its collector connected to the false input terminal of the flip-flop 1528, as is the collector of a transistor 1532. The term RESET is applied to the base of the transistor 1530, and the term $\overline{U}_T$ of FIGURE 39 is applied to the base of the transistor 1532. A grounded emitter transistor 1534 has its collector connected to the emitter of the transistor 1532. The term L2 of FIGURE 18 is applied to the base of the transistor 1534.

A transistor 1536 has its collector connected to the true input terminal of the flip-flop 1528, a transistor 1528, a transistor 1538 has its collector connected to the emitter of the transistor 1536, and a grounded emitter transistor 1540 has its collector connected to the emitter of the transistor 1538. The timing signal $C_1'.S1$ is applied to the base of the transistor 1540, the term HRF' of FIGURE 45*a* is applied to the base of the transistor 1538, and the successful comparison term K2R of FIGURE 43 is applied to the base of the transistor 1536.

The flip-flop 1528 is set true when a successfully compared block of information passes into the H-read buffer of the read buffer 42. Such a successful comparison causes the flip-flop 1430 in FIGURE 43 to set the term K2R true. Then, as the read character of the corresponding block flows out of the H-read buffer of FIGURE 45*a*, a leading character detector flip-flop 1550 is set true (as will be described), to set the term HRF' true. Just before the beginning of the next character time, the term $C_1'$.S1 sets the flip-flop 1528 in FIGURE 44 true to cause the term WM*a* to be set true. At the end of the next block location on the magnetic memory tape 18, as indicated by the reading of the block markings by the track 16 read head associated with the read amplifier 22 of FIGURE 2, the term BMR (reset) introduced to the transistor 1516 then causes the flip-flop 1510 to be set true. This causes the term WM*b* to become true. Then, the next BMR (set) term, developed by the read amplifier 22 upon the reading by its track 16 read head of the next "set" block marking on the tape, causes the write amplifier 26 to be conditioned to cause its track 14 write head to write a write marking at the proper position in track 14 of the memory tape.

The circuitry described above provides a controlled time delay between the selection of a desired block of information by the system and the actuation of the track 14 write head associated with the write amplifier 26. The time delay is precisely controlled to permit the tape block location of the selected block of information to pass from the read heads associated with the read amplifier 22 to the write head associated with the write amplifier 26. The latter write head is then controlled to record the write marking in the track 14 between the pair of track 16 block markings identifying the block location on the tape of the selected block and in the position illustrated in FIGURE 1.

Each block of information in the 8-word delay line 38 of FIGURE 2 forms the term 8*w*.R of FIGURE 37 as that block is read on a bit-by-bit basis as it emerges from the delay line. The term H*w*.R is introduced to the circuitry of the H-read buffer in the read buffer 42. When a successful comparison has been made by the circuitry of FIGURE 43 (K2R), the corresponding block of information is circulated into the H-read buffer, this circuitry being shown in more detail in FIGURE 45*a*. The H-read buffer, as mentioned above, includes an 8-word delay line, and the input term to the delay line is designated $Hr.W_1^0$. The output from the delay line is read into a read flip-flop to produce the terms H*r*.R and $\overline{Hr.R}$ at the output terminals of the flip-flop.

It will be remembered that a leading character is inserted (by the circuitry of the transistors 1134 and 1136 in FIGURE 37) into the information read into the 8-word delay line 38, and that leading character has a composition 0000001 (least significant digit on right). The circuitry of FIGURE 45 includes a flip-flop 1550 which forms a detector for the leading character. Because of the parity arrangement of the various normal characters, the flip-flop 1550 is normally in a false state at $C_1'$.S1 time. However, the peculiar composition of the leading character causes that flip-flop to be in a true state at that time.

A ground emitter transistor 1552 has its collector connected to the false input terminal of the flip-flop 1550, and a transistor 1554 also has its collector connected to that input terminal. The timing signal $C_{12}'$ is applied to the base of the transistor 1552, and the timing signal $\overline{T1}$ is applied to the base of the transistor 1554. The timing signal T1 is applied to the base of a transistor 1556, and the collector of that transistor is connected to the true input terminal of the flip-flop 1550. The term H*r*.R, derived from the read flip-flop H*r*.R, is applied to the base of a transistor 1558, and the collector of that transistor is connected to the emitters of the transistors 1554 and 1556.

A grounded emitter transistor 1560 has its collector connected to the emitter of the transistor 1558. The clock pulses $T_w$ are applied to the base of the transistor 1560. The leading character, introduced into the information read into the H-read buffer of FIGURE 45*a*, occurs at C12 character time at the beginning of the block of information. The flip-flop 1550 is triggered false by the term $C_{12}'$ at the beginning of each C12 character time. Then, and as mentioned above, only the leading character has the proper composition to trigger that flip-flop true at the end of the character time, so that the flip-flop is true at $C_1'$.S1 time.

The leading character detector flip-flop 1550 develops the term H*r*.F', and that term is applied to the base of a transistor 1562. The collector of the transistor 1562 is connected to the true input terminal of a flip-flop 1564. The flip-flop 1564 develops the term H*r*.F at its true output terminal, and that term is applied to the base of a transistor 1566. The flip-flop 1564 develops the term $\overline{Hr.F}$ at its false output terminal, and the latter term is applied to the base of a transistor 1568. The collector of the transistor 1566 and the collector of the transistor 1568 are both connected to a resistor 1570. This resistor may have a resistance of 3.9 kilo-ohms, and it is connected to the negative terminal of the 3-volt direct voltage source. These collectors also introduce the term $Hr.W_1^0$ to the input terminal of the H-read buffer 8-word delay line.

The term H*r*.R from the read flip-flop H*r*.R is also applied to the base of a grounded emitter transistor 1572, the collector of the latter transistor being connected to the emitter of the transistor 1566. The output 8*w*.R of the 8-word delay line 38 in FIGURE 37 is applied to the base of a grounded emitter transistor 1574, and the collector of the latter transistor is connected to the emitter of the transistor 1568. The false input terminal of the flip-flop 1564 is connected to the collector of a grounded emitter transistor 1576 and to the collector of a transistor 1578. The RESET term is applied to the base of the transistor 1576, and the command term $J+K$ from the computer is applied to the base of the transistor 1578. The term $\overline{C1.S2}$ is applied to the base of a grounded emitter transistor 1580, and the collector of that transistor is connected to the emitter of the transistor 1578.

The timing term C1'.S1 from the computer is applied to the base of a grounded emitter transistor 1582. The collector of that transistor is connected to the emitter of a transistor 1584, and the collector of the latter transistor is connected to the emitter of a transistor 1586. The collector of the transistor 1586 is connected to the emitter of the transistor 1562. The successful comparison term K2.R of FIGURE 43 is applied to the base of the transistor 1586, and a term G*r*.F (derived in a manner to be described from the circuitry of **FIGURE 45*b*) is applied to the base of the transistor 1584**.

The term $\overline{Hr.F}$ is true only when the entire read buffer 42 is not full of information and can, therefore, accept the further block of information. When this term $\overline{Hr.F}$ is true, the transistor 1568 is enabled so that the block of information 8*w*.R from the 8-word delay line 38 of FIGURE 37 may be read into the H-read buffer in FIGURE 45*a*. When the inserted leading character of that block circulates down the H-read buffer delay line and through the read flip-flop H*r*.R, it causes the leading character detector flip-flop 1550 to be true at $C_1'$.S1 time, as explained above. This causes the term H*r*.F' to be true at that time. Then, in the presence of the successful comparison term K2R, and if the buffer basket 50 is full (G*r*.F), the circuit of the transistors 1582, 1584, 1586 and 1562 is enabled to trigger the flip-flop 1564 true. This makes the term H*r*.F true to indicate that the read buffer 42 is now full and to complete a recirculating path for the H-read buffer through the transistors 1572 and 1566. At the same time, the transistor 1568 is disabled so that no further information may be read into the read buffer 42 until an unloading operation is initiated.

Therefore, in the manner described in the preceding paragraph, the block of information which was successfully compared by the circuit of FIGURE 43 is read into the H-read buffer 8-word delay line, then, if the other portions of the read buffer 42 are already full of information, that particular block is recirculated in the circuit of the H-read buffer. Otherwise, the block is immediately circulated from the H-read buffer down into the buffer basket 50, and if the A-read buffer of FIGURE 2 is empty, the information is circulated down into the A-read buffer.

Assuming that the entire read buffer 42 is now full and should the computer now call for the block of information circulating in the A-read buffer, this is achieved by the computer making the command terms J or K true. When the command terms J or K are true, the flip-flop 1564 is set false. This causes the recirculating path for the H-read buffer to be broken as the transistor 1566 becomes disabled, and the information in that buffer immediately flows down into the buffer basket 50, this latter flow being on the heels of the preceding block of information in the buffer basket and through a path which will be described. Also, the term $\overline{Hr.F}$ again becomes true so that the next successfully compared block of information 8W.R from the 8-word delay line 38 of FIGURE 37 may be immediately read into the H-read buffer on the heels of the block of information being circulated out of the buffer into the buffer basket.

The buffer basket 50 is shown n FIGURE 45*b* as including a single 8-word delay line. However, the plurality of such delay lines and associated circuitry may be included in a cascaded arrangement in the buffer basket. The number of delay lines so chosen depends, of course, upon the desired storing capabilities of the read buffer 42.

The buffer basket 50 in FIGURE 45*b* includes an 8-word delay line which introduces its output into a read flip-flop G*r*.R. The read flip-flop produces the delay line output G*r*.R at its true output terminal, and that output is applied to the base of a transistor 1600 and to the base of a grounded emitter transistor 1602. The emitter of the transistor 1600 is connected to the collector of a grounded emitter transistor 1604, and the clock pulses $T_W$ are applied to the base of the transistor 1604.

The collector of the transistor 1600 is connected to the emitters of a pair of transistors 1602 and 1604. The timing signal T1 is applied to the base of the transistor 1604, and the timing signal $\overline{T1}$ is applied to the base of the transistor 1605. The collector of the transistor 1605 is connected to the true input terminal of a leading character detector flip-flop 1606. The collector of the transistor 1602 is connected to the false input terminal of the flip-flop 1606, and the collector of a transistor 1608 is also connected to the false input terminal of that flip-flop. The emitter of the transistor 1608 is grounded, and the timing signal $C_{12}'$ is applied to the base of that transistor.

The leading character detector 1606 develops a term G*r*.F at its true output terminal, and that term is applied to the base of a transistor 1610. The term $C_1'$.S1 is applied to the base of a transistor 1612. The collector of the transistor 1612 is connected to the emitter of the transistor 1610, and the emitter of the transistor 1612 is grounded. The collector of the transistor 1610 is connected to the emitter of a transistor 1614. A term A*r*.F derived from the circuitry of FIGURE 45*c*, in a manner to be described, is applied to the base of the transistor 1614, and the collector of that transistor is connected to the true input terminal of a flip-flop 1616.

The false input terminal of the flip-flop 1616 is connected to the collector of a transistor 1618 and to the collector of a grounded emitter transistor 1620. The term RESET is applied to the base of the transistor 1620, and the computer command term $J+K$ is applied to the base of the transistor 1618. The computer timing signal $\overline{C1.S2}$ is applied to the base of a grounded emitter transistor 1622, and the collector of the latter transistor is connected to the emitter of the transistor 1618.

The flip-flop 1616 develops a term G*r*.F at its true output terminal and that term is applied to the base of a transistor 1624. The flip-flop 1616 develops the term $\overline{Gr.F}$ at its false output terminal, and the latter term is applied to the base of a transistor 1626. The collector of the transistor 1602 is connected to the emitter of the transistor 1624. The H-read buffer output from the read flip-flop H*r*.R of FIGURE 45*a* is applied to the base of a grounded emitter transistor 1628, and the collector of that transistor is connected to the emitter of the transistor 1626. The collectors of the transistors 1624 and 1626 are both connected to the input terminal of the delay line of the buffer basket 50 to supply an input $Gr.W_1^0$ to that delay line. These collectors are also connected to a resistor 1630. The resistor may have a resistance of 3.9 kilo-ohms, and it is connected to the negative terminal of the 3-volt direct voltage source.

The term $\overline{Gr.F}$ is true if the buffer basket 50 is not full, and this enables the block of information circulated into the H-read buffer of FIGURE 45*a* to be immediately introduced down into the buffer basket 50 through the transistors 1628 and 1626. When the inserted leading character of the block of information read into the buffer basket is detected by the leading character detector flip-flop 1606, and if the A-read buffer of FIGURE 45*c* is full so that the term A*r*.F is true, the flip-flop 1616 is set true at $C_1'$.S1 time. This causes the term G*r*.F to be set true at that time to complete the recirculating path for the buffer basket 8-word delay line through the transistors 1602 and 1624.

If the A-read buffer is not full, on the other hand, the term A*r*.F is false. Then, instead of the block of information recirculating in the buffer basket 50, that block immediately circulates down into the A-read buffer through a path to be described. For the latter condition, the flip-flop 1616 is not triggered true, so that no recirculating path is established for the buffer basket 50. Also, for the latter condition, the transistor 1626 remains enabled, so that a following block of information from the H-read buffer may be immediately read into the buffer basket.

The presence of the J or K commands from the computer places the transistor 1618 in a conductive condition, so that if the buffer basket 50 were previously in a recirculating condition due to the flip-flop 1616 being set true, the flip-flop 1616 is not set false. This breaks the recirculating path through the transistors 1602 and 1624 and (as will be described) causes the contents of the buffer basket 50 to be circulated down into the A-read buffer of FIGURE 45*c*. The triggering of the flip-flop 1616 false in the presence of the J or K command from the computer also enables the transistor 1626 to permit the contents of the H-read buffer of FIGURE 45*a* to be circulated down into the buffer basket 50, as the block of information in the buffer basket 50 is circulated out of the buffer basket and into the A-read buffer 8-word delay line of FIGURE 45*c*.

The circuitry of the A-read buffer is shown in FIGURE 45*c*. As mentioned above, the A-read buffer includes an 8-word delay line which feeds its output into a read flip-flop A*r*.R. The circuitry of the A-read buffer includes a transistor 1650 and a transistor 1652. The collectors of both these transistors introduce the term $Ar.W_1^0$ to the 8-word delay line. These collectors are also connected to a resistor 1654. The resistor may have a resistance of 3.9 kilo-ohms, and it is connected to the negative terminal of the 3-volt direct voltage source.

A transistor 1656 has its collector connected to the emitter of the transistor 1650. The term Gr.R of FIGURE 45*b* is introduced to the base of the transistor 1656. The emitter of that transistor is grounded. A transistor 1658 has its collector connected to the emitter of the transistor 1652. A term, Ar.Rec.g, derived in a manner to be described from the circuitry of FIGURE 46, is introduced to the emitter of the transistor 1658. The command term $\overline{J+K}$ from the computer is applied to the base of that transistor.

The circuitry of FIGURE 45*c* includes a flip-flop 1660 which serves as a leading character detector. A transistor 162 and a transistor 1664 both have their collectors connected to the false input terminal of the flip-flop 1660. A transistor 1666 has its collector connected to the true input terminal of the flip-flop 1660. The timing signals T1 and $\overline{T1}$ are respectively introduced to the bases of the transistors 1666 and 1662. The emitter of the transistor 1664 is grounded, and the timing signal $C_{12}'$ is applied to the base of that transistor. A transistor 1668 has its collector connected to the emitters of the transistors 1662 and 1666. A grounded emitter transistor 1670 has its collector connected to the emitter of the transistor 1668. The computer clock pulses $T_W$ are applied to the base of the transistor 1670.

The flip-flop 1660 develops the term Ar.F' at its true output terminal. This term is introduced to the base of a transistor 1672. The collector of the transistor 1672 is connected to the true input terminal of a flip-flop 1674. A transistor 1676 has its emitter connected to ground, and this transistor has its collector connected to the emitter of the transistor 1672. The timing signal $C_1'$.S1 is applied to the base of the transistor 1676. A transistor 1678 and a transistor 1680 both have their collectors connected to the false input terminal of the flip-flop 1674. The emitter of the transistor 1678 is grounded, and the term RESET is applied to the base of that transistor. A term $\overline{R9.W}$ from the circuit of FIGURE 46 is applied to the base of the transistor 1680.

A transistor 1682 has its collector connected to the emitter of the transistor 1680, and a grounded emitter transistor 1684 has its collector connected to the emitter of the transistor 1682. The command term $J+K$ from the computer is applied to the base of the transistor 1682, and the timing signal $\overline{C1S1}$ is applied to the base of the transistor 1684. The flip-flop 1674 develops an output term $\overline{Ar.F}$, and this term is applied to the base of the transistor 1650. The flip-flop 1674 also develops the term Ar.F, and the latter term is applied to the base of the transistor 1652. When the A-read buffer is not full, the flip-flop 1674 is false so that the term $\overline{Ar.F}$ is true. This enables the contents of the buffer basket 50 of FIGURE 45*b* to be read down into the A-read buffer. When the leading character of such a block is detected by the leading character detector flip-flop 1660, that flip-flop is set true to make the term Ar.F' true. At the following C1.S1 time, the flip-flop 1674 is set true to cause the term Ar.F to be true, this occurring at the beginning of the next block time. This conditions the transistor 1652 for conduction and provides a recirculating path for the A-read buffer through the circuitry of FIGURE 46, as will be described.

The J or K commands from the computer sets the flip-flop 1674 false, and this causes the recirculating path of the R-read buffer to be broken. Such an operation also causes the contents of the A-read buffer to be read into the computer. This is not permitted to occur, however, until a word unscrambler operation, to be described in conjunction with FIGURE 46, is completed. Until that time, the term $\overline{R9.W}$ introduced to the base of the transistor 1680 is false to prevent the flip-flop 1674 from being set false.

The control circuitry of FIGURES 45*a*, 45*b* and 45*c*, therefore, permits a block of information to be read into the read buffer 42 of FIGURE 2. If the read buffer is completely empty, that block is circulated down into the A-read buffer until its word times have been correlated with the word times of the computer, and then until the block is selected by the computer. So long as the first block of information is recirculating in the A-read buffer, the next block of information entered into the read buffer 42 is circulated down to th buffer basket 50 section, and the latter block recirculates in the buffer basket so long as the R-read buffer is full. As mentioned above, the buffer basket 50 may be constructed to hold one or more blocks of information. When the buffer basket is full, the next block of information read into the read buffer 42 is recirculated in the H-read buffer section. The entire read buffer 42 is now full, and it will accept no further blocks of information until the moment the block in the A-read buffer is introduced into the computer upon the occurrence of a J or K command.

The presence of a J or K command from the computer causes the block of information in the A-read buffer to be read into the computer, and this causes the other blocks of information in the read buffer 42 immediately to circulate down from the buffer basket 50 to the A-read buffer and down from the H-read buffer to the buffer basket 50. The H-read buffer is also conditioned at this time to receive the next block of information from the 8-word delay line 38 of FIGURE 2.

It will be remembered that when a block of information is first read into the A-read buffer of FIGURE 45*c*, it is correlated with the computer as to bit times and character times. However, that block is still not correlated with the computer as to word times. This latter correlation process is carried out in the word unscrambler circuits of FIGURES 46 and 47.

The word unscrambler circuitry of FIGURE 46 includes the 1-word delay line 54 referred to in conjunction with FIGURE 2. The output from the 1-word delay line 54 is introduced to a read flip-flop K*b*.R, and a term K*b*.$W_1^0$ is introduced to the input of the delay line. A pair of transistors 1700 and 1702 each have their collectors connected to the input terminal of the 1-word delay line 54 and to a resistor 1704. The resistor 1704 may have a resistance of 3.9 kilo-ohms, and it is connected to the negative terminal of the 3-volt direct voltage source.

The grounded emitter transistor 1706 has its collector connected to the emitter of the transistor 1700 and to the emitter of a transistor 1708. The term Ar.R of FIGURE 45*c* is introduced to the base of the transistor 1706. A transistor 1710 has its collector connected to the emitter of the transistor 1702, and a transistor 1712 has its collector connected to the emitter of the transistor 1710. The computer timing signal C12 is applied to the base of the transistor 1710, and a term K1.*b* (derived in a manner to be explained from the circuitry of FIGURE 48) is applied to the base of the transistor 1712.

A transistor 1714 has its collector connected to the emitter of the transistor 1702, and a grounded emitter transistor 1716 has its collector connected to the emitter of the transistor 1714. The collector of the transistor 1716 is also connected to the emitter of a transistor 1718. The computer timing signal $\overline{C12}$ is applied to the base of the transistor 1714. The output K*b*.R from the 1-word delay line read flip-flop K*b*.*r* is applied to the base of the transistor 1716.

A grounded emitter transistor 1720 has its collector connected to the emitter of the transistor 1712 and to a resistor 1722. The resistor 1722 may have a resistance of 3.9 kilo-ohms, and it is connected to the negative terminal of the 3-volt direct voltage source. The term > of FIGURE 41 is applied to the base of the transistor 1720. A grounded emitter transistor 1724 has its collector connected to the emitter of a transistor 1726, and the collector of the latter transistor is connected to the resistor 1722. The term = of FIGURE 41 is applied to the base of the transistor 1724, and the term $DAR_B$ of FIGURE 41 is applied to the base of the transistor 1726.

The circuitry of FIGURE 46 includes a first flip-flop 1728, and it includes a second flip-flop 1730. A term R9.W is produced at the true output terminal of the flip-flop 1728, and that term is applied to the base of the transistor 1718 and to the base of a transistor 1732. A flip-flop 1728 also produces the term $\overline{R9.W}$ and the latter term is applied to the base of the transistor 1708 and to the base of a transistor 1734. The flip-flop 1730 develops a term R*ec*.K*b* at its true output terminal, and that term is applied to the base of the transistor 1702 and to the base of a transistor 1736. The flip-flop 1730 develops a term $\overline{Rec.Kb}$ at its false output terminal, and the latter term is applied to the base of the transistor 1700 and to the base of a transistor 1738.

The collector of the transistor 1736 is connected to the true input terminal of the flip-flop 1728, and the collector of the transistor 1738 is connected to the false input terminal of that flip-flop. A transistor 1740 has its collector connected to the emitter of the transistor 1736, and the timing signal $T7.T_C$ is applied to the base of the transistor 1740. A transistor 1742 has its collector connected to the emitter of the transistor 1738, and a block timing term G.T7.TC from the computer is applied to the base of the transistor 1742. This latter term is derived from the computer, as noted, and it designates a particular word time corresponding to the beginning of a block time in the computer.

A term $NULL_B$ derived (in a manner to be described) from the circuitry of FIGURE 47 is applied to the base of a transistor 1744. The transistor 1744 has a grounded emitter, and the collector of that transistor is connected to the emitters of the transistors 1740 and 1742. The $NULL_B$ term of FIGURE 47 is applied to the base of a transistor 1746. The collector of the latter transistor is connected to the emitters of the transistors 1732 and 1734, and the base of the transistor 1746 is connected to the collector of a grounded emitter transistor 1748. The computer timing signal $C_1'.S1$ is applied to the base of the transistor 1748.

The null detector 58 of FIGURE 2 is shown in circuit detail in FIGURE 47. The circuitry of FIGURE 47 includes a flip-flop 1750, and that flip-flop develops the term $NULL_B$ at its true output terminal. The term $NULL_B$ is applied to the transistors 1744 and 1746 in FIGURE 46, as mentioned above. A transistor 1752 has its collector connected to the false input terminal of the flip-flop 1750, and a transistor 1754 has its collector connected to the true input terminal of that flip-flop. A grounded emitter transistor 1756 has its collector connected to the emitter of the transistor 1752, and the computer clock pulses $T_C$ are applied to the base of the transistor 1756.

The term A*r*.R of FIGURE 45*c* is applied to the base of a grounded emitter transistor 1758. The collector of that transistor is connected to a resistor 1760 and to the base of the transistor 1752. The resistor 1760 may have a resistance, for example, of 3.9 kilo-ohms, and it is connected to the negative terminal of the 3-volt direct voltage source. The term A*r*.F of FIGURE 45*c* is applied to the base of a transistor 1762. The emitter of the transistor 1762 is grounded, and its collector is connected to the emitter of the transistor 1754. The computer timing signal $C_{12}'$ is applied to the base of the transistor 1754.

When the A-read buffer in FIGURE 45*c* is full, the leading character detector flip-flop 1660 in FIGURE 45*c* sets the flip-flop 1675 true to cause the term A*r*.F to be true. Now, to correlate the block of information in the A-read buffer with the word times in the computer, the first step is to find the key word which is known to occur at the 8th word time of the block of information circulating in the A-read buffer. This detection is made in the circuit of the null detector 58 in FIGURE 47.

The flip-flop 1750 of the null detector 58 in FIGURE 47 is set true each $C_{12}'$ time when a block of information is circulating in the A-read buffer, this operation being due to the term A*r*.F enabling the transistor 1762 when such a block is in the A-read buffer. Therefore, for each word in the A-read buffer, the null detector 58 is set true just before the 12th character time. However, only in the key word is the 12th character a null (1111111). Therefore, when the key word is reached, the null detector flip-flop 1750 is still true at the end of the 12th character time. This causes the term $NULL_B$ to be true at the end of the 12th character time of the key word. However, that term is false at the end of the 12th character time of all other word times in the block of information circulating in the A-read buffer.

During the search for the key word, the flip-flop 1728 in FIGURE 46 is false and the flip-flop 1730 in FIGURE 46 is also false. This makes the term $\overline{R9.W}$ and $\overline{Rec.Kb}$ both true during the search. This permits the contents of the A-read buffer of FIGURE 45*c* to recirculate through the transistors 1706 and 1708 in FIGURE 46 to form the term A*r*.R*ec*.*g*. This latter term is introduced to the input of the A-read buffer in FIGURE 45*c* through the transistors 1658 and 1652. The transistor 1658 is conditioned for conduction in the absence of a J or K command from the computer by the term $\overline{J+K}$, and the term A*r*.F enables the transistor 1652 because the flip-flop 1674 is now in its true state.

During the search for the key word, and as the block of information is circulating around the circuitry described in the preceding paragraph, each word in the A-read register is read into the 1-word delay line 54 of FIGURE 46 through the transistor 1700. This transistor is enabled by the term $\overline{Rec.Kb}$ which is now true because the flip-flop 1728 is now false. When the key word is detected in the circuitry of FIGURE 47, and the term $NULL_B$ becomes true, the flip-flop 1730 in FIGURE 46 is set true at the following $T7.T_C$ time to set the term R*ec*.K*b* true. This causes the transistor 1702 to become conductive so as to complete a recirculating path for the 1-word delay line 54. This recirculating path extends through the transistors 1716, 1714 and 1702. The key word is therefore trapped in the recirculating circuitry of the 1-word delay line 54.

It will be remembered that the 12th character of the key word now recirculating in the circuitry of the delay line 54 of FIGURE 46 is a null character (1111111). It is undesirable for such a character to be fed into the computer because it would cause the parity error circuits of the computer to be actuated. This character is, therefore, replaced by a blank or zero character (0000000) by the circuitry of the transistors 1720, 1712 and 1710 when the comparison is in the > mode. However, when the comparison is in the equality mode, the 12th character of the key word is replaced by the 12th character of the corresponding word in the desired address register for identifying purposes. This corresponding word in the desired address register is found by the compare network of FIGURE 48, which will be described, and the 12th character of that word is inserted into the 12th character position of the key word in the 1-word delay line 54 by the circuitry of the transistors 1724, 1726, 1712, 1710 and 1702.

The next time that the key word of the block circulating in the A-read buffer is detected by the null detector 58 of FIGURE 47, the term $NULL_B$ again becomes true and this time causes the flip-flop 1728 (FIGURE 46) to be set true so that the term R9.W becomes true, and it causes the flip-flop 1730 to be set false to make the term $\overline{Rec.Kb}$ true.

The contents from the A-read buffer now circulates through the transistor 1700 in FIGURE 46 into the delay line 54, and the output from the delay line 54 is circulated into the A-read buffer through the transistors 1716 and 1714 of FIGURE 46 and through the transistors 1658 and 1652 of FIGURE 45*c*. The contents of the A-read buffer now recirculate through a 9-word path, and these contents include the original key word with its null 12th character followed by the modified key word from the delay line 54 with its new 12th character and then followed by the remaining words of the block.

Each time the null character of the old key word is again detected by the null detector of FIGURE 47, the term $NULL_B$ becomes true. However, the term G.T7.$T_C$ becomes true simultaneously with such a detection only when the computer word times are in correlation with the word times of the circulating information. When that occurs, the flip-flop 1728 of FIGURE 46 is again set false to set the term $\overline{R9.W}$ true, but the flip-flop 1730 of FIGURE 46 remains false so that the term $\overline{Rec.Kb}$ remains true. At this time, the old key word is in the 1-word delay line 54 and that word is circulated out of the system because the term R9W is false so that the transistor 1718 is disabled and the term R*ec*.K*b* is false so that the transistor 1702 is disabled.

The information in the A-read buffer now circulates in an eight word path through the transistors 1700 and 1706 of FIGURE 46 and through the transistors 1658 and 1652 of FIGURE 45*c*. This information includes the new key word followed by 7 data words, and it circulates in full correlation with the computer as to bit times, character times and word times.

The compare network which controls the insertion of the identifying twelfth character from a corresponding word circulating in the desired address register into the key word circulating in the 1-word delay line 54 is illustrated in FIGURE 48. The circuitry of FIGURE 48 includes an "exclusive-or" network 1780. A grounded emitter transistor 1782 has its collector connected to a resistor 1784 and to one of the input terminals of the "exclusive-or" network 1780. The resistor 1784 may have a resistance of 2.2 kilo-ohms, and it is connected to the negative terminal of the 3-volt direct voltage source. The output K*b*.R from the read flip-flop K*b*.R of FIGURE 46 is applied to the base of the transistor 1782. The output $DAR_R$ from the desired address register of FIGURE 41 is applied to a second input terminal of the "exclusive-or" gate 1780.

The output terminal of the "exclusive-or" gate 1780 is connected to the base of a transistor 1786 and to a resistor 1787. A resistor 1787 may have a resistance of 6.8 kilo-ohms, and it is connected to the negative terminal of the 3-volt direct voltage source. The computer write clock pulses $T_W$ are introduced to the base of a grounded emitter transistor 1788. The collector of the transistor 1788 is connected to the emitter of the transistor 1786, and the collector of the latter transistor is connected to the emitter of a transistor 1790. The term $(MSK=III).\overline{T7}$ of FIGURE 43 is applied to the base of the transistor 1790. The collector of the transistor 1790 is connected to the true input terminal of a flip-flop 1792.

The computer timing signal $C_{.1}$.S1 is applied to the base of a transistor 1794. The transistor 1794 has its emitter connected to ground, and the collector of that transistor is connected to the emitter of a transistor 1796. The term R*ec*.K*b* of FIGURE 46 is applied to the base of the transistor 1796, and the collector of that transistor is connected to the true input terminal of the flip-flop 1792.

The flip-flop 1792 develops the term K1.*b* at its true input terminal, and it develops the term $\overline{K1.b}$ at its false input terminal. This flip-flop 1792 is controlled by the "exclusive-or" gate 1780 to be held in its true state when the word circulating in the desired address register 48 of FIGURE 41 corresponds to the key word circulating in the delay line 54 of FIGURE 46. Then, at the 12th character times of these two words, the term K1.*b* is true to condition the transistor 1712 of FIGURE 46 for conduction. This, in turn, permits the twelfth character of the word in the desired address register 48 of FIGURE 41 to be substituted for the null twelfth character of the key word in the 1-word delay line 54 during the equality mode of comparison and it permits a blank character to be inserted during the "less than" mode of comparison.

As mentioned previously, before it can be introduced to the computer, the block of information circulating in the A-read buffer is fully correlated with the computer, as to bit times, character times, and word times. Moreover, the circulating block contains a key word having an identifying twelfth character for the = comparison mode, or a blank twelfth character for the < comparison mode. This block of information continues to recirculate in the A-read buffer until the computer develops appropriate command term J or K which enable the block to be read into the computer.

In FIGURE 49, for example, the computer is represented by the block 1800, and a pair of transistors 1804 and 1806 are illustrated as being connected in series circuit to an input terminal of the computer. The command term $J+K$ from the computer is applied to the base of the transistor 1804 and the term A*r*.R is applied to the base of the transistor 1806. The term $J+K$ is true upon an appropriate J or K command from the computer.

As fully described in the above-mentioned copending application, S.N. 832,522, "Computer," filed August 10, 1959, by Frank A. Hill et al., either of the commands J or K requires that information be read from a tape memory system such as that of the present invention into the computer. Now, when the term $J+K$ is true, the circuitry through the transistor 1804 is enabled, so that the contents A*r*.R of the A-read buffer may be read into the computer.

The invention provides, therefore, an improved tape memory system. The improved tape memory system of the invention is capable of receiving blocks of information and of storing that information on a suitable medium, such as an endless magnetic tape. The system also permits blocks of information to be selected from the tape, and it includes appropriate buffering circuitry for correlating the selected information as to bit time, character time and word time with the associated computer.

What is claimed is:

1. In a memory system for storing information for use in data processing, the combination of: storage means for storing the information, first means coupled to the storage means for successively introducing into the storage means data bits representative of such information, circuit means included in said first means for producing a clock signal having a pre-determined timing with respect to the data bits, and write head transducer means coupled to said circuit means and coupled to the storage means for introducing the clock signal to the storage means concurrently with the introduction of the data bits.

2. In a memory system for storing information for use in data processing, the combination of: magnetic memory means for storing the information at different memory locations therein, first means coupled to the memory means for introducing groups of binary bits to the memory means representative of successive characters of the information to be stored therein, circuit means included in said first means for producing clock pulses having a pre-determined timing with respect to the binary bits of successive ones of said groups, and electromagnetic write head transducer means coupled to said circuit means and coupled to the memory means for introducing the clock pulses to the memory means concurrently with the introduction of said groups of binary bits.

3. In a memory system for storing information for use in data processing, the combination of: memory means including a magnetic memory tape unit for storing the information at different memory locations in a plurality of tracks thereon, first means coupled to the memory means for serially introducing groups of binary bits to the memory tape unit representative of successive characters of such information to be recorded in the plurality of tracks thereon, circuit means coupled to the first means for producing a series of clock pulses having a pre-determined timing with respect to the binary bits of successive ones of said groups, and write head electromagnetic transducer means coupled to said circuit means and to the memory means for introducing the clock pulses to the memory tape unit concurrently with the introduction of said groups of binary bits thereto to be recorded on an additional track on the magnetic memory tape unit.

4. In a memory system for storing at least one block of information for use in data processing, which block contains a plurality of multi-bit characters, the combination of: memory means including a magnetic memory tape unit for storing the block of information in a plurality of tracks thereon and at a selected block location on the memory tape, first means coupled to the memory means for serially introducing binary bits to the memory means representative of successive ones of the characters in the block of information to be recorded on the tape, with the bits in successive groups of the characters being so recorded in different ones of the tracks thereon, circuit means coupled to the first means for producing a series of clock pulses having a pre-determined timing with respect to the binary bits of successive ones of said characters, and electromagnetic write head transducer means coupled to said circuit means and coupled to said memory means for introducing the clock pulses to the memory tape unit concurrently with the introduction of the block of information thereto to be recorded on an additional track of the tape unit.

5. In a memory system: memory means for storing a plurality of blocks of signals at different block locations therein, means coupled to the memory means for receiving successive ones of the blocks of signals stored in the memory means, utilizing means coupled to the receiving means for receiving and retaining selected ones of the blocks of signals from the receiving means, control means coupled to the utilizing means for causing said selected ones of the blocks of signals from the receiving means to be retained in the utilizing means, circuit means coupled to the control means for producing marking signals having a selected time relation with the selected blocks of signals, and write head transducer means coupled to said circuit means and to said memory means for introducing said marking signals to the memory means for identifying the original block locations in the memory means of a corresponding selected ones of the blocks of signals.

6. In a memory system: memory means including a magnetic memory tape for storing a plurality of blocks of signals at different block locations along the tape, reading means magnetically coupled to the tape for receiving in serial form successive ones of the blocks of signals stored on the tape, output buffer means coupled to the reading means for receiving and retaining selected ones of the blocks of signals from the reading means, control means coupled to the reading means and to the buffer means for causing said selected ones of the blocks of signals from the reading means to be retained in the buffer means, circuit means coupled to the control means for producing marking signals having a selected time relation with the selected blocks of signals, and write head electromagnetic transducer means coupled to said circuit means and magnetically coupled to the tape for introducing said marking signals to the tape so as to produce recordings thereon, said recordings serving to identify respective ones of the original block locations on the tape of said selected ones of the blocks of signals.

7. In a memory system: memory means for storing a plurality of blocks of signals at different block locations thereon, wherein each block includes information signals representing particular data and a key signal for identifying the particular data, register means coupled to the memory means for receiving successive ones of the blocks of signals stored in the memory means, first key signal holding means coupled to the memory means for receiving and holding the key signal of each successive one of the blocks of signals received by the register means, second key signal holding means for holding at least one key signal corresponding to the key signal of a desired one of the blocks of signals stored in the storage means, compare means coupled to the first and to the second key signal holding means for comparing the successive key signals in the first key signal holding means with the key signal in the second key signal holding means to produce control signals in response to a successful comparison thereof, and circuit means coupled to the compare means for producing a marking signal having a selected time relation with the desired block of signals, and electromagnetic write head transducer means coupled to said circuit means and to the memory means for recording said marking signal in the memory means in response to said control signal and in a position identifying the original block location of the block of signals corresponding to the key signal in the first key signal holding means producing the successful comparison.

8. In a memory system for storing information for use in data processing, the combination of: storage means for storing a plurality of blocks of the information, a plurality of input buffer means for receiving the blocks of information to be stored in the storage means, means coupled to the storage means and to at least one of the input buffer means for controllably introducing into the storage means data bits representative of such blocks of information, circuit means for producing a clock signal having a predetermined timing with respect to the data bits, write head transducer means coupled to said circuit means and coupled to the storage means for introducing the clock signal to the storage means concurrently with the introduction of the data bits, and control circuitry coupled to the input buffer means for causing successive ones of the blocks of information received by the input buffer means to be circulated from one of said buffer means to another until successive ones of said buffer means contain different ones of the blocks of information.

9. In a memory system for storing information for use in data processing, the combination of: a magnetic memory means for receiving and storing a plurality of multi-character blocks of information at different block locations thereon, input buffer means for receiving the blocks of information to be stored in the storage means, first circuit means coupled to said input buffer means for successively introducing the multi-character blocks of information to the buffer means, second circuit means coupled to said buffer means and to said magnetic memory means for introducing groups of binary bits to said magnetic memory means representative of successive characters of the individual multi-character blocks of information in said buffer means, third circuit means for producing clock pulses having a pre-determined timing with respect to the binary bits of successive ones of said groups, and write head transducer means coupled to said third circuit means and coupled to said magnetic memory means for introducing the clock pulses to the magnetic memory means concurrently with the introduction of said groups of binary bits.

(References on following page)

References Cited by the Examiner

UNITED STATES PATENTS

| | | | |
|---|---|---|---|
| 2,849,704 | 8/1958 | Neff | 340—174 |
| 2,885,659 | 5/1959 | Spielberg | 340—174 |
| 2,895,123 | 7/1959 | Foster et al. | 340—174 |
| 2,907,005 | 9/1959 | Kun Li Chien et al. | 340—174 |
| 2,913,706 | 11/1959 | Thorensen et al. | 340—172.5 |
| 2,913,707 | 11/1959 | Goldberg et al. | 340—174 |
| 2,926,338 | 2/1960 | Bensky et al. | 340—174.1 |
| 2,926,341 | 2/1960 | Scarbrough | 340—174.1 |
| 2,930,028 | 3/1960 | Johnson et al. | 340—172.5 |
| 2,969,522 | 1/1961 | Crosby | 340—172.5 |
| 3,034,111 | 5/1962 | Hoagland et al. | 340—174.1 |
| 3,099,819 | 7/1963 | Barnes | 340—172.5 |
| 3,149,309 | 9/1964 | Schmidt | 340—172.5 |

ROBERT C. BAILEY, *Primary Examiner.*

EVERETT R. REYNOLDS, DARYL W. COOK, MALCOLM A. MORRISON, *Examiners.*